US005973426A

United States Patent [19]

Fujinaka et al.

[11] Patent Number: 5,973,426

[45] Date of Patent: Oct. 26, 1999

[54] MOTOR

[75] Inventors: Hiroyasu Fujinaka; Hiroyoshi Teshima; Kouji Kuyama; Miyuki Furuya, all of Tottori, Japan

[73] Assignee: Matsushita Electric Industrial Co., Ltd., Osaka, Japan

[21] Appl. No.: 09/068,770

[22] PCT Filed: Nov. 14, 1996

[86] PCT No.: PCT/JP96/03338

§ 371 Date: Sep. 28, 1998

§ 102(e) Date: Sep. 28, 1998

[87] PCT Pub. No.: WO97/18616

PCT Pub. Date: May 22, 1997

[30] Foreign Application Priority Data

| | | | |
|---|---|---|---|
| Nov. 16, 1995 | [JP] | Japan | 7-297956 |
| Nov. 28, 1995 | [JP] | Japan | 7-309209 |
| Nov. 28, 1995 | [JP] | Japan | 7-309210 |

[51] Int. Cl.$^{6}$ .......... H02K 37/10

[52] U.S. Cl. .......... 310/49 R; 310/268; 310/254

[58] Field of Search .......... 310/49 R, 156, 310/261, 112, 164, 254, 268

[56] References Cited

U.S. PATENT DOCUMENTS

| | | | |
|---|---|---|---|
| 4,739,201 | 4/1988 | Brigham et al. | 310/49 R |
| 4,899,072 | 2/1990 | Ohta | 310/49 R |
| 4,990,806 | 2/1991 | Kikuchi et al. | 310/49 A |
| 5,245,239 | 9/1993 | Kuyama | 310/233 |
| 5,723,921 | 3/1998 | Sugiura | 310/49 R |

FOREIGN PATENT DOCUMENTS

| | | |
|---|---|---|
| 63-253850 | 10/1988 | Japan . |
| 4-101269 | 9/1992 | Japan . |
| 7-75302 | 3/1995 | Japan . |
| 8-11050 | 3/1996 | Japan . |

*Primary Examiner*—Nestor Ramirez
*Assistant Examiner*—Judson H. Jones
*Attorney, Agent, or Firm*—Wenderoth, Lind & Ponack, L.L.P.

[57] ABSTRACT

A small motor for use in an information-communication appratus, an audio-visual apparatus or the like, and a motor for use in a portable pager and a portable telephone or the like for generating vibrations to be transmitted to a human body, the motors being efficient, small and thin in size, and having a high degree of freedom when mounted on an apparatus. To realize the motor as described above, K pieces of (K indicating any integer greater than one) magnetic units (4*a*, 4*b*, 4*c*) having N and S poles magnetized alternately are mounted on a rotor in a circumferential direction, and K magnetic units are axially stacked in K stages and integrally retained on a shaft (6), and this rotor is rotatably supported on a pair of bearings (9*a*, 9*b*). Cores (1*a*, 1*b*, 1*c*) each have a salient pole (7*a*, 7*b*, 7*c*) wound around with coils (3*a*, 3*b*, 3*c*) in K stages so as to correspond to each of the magnetic units. The magnetized position of the N and S poles of the magnetic unit at each stage deviates relative to one another in a circumferential direction so as to set the phase of induced voltage generated on the salient pole wound around with the coil in each stage to a phase suitable for rotating a magnet unit corresponding to a coil in that stage.

48 Claims, 57 Drawing Sheets

(a)

(b)

(a)

(b)

MOTOR

TECHNICAL FIELD

The present invention relates to a small motor for use in an information-communication apparatus, an audio-visual apparatus or the like, and a motor for use in a portable pager and a portable telephone or the like generating vibrations to be transmitted to a human body.

BACKGROUND ART

In order to meet the increasing needs for reducing the overall sizes, increasing the degree of precision and improving the reliability of apparatus for information-communication, audio-visual application, more and more number of brushless motors are being used in place of motors with brush. The motors with brush are also required to be compact and thin; accordingly, many of the conventional frame cases of a cylindrical shape are replaced by those of an oval shape among the core motors. Even among the coreless motors, frame cases of oval and square shapes have been developed, and motors having such frame cases are already in use in portable communication appratus. The battery-driven motors for use in portable apparatus have to meet stringent dimensional requirements in thickness direction; in addition, the power consumption must be low in view of battery life. It has become difficult to raise the efficiency of a motor further by using a high energy-density magnet among the motors having conventional oval or cylindrical structure.

Motors of the above category have a structure as shown in FIG. 58, FIG. 61 or FIG. 62. The structure is described in the following.

FIG. 58 is a cross sectional view showing a conventional inner-rotor type brushless motor.

As shown in FIG. 58, a cylindrical magnet 130 is fixed to a shaft 131 inserted through the central hole, one end of the shaft 131 is held by a bearing 133 provided on a frame case 132 while the other end is held by a bearing 134 provided on a bracket 136; thus an inner rotor is formed which is supported at both ends. The magnet 130 fixed to the shaft 131 which is rotatably supported by bearings 133, 134 is magnetized in the N and S poles. A cylindrical core 128 is provided with three salient poles, which are wound around with a coil 129. The magnet 130 is rotated by magnetic flux generated by electricity supplied to the coil 129.

A circuit board 135 is mounted with electronic components. Each of the salient poles of the core 128 is wound around with coil to form a three-phase coil of phase U, phase V and phase W, respectively. The above electronic circuit controls so as the phase of induced voltage generated at each of the three phases deviates relative to one another by 120. Thus, it is driven as a three-phase brushless motor.

FIG. 61(*a*) is a cross sectional view showing a conventional core motor having an oval cross sectional shape for use in a portable pager, FIG. 61(*b*) shows the motor sectioned by a plane perpendicular to the shaft.

As shown in FIG. 61(*a*) and FIG. 61(*b*), a core 142 made of stacked silicon steel sheets is fixed around a shaft 139, a resin insulator shaped to a same shape as the core is inserted in the core 142, and a rectifying terminal unit 144 is thrusted to the shaft 139. The core 142 is wound around with a coil 143, the electric conduction point of coil 143 is aligned to a specified position of the rectifying terminal unit 144 for soldering. An armature coil assembly of a motor is thus structured. The rectifying surface of rectifying unit 144 is lapped, and then the entire assembly of armature coil is washed. A sintered bearing 140 is fixed in the centre of frame case 137. In the frame case 137 which is shaped oval, an arc-shape magnet 138 is provided at the inside of each of the two arc-shape sides of the frame case 137, the inner side of the two magnets is magnetized so as to have opposit pole relative to each other. The shaft 139 of washed armature coil assembly is inserted to the sintered bearing 140, and a bracket 147 provided with a brush 146 and a sintered bearing 141 is affixed to the frame case 137 to complete a motor.

Magnetic flux comming out of the inner surface of one magnet 138 goes through core 142, enters into the inner surface of the other magnet 138, and returns to the initial magnet 138 via frame case 137. Namely, a magnetic circuit is formed on a plane perpendicular to the shaft 139. An imbalancing weight 148 is mounted fixed on the shaft 139.

As a result of rotation of the motor, the shaft 139 with the imbalancing weight 148 fixed thereon causes a vibration, which vibration is transmitted to the frame case 137 for the vibration of a portable pager.

FIG. 62(*a*) is a plane view of a coreless motor having a square cross section, for use in a portable communication apparatus. FIG. 62(*b*) is a cross sectional view of the coreless motor of FIG. 62(*a*).

A shaft 149 is fixed to a group of coreless coils 151 via a rectifier 150. A magnet 152 of empty-cylindrical shape is fixed to a housing 153 and is disposed in a space within the group of coils 151 with a certain clearance. Frame case 154 provided with a flat portion on the outer surface fixes the housing 153 carrying thereon the magnet 152 in a space inside the group of coils 151 securing a certain clearance, at the same time forms a magnetic circuit together with the magnet 152. Bearing 155 fixed in the housing 153 holds the shaft 149 rotatable. Brush 156 is electrically coupled with the group of coils 151 via rectifier 150. Imbalancing weight 157 is fixed onto the shaft 149.

The above described conventional structure may not fully meet the increasing needs for a compact and efficient motor that satisfies the prevailing desire in the industry for making an apparatus smaller. The problems are as follows.

With an inner-rotor type brushless motor having a cylindrical core 128, as shown in FIG. 58, if there is a dimensional restriction in a plane perpendicular to shaft 131 the winding work for coil 129 may face a difficulty unless a certain space is secured for the work, especially when the diameter of magnet 130 becomes small the winding work may face an extreme difficulty.

The space factor in the above described inner-rotor type brushless motor is not quite high, by the reason described below.

FIG. 59(*a*) is a cross sectional view of simplified magnetic circuit in an inner-rotor type brushless motor. FIG. 59 (*b*) shows the motor unrolled from inside of the core. Description is made in the following with reference to these drawings. Here, the leakage of magnetic flux is ignored to make the description simple.

An inverse number of the velocity shift rate $\mu$ is often used to represent the efficiency $\eta$ of a motor. A following Formula 1 is generally established with respect to the velocity shift rate $\mu$:

$$\eta = \frac{1}{\mu} = \frac{\Phi^2 T^2}{R} \qquad (1)$$

where: Φ denotes effective magnetic flux of core, T is number of coil turns, R is coil resistance.

The effective magnetic flux Φ of core is expressed in the following Formula 2.

$$\Phi = \pi D L B g \qquad (2)$$

where: D denotes the outer diameter of rotor, L is length of rotor, Bg is the density of magnetic flux at gap.

The density of magnetic flux at gap Bg is expressed in the following Formula 3.

$$Bg = \frac{Br}{1 + \frac{\mu r}{Lm / Lg}} \qquad (3)$$

where: Br, $\mu$ r are called respectively residual flux density, recoil magnetic permeability. These are the constants specific to a magnetic material. Lm is thickness of magnet, Lg is air gap between magnet and core.

The relationship between the number of coil turns T and the coil resistance R is represented in Formula 4.

$$R = \frac{2kT^2 l}{S} \qquad (4)$$

where; k denotes electric conductivity of coil, which is a constant determined proportionate to the space factor of coil. l represents average coil length per one turn, S is cross sectional area of coil. The l is represented by Formula 5, when the coil resistance is ignored.

$$l = 2(Lc + Dc) \approx 2\frac{L}{3} + \frac{\pi}{2}D \qquad (5)$$

where; Lc denotes height of coil, Dc is coil width.

By substituting the Formula 2, Formula 3, Formula 4 and Formula 5 for Formula 1, the following Formula 6 is obtained:

$$\eta = \left(\pi D L \frac{Br}{1 + \frac{\mu r}{Lm / Lg}}\right)^2 \cdot \frac{S}{4k\left(\frac{L}{3} + \frac{\pi}{2}D\right)} \qquad (6)$$

There is no component representing the coil resistance R nor the coil turn counts T contained in the above Formula. It indicates that the efficiency does not change by a change in the specifications of coil winding.

In the above formula, when L, D are varied so as the volume of rotor($\pi D^2 L/4$) remains constant, with other variables fixed, the relationship between the length/diameter of rotor(L/D) and the efficiency η is as shown in FIG. 60. According to FIG. 60, the efficiency improves with a longer rotor, but the improvement curve saturates and converges towards a certain value. So, there is a limitation, with no further improvement any more.

With regard to an inner-rotor type brushless motor as shown in FIG. 58, the number of turns for a salient pole has to be increased to obtain a larger torque. This makes the salient pole larger, hence a larger outer diameter of a motor, rendering it difficult to make a moter smaller. Furthermore, a core which is comprised of salient poles wound around with coil disposed at a same interval has to be provided around the inner-rotor, which makes cross sectional shape of a motor round, or almost round. It is difficult to make a motor thin.

With regard to a core motor for portable pager as shown in FIG. 61, the reliability is inferior to a brushless motor because of the existence of a brush. If one tries to solve the the problems by making the motor shape oval, the coil winding faces a difficulty because of the small contour.

With regard to a coreless type brush motor for portable communication apparatus, as shown in FIG. 62, the reliability is inferior to a brushless motor, and an available output torque is smaller as compared with a core motor when the dimensions of a motor are reduced. Namely, when diameter of a motor is reduced smaller it becomes more difficult to realize an efficient and compact coreless motor, or such a coreless motor for generating vibrations. Furthermore, coils of such a motor are required to be wound with a thin wire, e.g. as thin as 0.01–0.02 mm, which means a deteriorated production yield rate during handling of the coils. These have been some of the factors which hamper the supply of inexpensive motors.

DISCLOSURE OF THE INVENTION

The present invention may implement a small motor that has a high efficiency and a thin shape, as well as a high degree of freedom when mounted on an apparatus.

A first exemplary device for implementing the invention comprises K pieces of (K indicating any integer greater than one) magnetic units having the N and S poles magnetized alternately in a circumferential direction which are stacked axially in K stages around a rotation shaft to form one integral body of a rotor, which rotor being held rotatable by a pair of bearings. A core is provided with salient poles wound around with coils in K stages corresponding to each of the magnetic units. The magnetized position of the N and S poles in magnetic unit at each stage deviates relative to one another in a circumferential direction so as to set the phase of induced voltage generated on the salient pole wound around with the coil in each stage to a phase suitable for rotating a magnetic unit of the corresponding stage.

Thus the magnetic poles of a rotor magnetic unit as well as the salient poles of a core wound around with coil may be disposed splitted axially in K stages. Namely, the magnetic poles of magnetic unit and the salient poles of core wound around with coil were conventionally disposed on a same single plane; in the invented motor, however, the magnetic poles of magnetic unit and the salient poles of core wound around with coil may be disposed splitted on planes axially stacked in K stages. The above structure makes it possible to present a small and thin motor that has an improved efficiency and a higher degree of freedom when mounting in an apparatus.

A second exemplary device of the invention comprises a rotor which is formed with magnetic units stacked in K stages (K indicating any integer greater than one), the magnetized position of the N and S poles in magnetic unit at each stage deviating relative to one another in a circumferential direction, the rotor being held rotatable by a pair of bearings, and an outer case of an oblong shape composed of a pair of short sides facing to each other and a pair of long sides facing to each other in a cross sectional plane perpendicular to the axial direction of rotor. In which the rotor is penetrating through the outer case at the central part, and a core comprising K pieces of salient poles wound around with coil corresponding to the magnetic unit in that stage disposed on a straight line parallel to axial direction of the rotor is provided at least on one of the short sides of outer case.

With the above described structure, the magnetic poles of magnetic unit as well as the salient poles of a core wound around with coil may be disposed splitted in a direction of rotor shaft in K stages. In this way, the salient poles wound around with coil may be disposed only on the short sides of outer case. Therefore, the dimension of short side may be reduced to almost equal to outer diameter of the rotor. The above structure also makes it easier to increase the number of turns of the coil to be wound around the salient poles, to an improved efficiency of a motor. Further, because it is a brushless motor a higher operational reliability may be expected. Thus, a reliable and efficient motor may be presented in a thin configuration.

A third exemplary device of the invention comprises a rotor formed with magnetic units stacked in K stages (K indicating any integer greater than one), the magnetized position of the N and S poles in magnetic unit at each stage deviating relative to one another in a circumferential direction, the rotor being held by a pair of bearings, a core comprising salient poles wound around with coil corresponding to the magnetic unit of that stage stacked in K stages, and an outer case of an oblong shape composed of a pair of long sides facing to each other and a pair of short sides facing to each other in a cross sectional plane perpendicular to the axial direction of rotor. In which, a vibration is generated as a result of rotation of the rotor by an imbalancing weight attached thereon for rotating together.

Thus, the magnetic poles of magnetic unit as well as the salient poles of a core wound around with coil may be disposed splitted in a direction of rotor shaft in K stages. The outer case may have reduced dimensions in the cross sectional shape, with a wide range of freedom of taking an oblong or other desired shapes. Furthermore, it becomes easier to increase the number of turns of the coil to be wound around salient poles for an improved efficiency of a motor. The above factors enable to implement a small and efficient motor for generating vibration, whose outer case having a wide range of freedom in taking a desired cross sectional shape.

BRIEF DESCRIPTION OF THE DRAWINGS

FIG. 1(*b*) is a traversing cross sectional view of the motor. FIG. 5(*b*) shows the motor unfolded from inside the core.

FIG. 11(*b*) is a partially cut-away top view of the motor. FIG. 15(*b*) shows the motor unfolded from inside the core.

FIG. 20(*b*) is a traversing cross sectional view of the motor. FIG. 24(*b*) is a characteristics chart showing a relationship of square measure of the weight versus the weight outer diameter/shaft diameter. FIG. 24(*c*) is a characteristics chart showing a relationship of the centrifugal force of weight versus the weight outer diameter/shaft diameter.

FIG. 33(*b*) is a traversing cross sectional view of the motor.

FIG. 47(*b*) is a traversing cross sectional view showing core of the motor. FIG. 48(*b*) is a side view of the same. FIG. 48(*c*) is a plane view of the same. FIG. 52(*b*) is a bottom view of the same. FIG. 53(*b*) shows other case wherein the gravity centre is located between the two bearings FIG. 55(*b*) show load on the shaft where there are two imbalancing weights.

FIG. 59(*b*) is a chart showing the motor unfolded from inside the core. FIG. 61(*b*) is a traversing cross sectional view of the same. FIG. 62(*b*) is a lengthwise cross sectional view of the same.

BEST MODE FOR CARRYING OUT THE INVENTION

In the following, description is made on exemplary embodiments of the invention with reference to drawings.

Figure 1A:
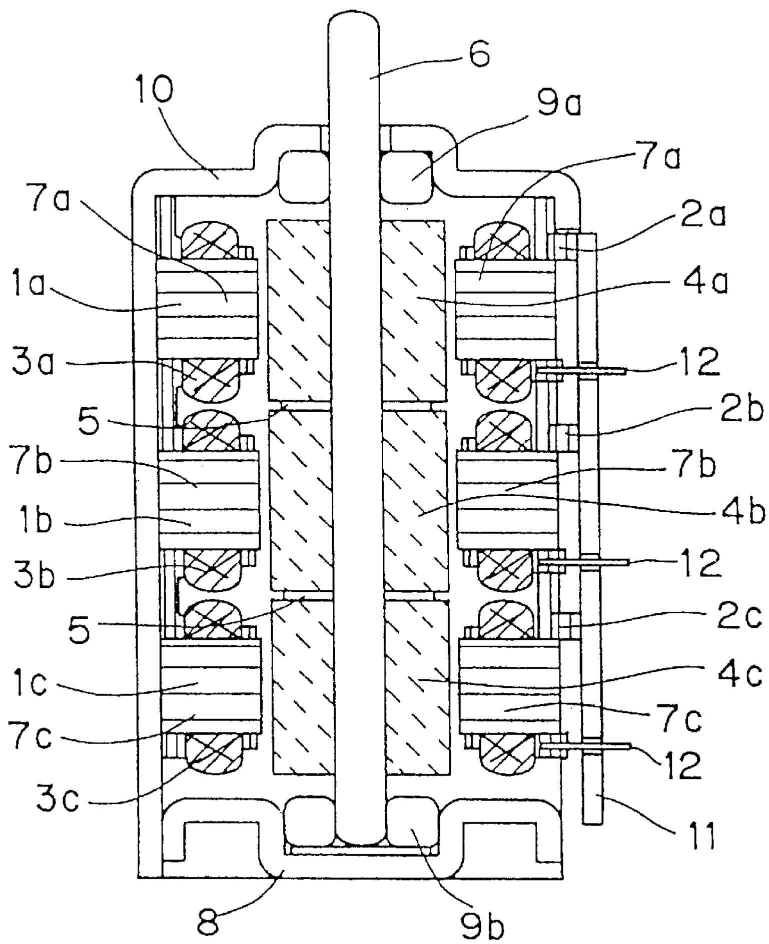
FIG. 1(*a*) is a lengthwise cross sectional view of a motor in accordance with a first exemplary embodiment of the present invention.
Figure 1B:
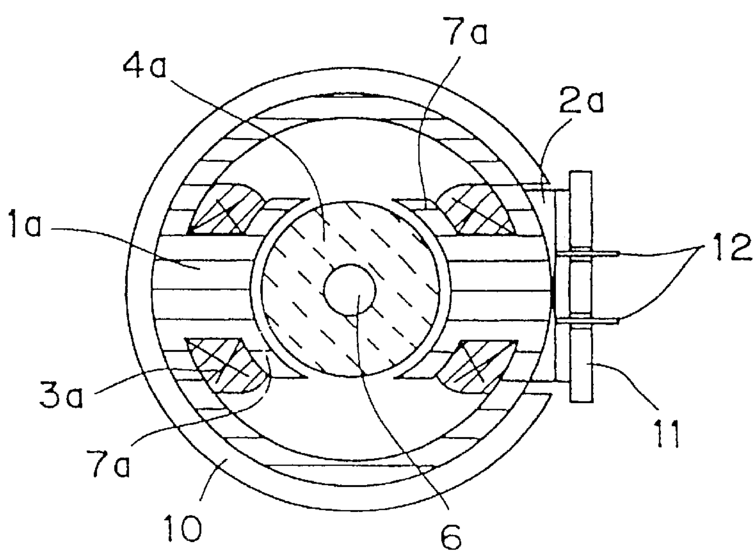

FIG. 1 is a cross sectional view of a motor in accordance with a first exemplary embodiment of the present invention.

As shown in FIG. 1, a rotor is comprised of magnetic units 4*a*, 4*b* and 4*c* of empty cylindrical shape each having the magnetized N and S poles, stacked with a spacer 5 in between the units and fixed one another around a shaft 6 penetrating in the empty area, one end of the shaft 6 being supported by a bearing 9*a* provided on a frame case 10 while the other end by a bearing 9*b* provided on a bracket 8. Thus an inner-rotor structure supported at both ends is formed.

Cylindrical cores 1*a*, 1*b* and 1*c* having bipolar magnetic salient poles 7*a*–7*c* are made by placing a press-formed silicon steel sheet one over another in the thrusting direction. The cores are insulated each other with resin insulators 2*a*, 2*b* and 2*c*. Each of the insulators 2*a*, 2*b* and 2*c* has a terminal pin 12 formed as an integral part of the insulator; the beginning and the end of winding of coil 3*a*, 3*b*, 3*c* are wound around the terminal pin 12 for several turns and soldered thereto. This makes the automatic assembly easier.

The cores 1*a*–1*c* are serially connected together using aligning pins formed by making a part of the insulators 2*a*–2*c* extruded, and then inserted to be fixed in the inside of the frame case 10 whose shape is cylindrical with one end closed. The terminal pins 12 are connected with coils 3*a*, 3*b* and 3*c*, respectively, and are fixed to a board 11 by soldering. To the open end of frame case 10, a bracket 8 having a bearing 9*b* fixed thereon is inserted and fixed.

Figure 2:
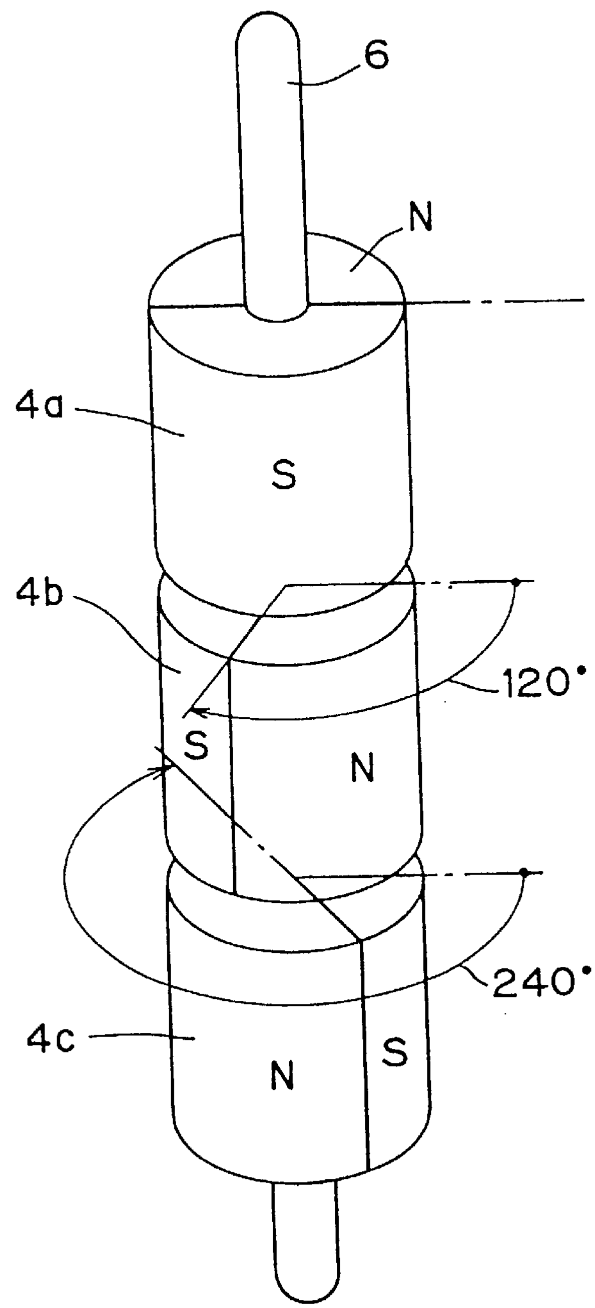
FIG. 2 is a perspective view showing the magnetized state in magnetic units of the motor.

FIG. 2 shows a state of magnetization of rotor magnet in the above motor.

In the rotor magnet comprised of magnetic units 4*a*, 4*b* and 4*c* stacked in three stages, magnetized position of the N and S poles of the magnetic unit at each stage deviates relative to one another by 120 in a circumferential direction, as shown in FIG. 2.

Figure 3A:
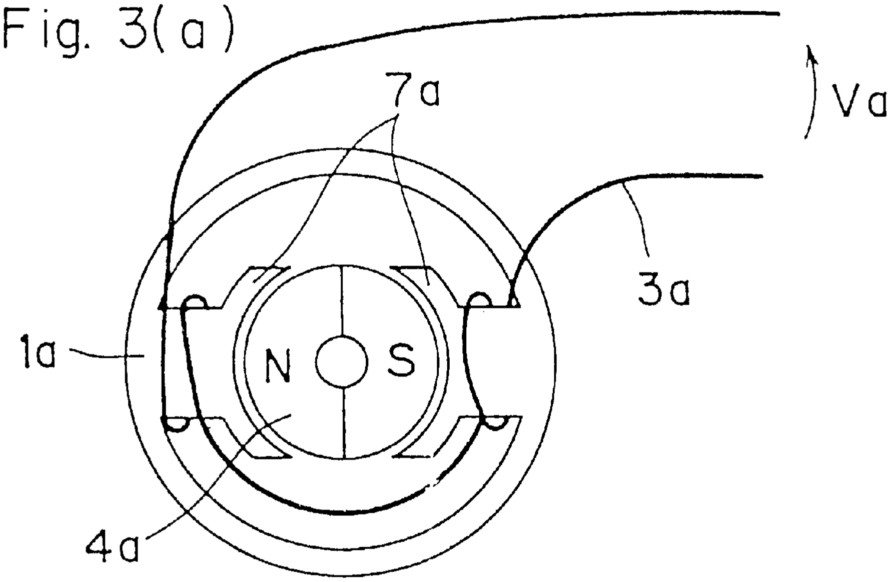
FIG. 3 illustrates a relationship among the magnetic units, the salient poles of core and the coils.
Figure 3B:
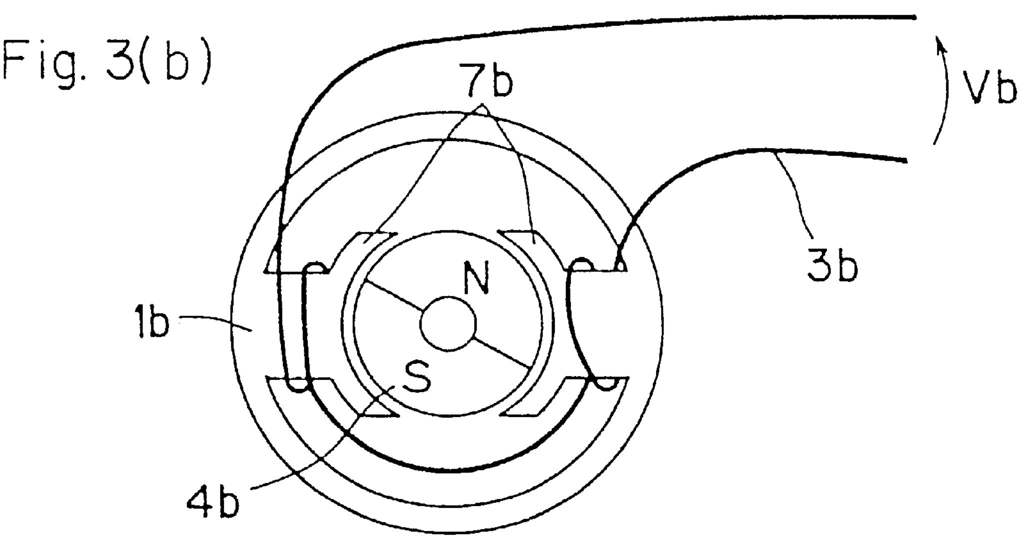
Figure 3C:
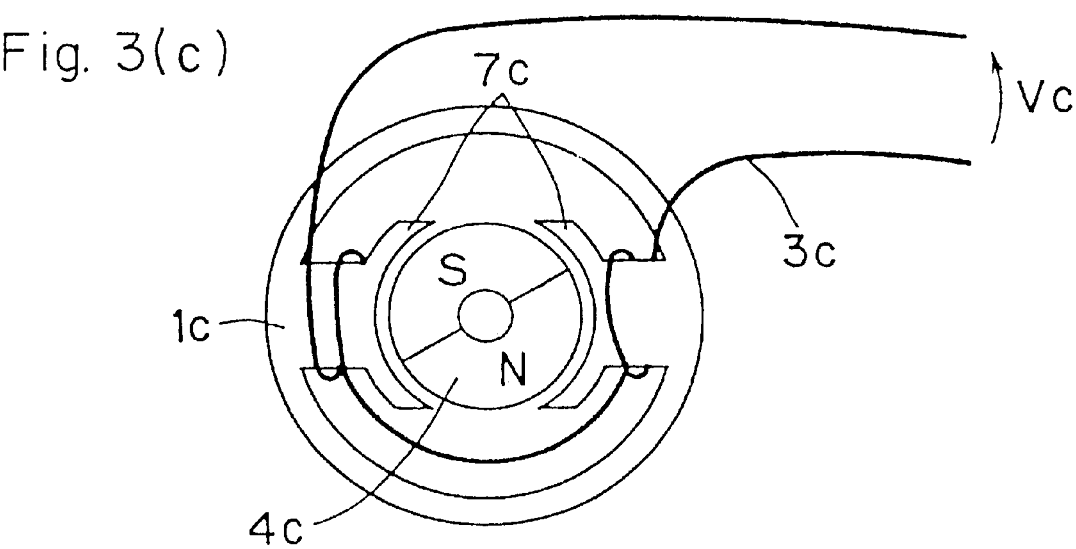

FIG. 3 is charts showing the mutual relationship among the magnetic units 4*a*, 4*b*, 4*c*, the cores 1*a*, 1*b*, 1*c*, and the coils 3*a*, 3*b*, 3*c*.

As shown in FIG. 3 and FIG. 1, the pair salient poles 7*a*, 7*b*, 7*c* of cores 1*a*, 1*b*, 1*c* are located with a same circumferential positioning, and are disposed on a straight line queue in a lengthwise direction; at each of the cores 1*a*, 1*b*, 1*c*, the respective pair salient poles 7*a*, 7*b*, 7*c* are wound around with one piece of conductive wire continually one after the other in a same winding direction, and the coils 3*a*, 3*b*, 3*c* are formed as shown in FIG. 3.

Figure 4:
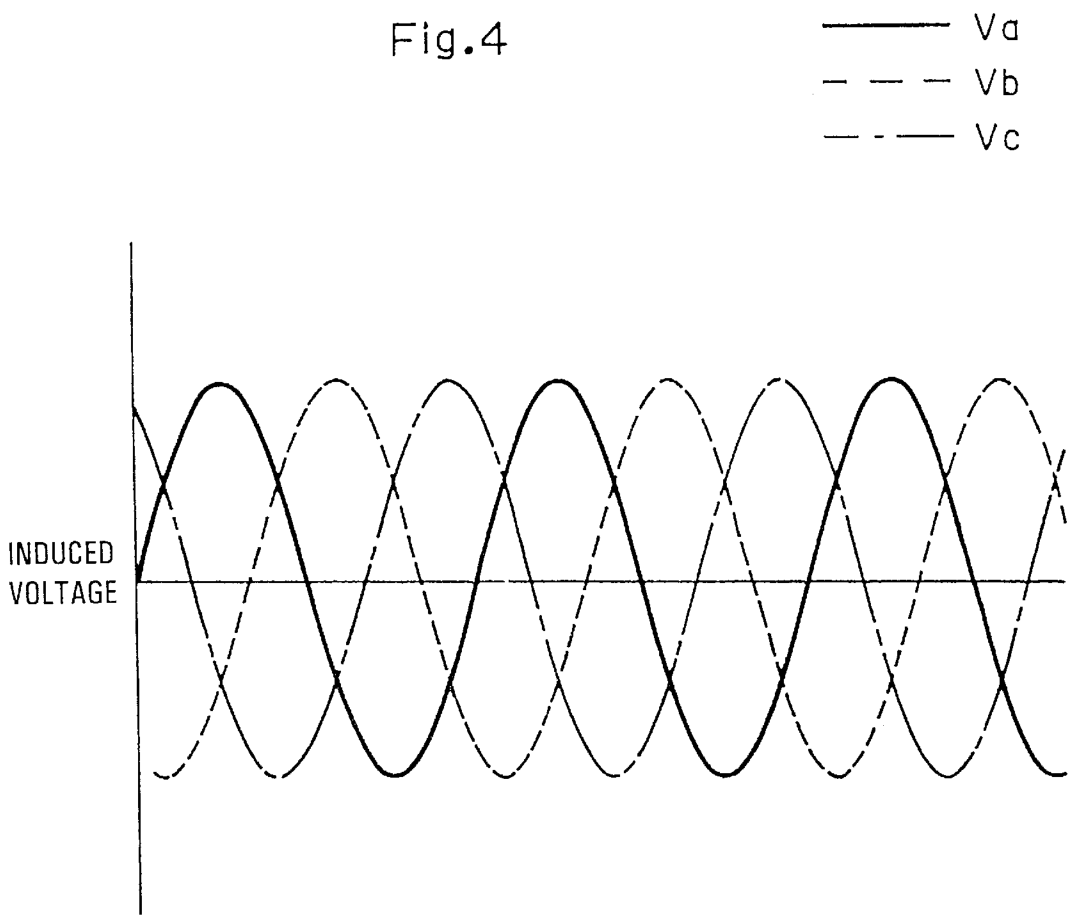
FIG. 4 is a waveform chart showing the induced voltage in the motor.

FIG. 4 is a waveform chart showing the induced voltage generated in each of the coils 3*a*, 3*b*, 3*c* when the magnetic units 4*a*, 4*b*, 4*c* are put in rotation.

As seen from the FIG. 4, the phase of induced voltages Va, Vb, Vc generated at coils 3*a*, 3*b*, 3*c* is shifted relative to one another by 120 , reflecting the circumferential deviation of 120 in the magnetic units 4*a*, 4*b*, 4*c*. One coiling end of each of the coils 3*a*, 3*b*, 3*c* is connected together forming a common terminal called COM. The other ends of the respective coils are assigned respectively to the three phases to be electrically driven by an electronic circuit provided on the board 11 in accordance with the induced three-phase voltage. Thus a torque is generted and the magnetic units 4*a*, 4*b*, 4*c* are rotated, or it is driven as a three-phase brushless motor. The electronic circuit on the board 11 is supplied from a DC supply source.

Figure 5A:
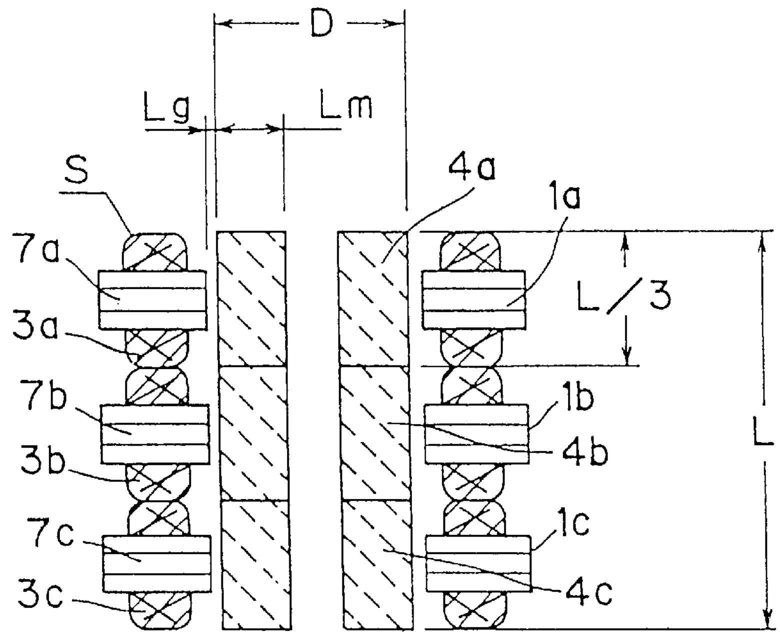
FIG. 5(*a*) is a simplified cross sectional view showing a magnetic circuit of the motor.
Figure 5B:
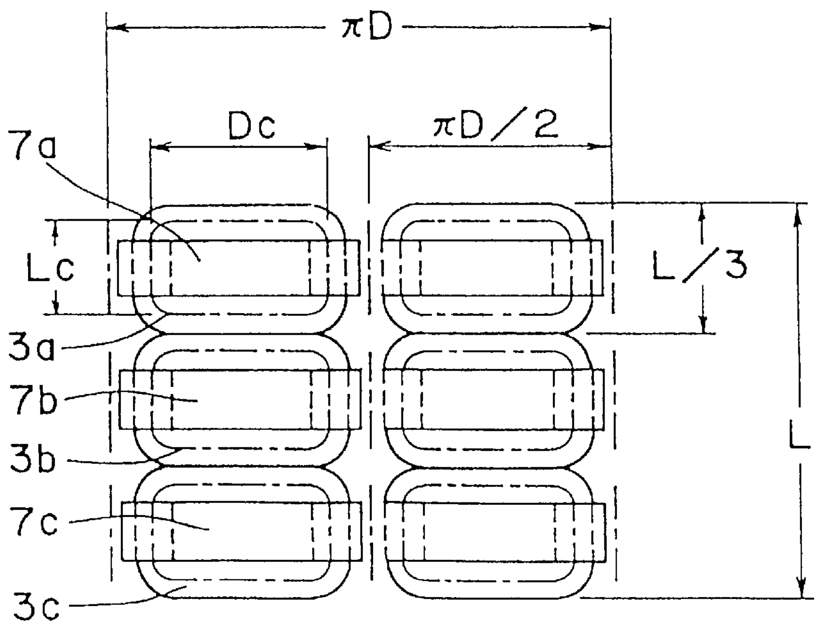

FIG. 5(*a*) is a cross sectional view of a simplified magnetic circuit in the above brushless motor. FIG. 5(*b*) is a chart showing the motor unfolded from inside the core. For the simplification of explanation, the leakage of magnetic flux is ignored in the following description.

An inverse number of the velocity shift rate $\mu$ is often used to represent the efficiency $\eta$ of a motor. A following Formula 7 is generally established with respect to the velocity shift rate $\mu$, as already described in the background art:

$$\eta = \frac{1}{\mu} = \frac{\Phi^2 T^2}{R} \tag{7}$$

where; Φ denotes effective magnetic flux, T is number of coil turns, R is coil resistance.

The effective magnetic flux Φ is expressed in the following Formula 8.

$$\Phi = \pi D L B g \tag{8}$$

where; D denotes the outer diameter of rotor, L is the length of rotor, Bg is the density of magnetic flux at gap.

The density of magnetic flux Bg at gap is expressed in the following Formula 9.

$$Bg = \frac{Br}{1 + \frac{\mu r}{Lm / Lg}} \tag{9}$$

where; Br, $\mu$ r are called respectively residual flux density, recoil magnetic permeability. These are the constants specific to a magnetic material. Lm is thickness of magnet, Lg is air gap between magnet and core.

The relationship between the number of coil turns T and the coil resistance R is represented in Formula 10.

$$R = \frac{2kT^2 l}{S} \tag{10}$$

where; k denotes electric conductivity of coil, which is a constant determined proportionate to the space factor of coil. l represents average coil length per one turn, S is cross sectional area of coil.

The l is represented by Formula 11, ignoring the coil resistance.

$$l = 2(Lc + Dc) \approx 2\frac{L}{3} + \frac{\pi}{2}D \tag{11}$$

where: Lc denotes height of coil, Dc is coil width.

By substituting the Formula 8, Formula 9, Formula 10 and Formula 11 for Formula 7, the following Formula 12 is obtained:

$$\eta = \left(\pi D L \frac{Br}{1 + \frac{\mu r}{Lm / Lg}}\right)^2 \cdot \frac{S}{4k\left(\frac{L}{3} + \frac{\pi}{2}D\right)} \tag{12}$$

There is no component representing the coil resistance R nor the number of coil turns T contained in the above Formula. It indicates that the efficiency does not change by a change in the specifications of coil winding.

Figure 6:
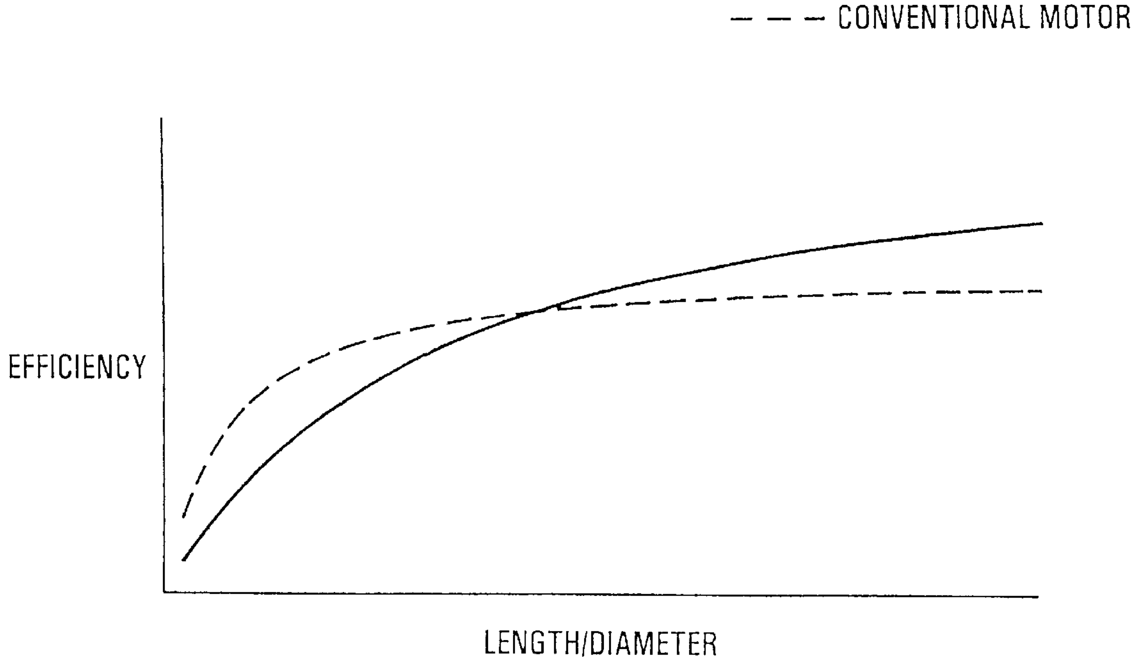
FIG. 6 is a graph used to compare the motor with a conventional brushless motor in terms of efficiency

In the above formula, when the rotor length L, rotor diameter D are varied so as the volume of rotor($\pi D^2$ L/4) remains constant, with other variables fixed, the relationship between the length/diameter of rotor(L/D) and the efficiency η is as shown in FIG. 6. In FIG. 6, the dotted line represents a conventional inner-rotor type brushless motor. As seen from the FIG. 6, efficiency of the invented motor is inferior to that of conventional brushless motor when the rotor is short, but it improves with a longer rotor; the efficiency curves cross at a certain point and the efficiency with the latter goes higher. At an ultimate convergent value, viz. L/D=infinite in Formula 12, the efficiency of invented motor reaches as high as 1.5 times that the conventional motor.

Figure 7A:
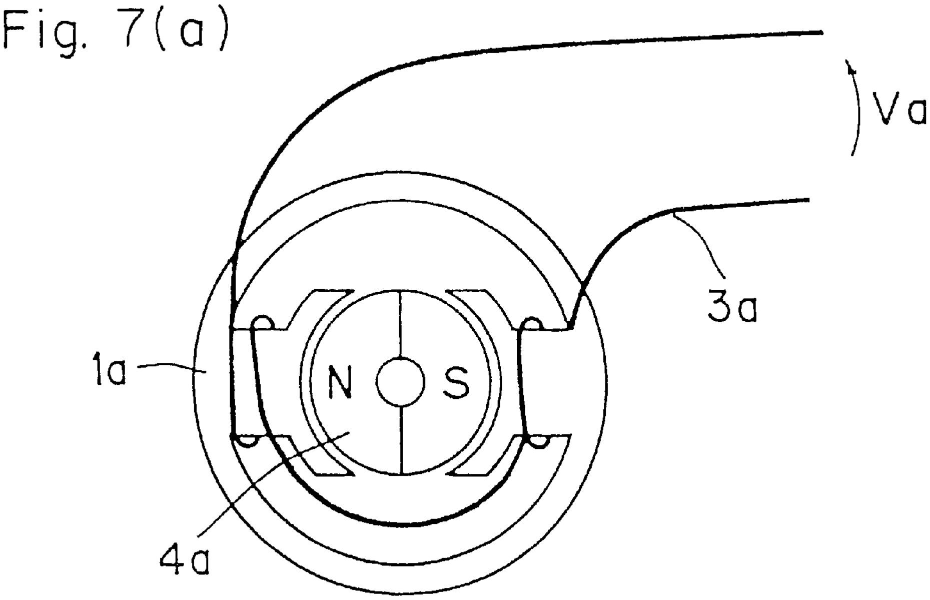
FIG. 7 is a chart showing relationship among the magnetic units, the salient poles of core and the coils when magnetized position of the magnetic units deviates by 60 relative to one another
Figure 7B:
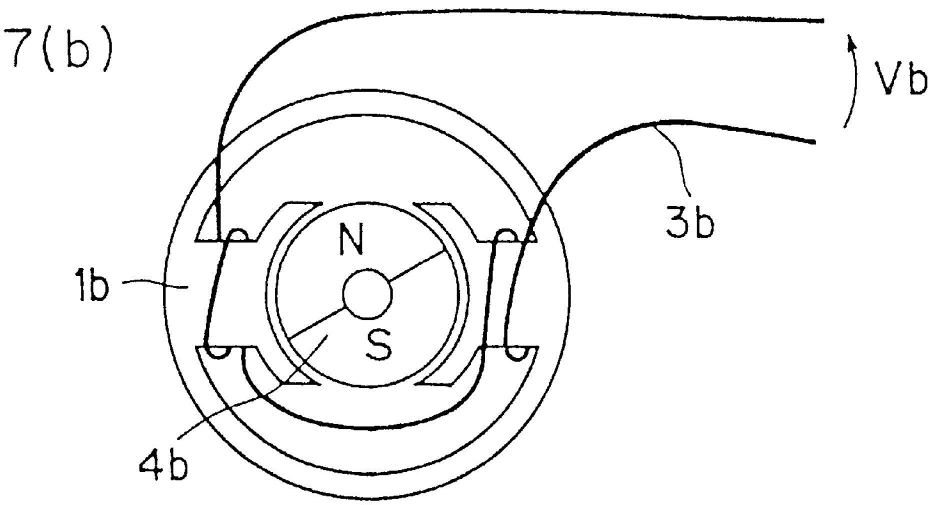
Figure 7C:
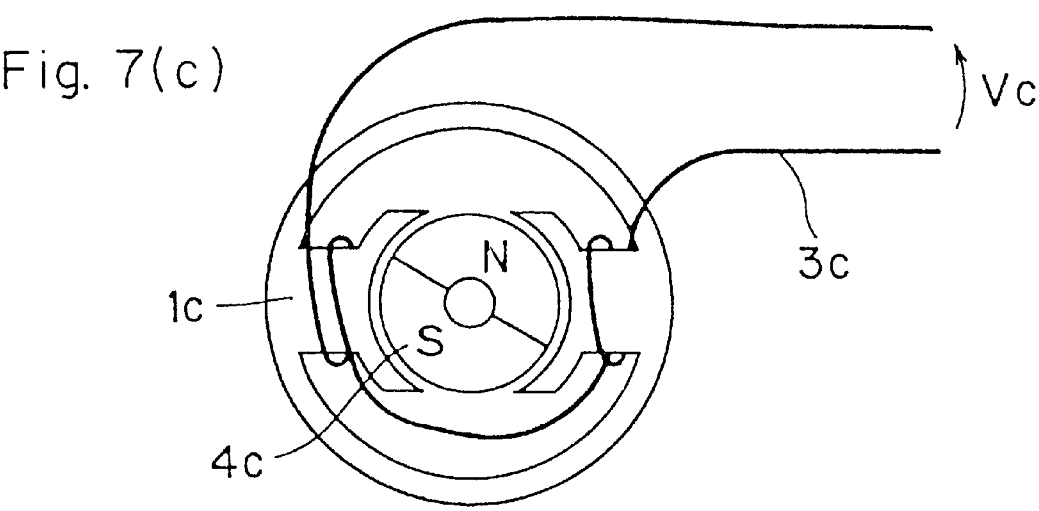
Figure 8:
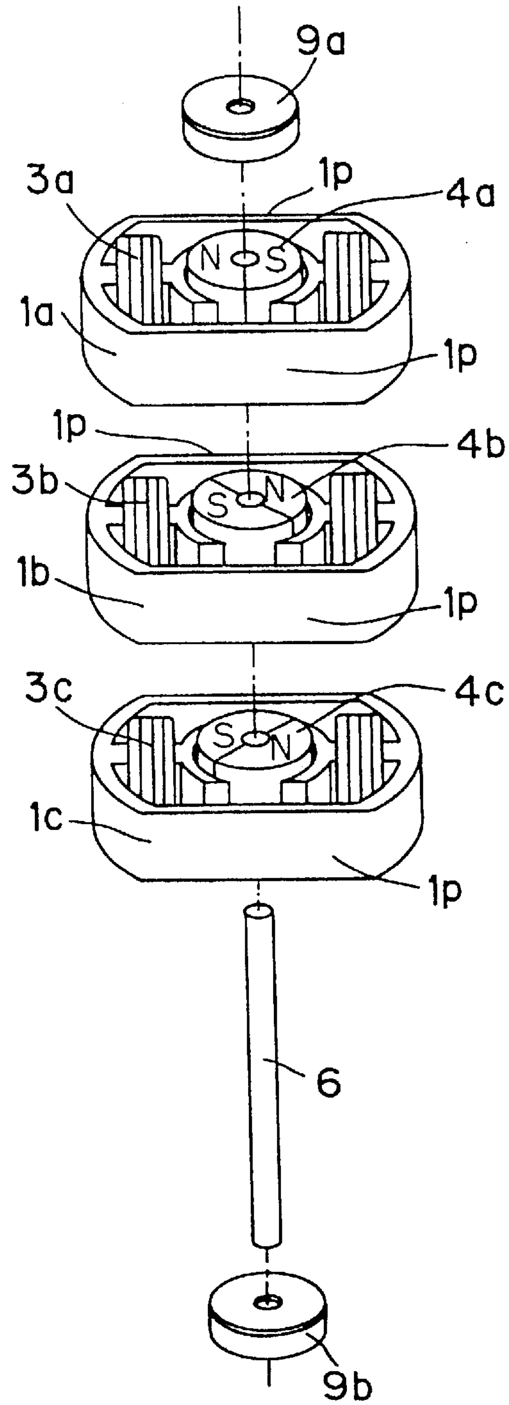
FIG. 8 is an exploded perspective view of a motor which has a flat portion on the outer surface.

In the above described exemplary embodiment, the magnetic units 4*a*, 4*b*, 4*c* have been magnetized respectively with deviation of 120 relative to one another. They may be magnetized also with a deviation of 60. In the latter case, the winding direction of coils 3*a*, 3*c* has to be made inverse to that of coil 3*b* as shown in FIG. 7, or connection of the coils be reversed while keeping the winding direction as it is; by so doing, the phase of induced voltage is shifted for 120 , making the three-phase drive possible.

Although in FIG. 1 round-shape cores 1*a*, 1*b*, 1*c* are exemplified, they may be shaped to have a flat portion 1*p* at the outer circumference. With the cores of such a shape, a motor may have a good stability when mounted in an apparatus.

Although in the present embodiment the phase of induced voltage in respective three stages has been set to deviate relative to one another for 120 by shifting the direction of magnetization, the 120 deviated phase may be obtained also by shifting the direction of the salient poles 7*a*, 7*b*, 7*c* of cores 1*a*, 1*b*, 1*c* relative to one another with the direction of magnetization of the magnetic units 4*a*, 4*b*, 4*c* kept in one direction, or by shifting the direction of both the salient poles 7*a*, 7*b*, 7*c* of cores 1*a*, 1*b*, 1*c* and the magnetic units 4*a*, 4*b*, 4*c* relative to one another at each stage. Under any one of the above configurations a motor may operate as a three-phase brushless motor. When both the salient poles 7*a*, 7*b*, 7*c* of cores 1*a*, 1*b*, 1*c* and the magnetic units 4*a*, 4*b*, 4*c* are shifted in the direction relative to one another at each stage, among other cases, it may become possible to suppress the overall height of a motor further by housing the coils of top and bottom cores 1*a*, 1*c* within a slot portion of the core 1*b* located in between. This may offer another step to make a motor smaller.

Although in the present embodiment a motor has been described to have a three-stage structure, it may also be structured in K stages(K=2, 3, 4 . . . ). Thus the invention may be carried out generally as a K-phase brushless motor.

Now in the following, a second exemplary embodiment of the invention is described with reference to FIG. 9 and FIG. 10. In the second embodiment, the number of magnetized poles of a magnetic unit is not two, but a number more than that. The structures of the motor remain the same as those of the first embodiment above, with the exceptions in the number of magnetized poles in magnetic unit, the corresponding salient poles of each core and the coils.

Figure 9:
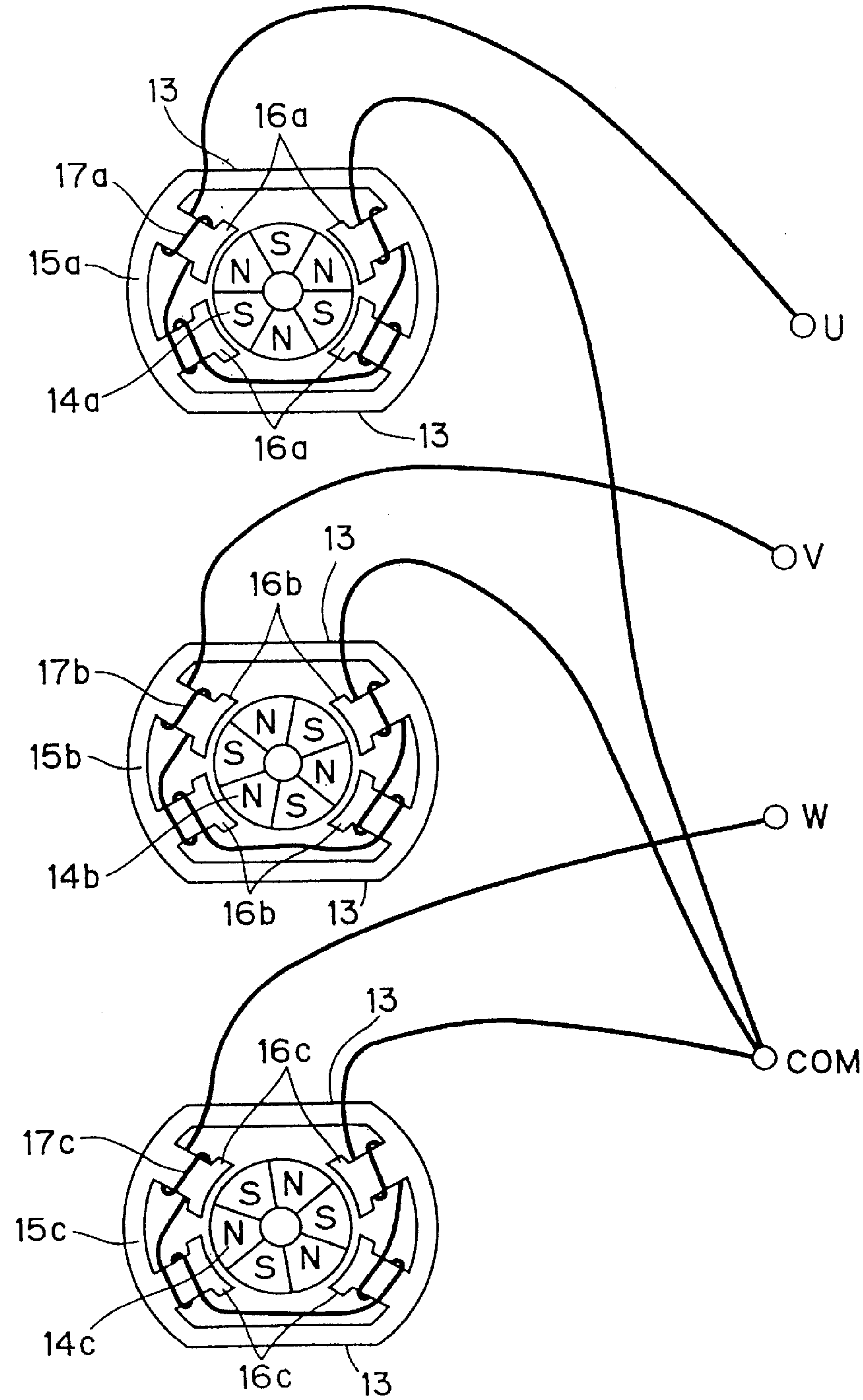
FIG. 9 is a chart used to explain a relationship among the magnetic units, the salient poles of core and the coils of a motor in accordance with a second exemplary embodiment of the invention.

FIG. 9 shows a relationship among magnetic units, cores and coils in a motor where magnetic units 14*a*, 14*b*, 14*c* have six magnetized poles, and the number of magnetic poles in salient poles 16*a*, 16*b*, 16*c* of cores 15*a*, 15*b*, 15*c* is four. A common connection terminal of each of coils 17*a*, 17*b*, 17*c* is represented by a symbol COM, the other end terminals by symbols U, V, W, respectively. The same applies to FIG. 10.

Shown in FIG. 9 are six-pole cylindrical magnetic units 14*a*, 14*b*, 14*c*, each having the N and S poles magnetized with a 60 angular pitch in a circumferential direction, and cores 15*a*, 15*b*, 15*c*, each having salient poles 16*a*, 16*b*, 16*c* of four magnetic poles disposed with the same angular pitch as the magnetized pitch of magnetic units 14*a*, 14*b*, 14*c* so as to correspond to two pairs of the magnetized poles, two poles at one side and the other two poles at the other side facing to each other as illustrated; the cores stacking up axially in three stages.

With the above structure, it turns out easy to provide the cores 15*a*, 15*b*, 15*c*, with a flat portion 13, as illustrated. In this way, one of the dimensions in the direction of diameter may be reduced even in a multi-slot motor. Namely, an oval-shaped motor may be designed with ease.

Figure 10:
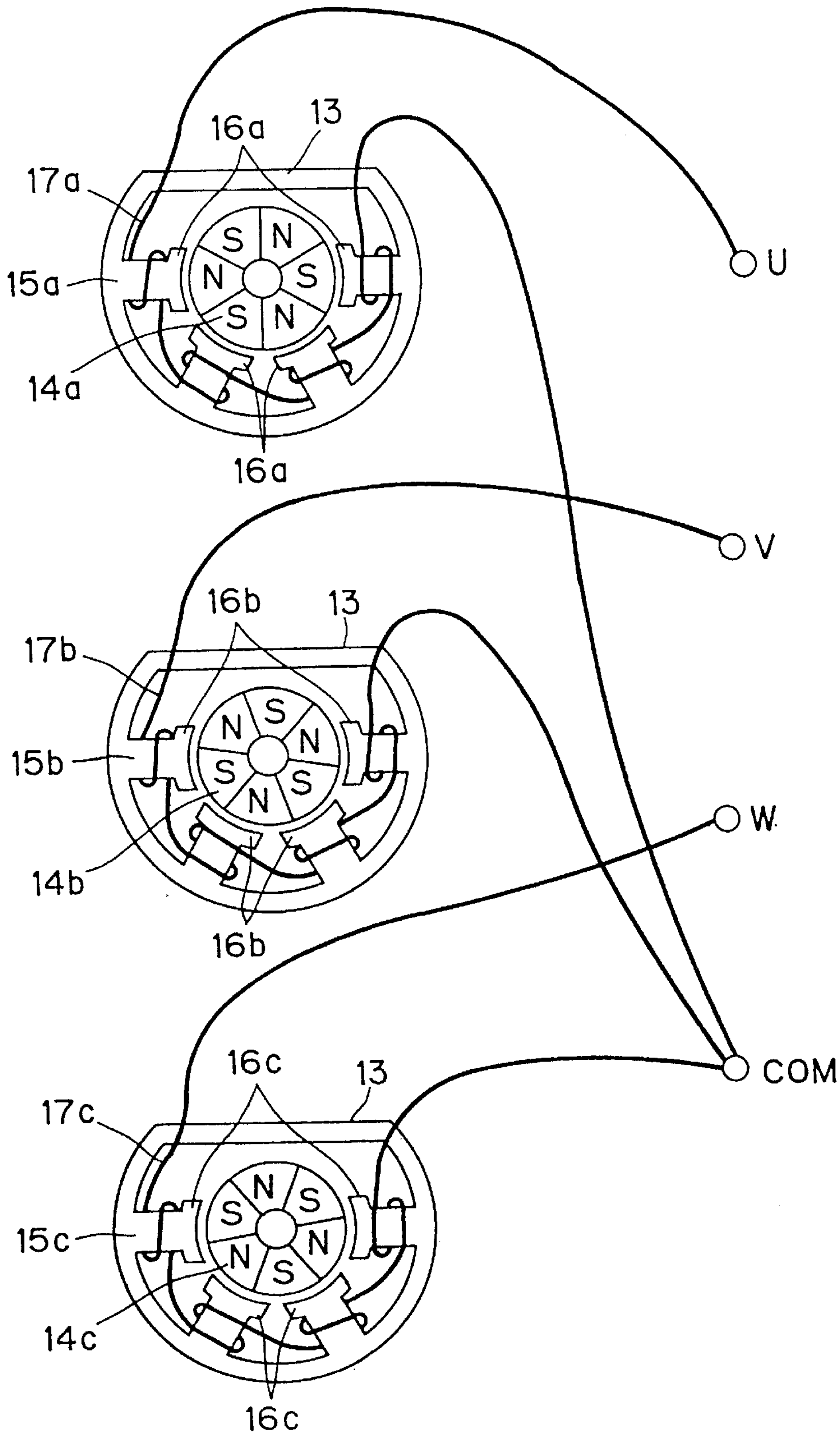
FIG. 10 is a chart used to explain a relationship among the magnetic units, the salient poles of core and the coils of other motor in accordance with a second exemplary embodiment of the invention.

FIG. 10 shows other exemplary configuration of the magnetic units, cores and coils in a motor comprised of six-pole magnetic units 14*a*, 14*b*, 14*c* and cores 15*a*, 15*b*, 15*c* having four-pole salient poles 16*a*, 16*b*, 16*c*.

Shown in FIG. 10 are six-pole cylindrical magnetic units 14*a*, 14*b*, 14*c*, each having the N and S poles magnetized with a 60 angular pitch in a circumferential direction, and cores 15*a*, 15*b*, 15*c*, each having salient poles 16*a*, 16*b*, 16*c* of four magnetic poles disposed with the same angular pitch of magnetic units 14*a*, 14*b*, 14*c* so as to correspond to two pairs of the magnetized poles, the four poles of salient poles 16*a*, 16*b*, 16*c* being placed concentrated in one side as illustrated; the cores stacking up axially in three stages.

With the above structure, one dimension from axial centre of cores 15*a*, 15*b*, 15*c* to a side may be reduced to be smaller than the counterpart dimension, as illustrated. A motor of such configuration may be advantageous when used, for example, as the spindle motor of an optical disk device, where the mounting space is limited in one of the circumferential directions; namely, within a given height, eventual size of a motor may be made larger, for a greater output.

As described in the above, a three-phase brushless motor may be implemented even if the number of poles in magnetic units 14*a*, 14*b*, 14*c* is different from that of salient poles of cores 15*a*, 15*b*, 15*c*; by combining three cylindrical magnetic units each having the N and S poles magnetized for 2n poles(n indicating any integer not smaller than one) in a circumferential direction with an equal angular pitch, and three cores each having salient poles of 2m poles(m indicating any integer not smaller than one, m≦n), disposed with a same magnetizing pitch of the magnetic units so as to correspond to m magnetized poles, stacked in axial direction for three stages, with the angle between the magnetization of magnetic unit and the core deviating by 120/n relative to one another at each of the stages.

Although in the above exemplary embodiment a motor has been structured in three stages, it may of course take K stages (K=2,3,4 . . . ). The invention may be applied generally to any K-phase brushless motors.

Figure 11:
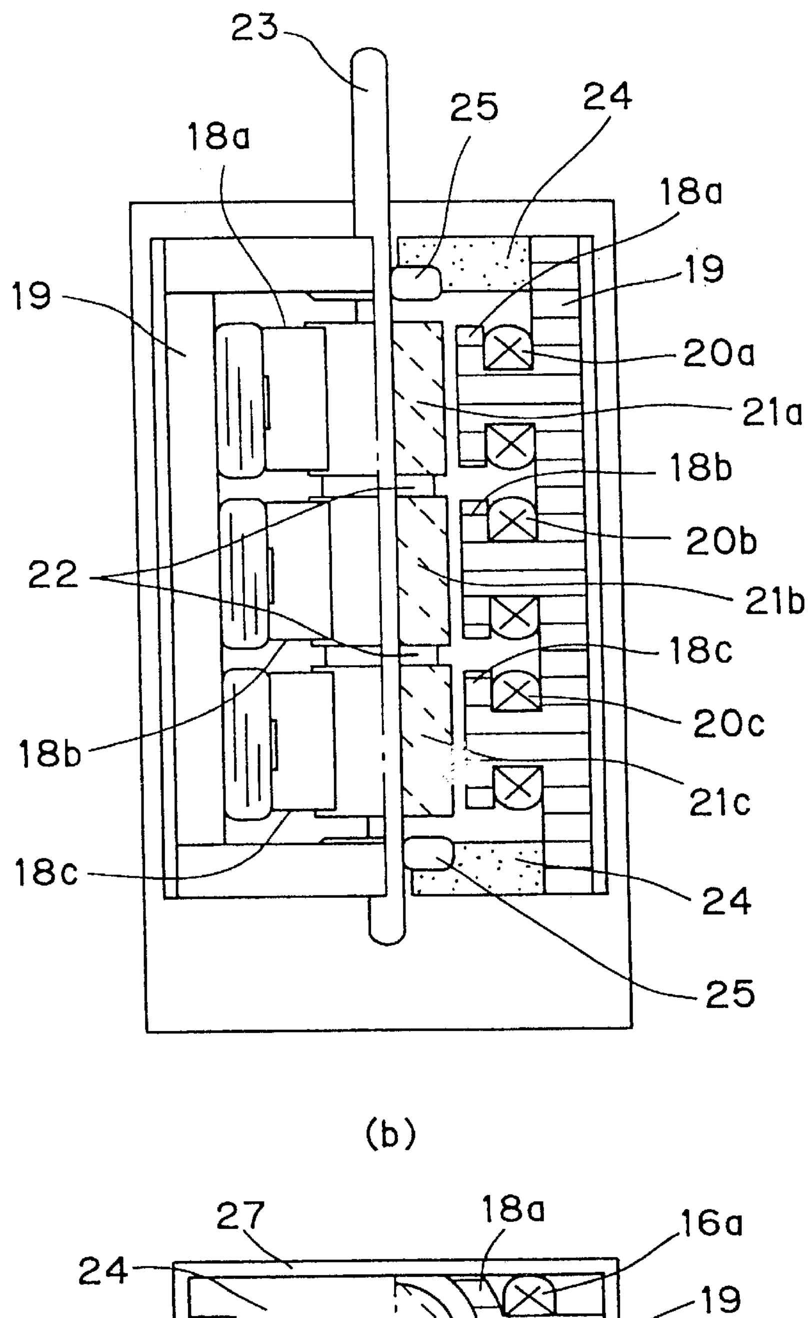
FIG. 11(*a*) is a lengthwise cross sectional view of a motor in accordance with a third exemplary embodiment of the invention.
Figure 11:
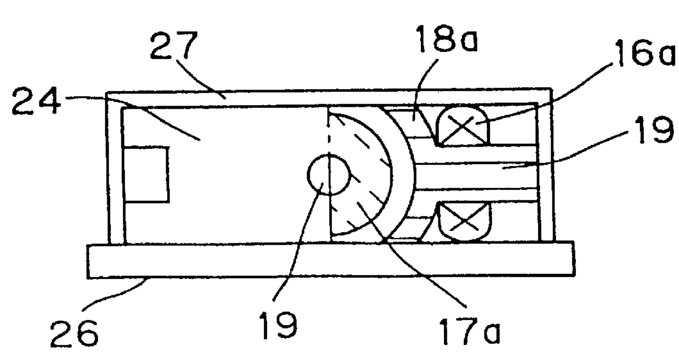

A third exemplary embodiment of the invention is described in the following referring to FIG. 11–FIG. 17. As shown in FIG. 11, a rotor is comprised of magnetic units 21*a*, 21*b* and 21*c* of empty cylindrical shape, stacked in three stages with a spacer 22 in between and fixed around a shaft 23 penetrating through the empty area of each of the magnetic units 21*a*, 21*b* and 21*c*, the shaft 23 being supported at both ends by a bearing 25 attached on a frame 24. Thus an inner-rotor structure supported at both ends is formed.

Two cores 19 positioned at both sides are provided each with three salient poles 18*a*, 18*b*, 18*c*, being shaped out of an iron chunk by a cutting process to form a straight line queue of three, and magnetic circuits connecting the salient poles. These are insulated with an electrostatic coating. After winding coils 20*a*, 20*b*, 20*c* around the salient poles 18*a*, 18*b*, 18*c*, the cores 19 are inserted to the frame 24 at both ends, and the terminal ends of coils 20*a*, 20*b*, 20*c* are soldered to a board 26 on which a connection pattern is printed. A cover 27 forms a part of outer case.

Figure 12:
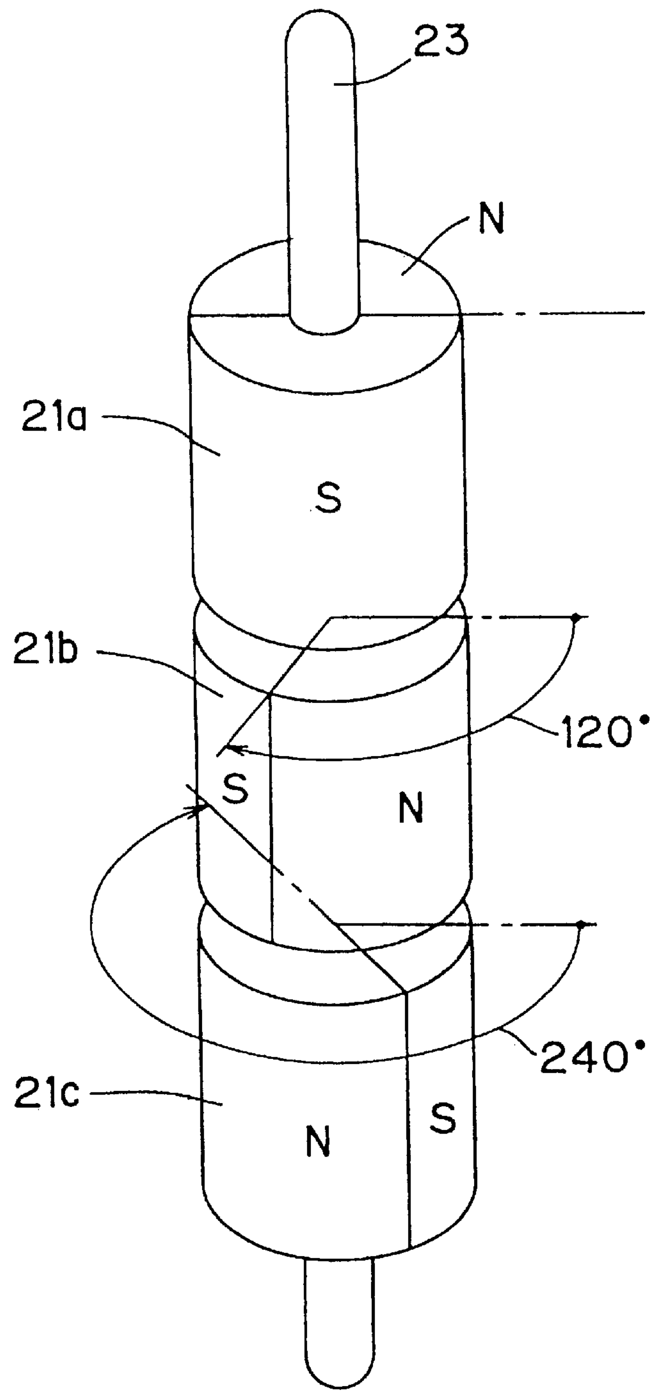
FIG. 12 is a perspective view showing magnetized state in magnetic units of the motor.

FIG. 12 shows the state of magnetization of magnetic units in the above motor.

As shown in FIG. 12, the magnetized position of the N and S poles of the magnetic units 21*a*, 21*b*, 21*c* at each stage deviates relative to one another by 120 in a circumferential direction.

Figure 13:
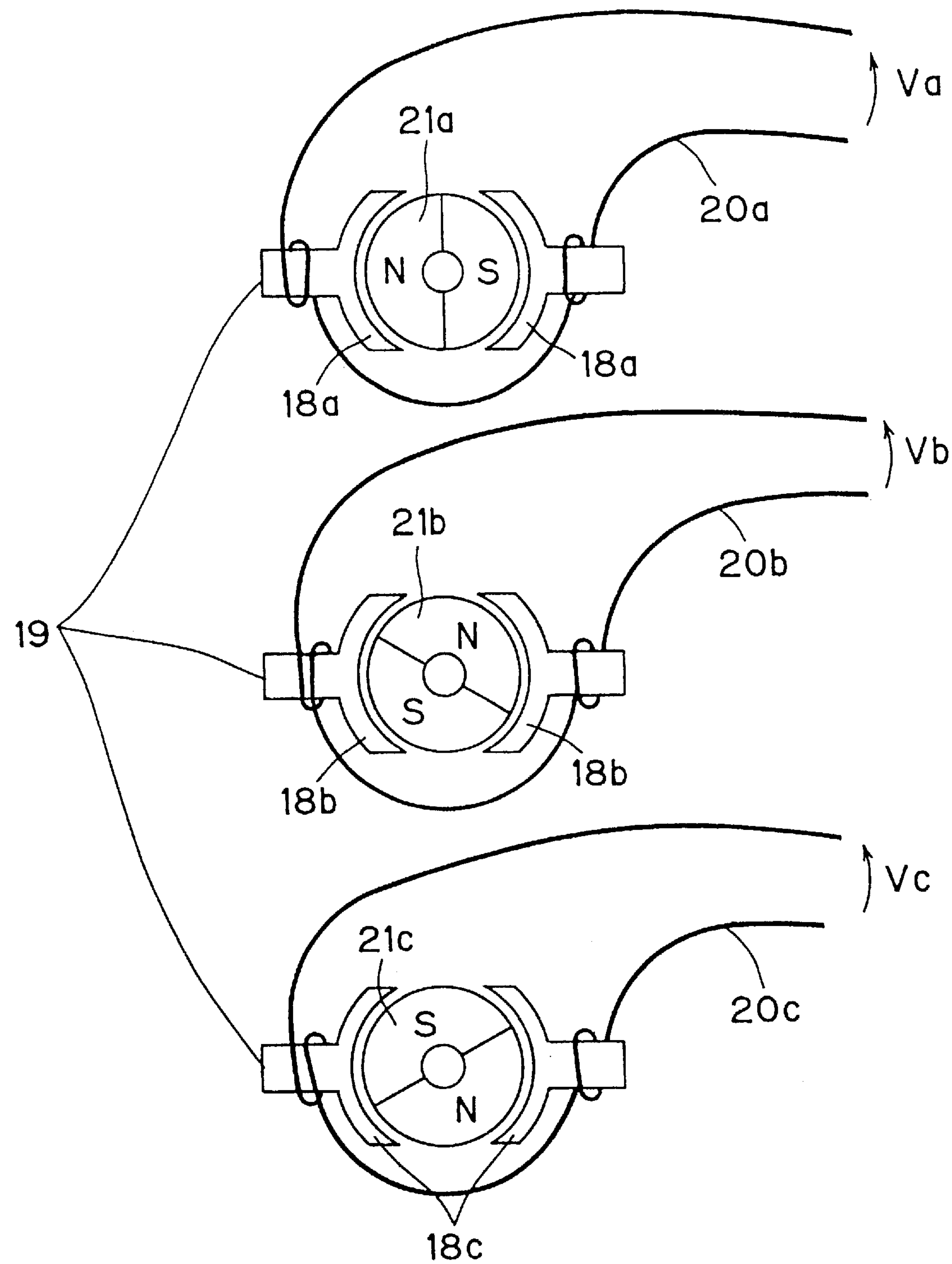
FIG. 13 illustrates a relationship among the magnetic units, the salient poles of core and the coils.

FIG. 13 shows a relationship among the magnetic units 21*a*, 21*b*, 21*c*, the salient poles 18*a*, 18*b*, 18*c* of core 19, and the coils 20*a*, 20*b*, 20*c*.

As shown in FIG. 13, coils 20*a*, 20*b*, 20*c* are coupled to form one group respectively corresponding to each of the stages of magnetic units 21*a*, 21*b*, 21*c*.

Figure 14:
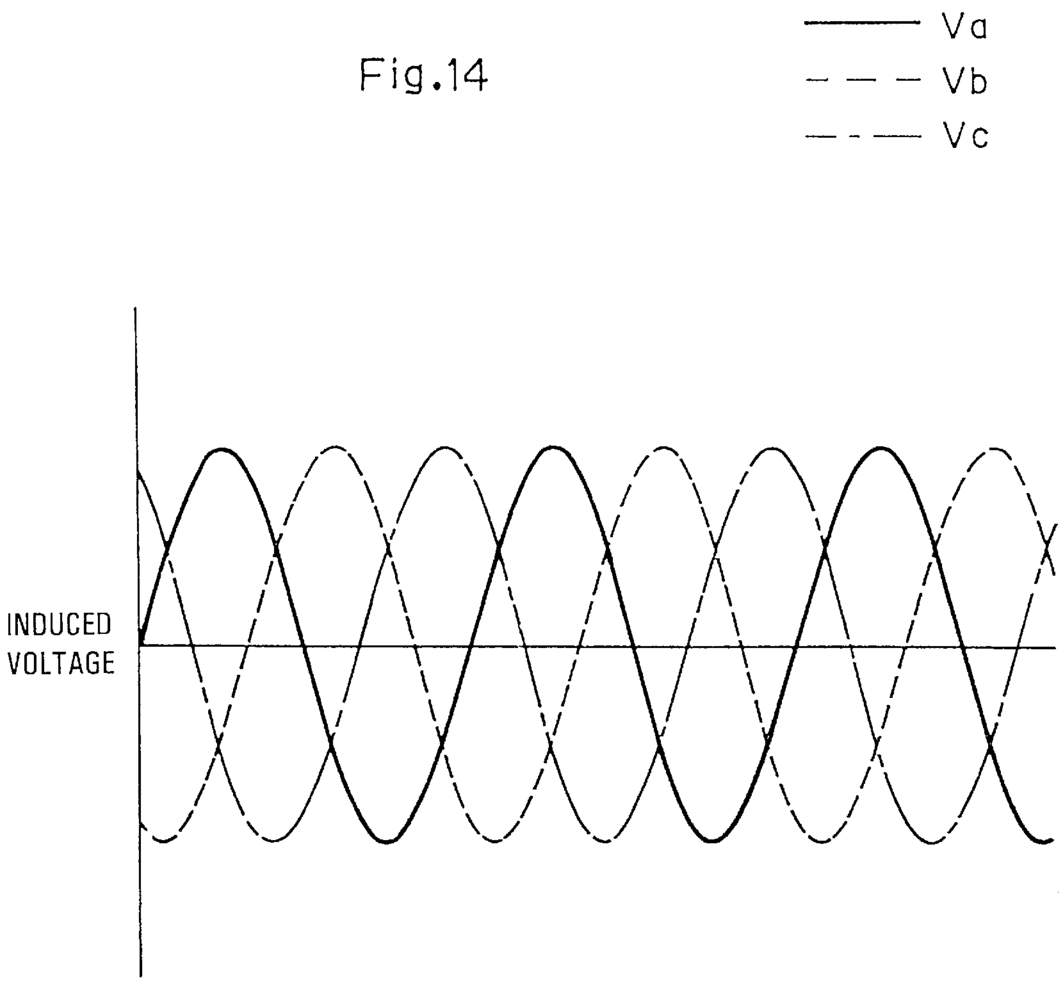
FIG. 14 is a waveform chart showing induced voltage of the motor.

FIG. 14 is a waveform chart showing the induced voltages generated in each of the coils by a rotating rotor. As seen from the FIG. 14, the phase of induced voltages Va, Vb, Vc generated at coils 20*a*, 20*b*, 20*c* is shifted relative to one another by 120, reflecting the circumferential deviation of magnetization by 120 in the magnetic units 21*a*, 21*b*, 21*c*. One terminal end of each of the coils 20*a*, 20*b*, 20*c* is connected together forming a common terminal called COM. The other terminal ends of the respective coils are assigned respectively to the three phases to be electrically driven by an electronic circuit in accordance with the induced three-phase voltage. Thus a torque is generated and the magnetic units are rotated, or it is driven as a three-phase brushless motor.

Figure 15:
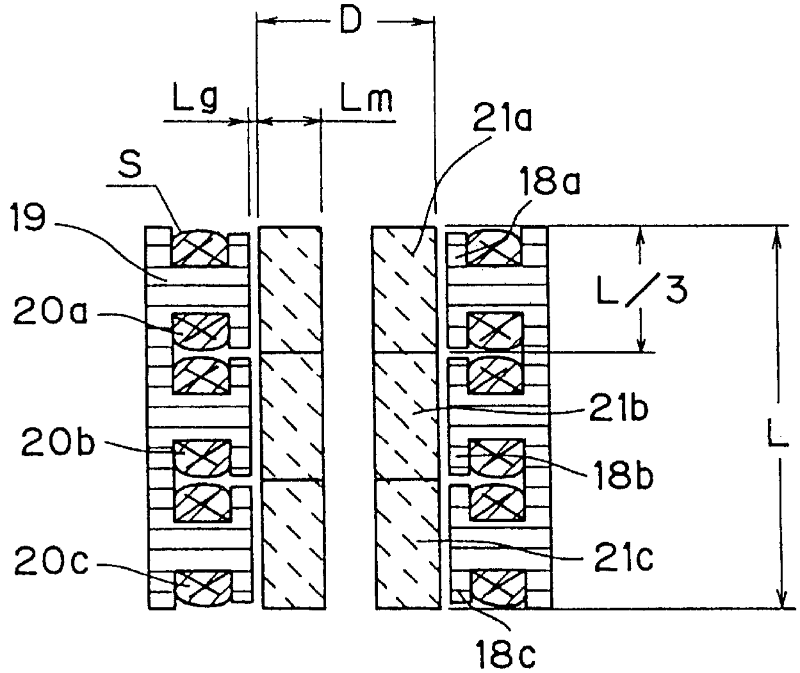
FIG. 15(*a*) is a simplified cross sectional view of magnetic circuit of the motor.
Figure 15:
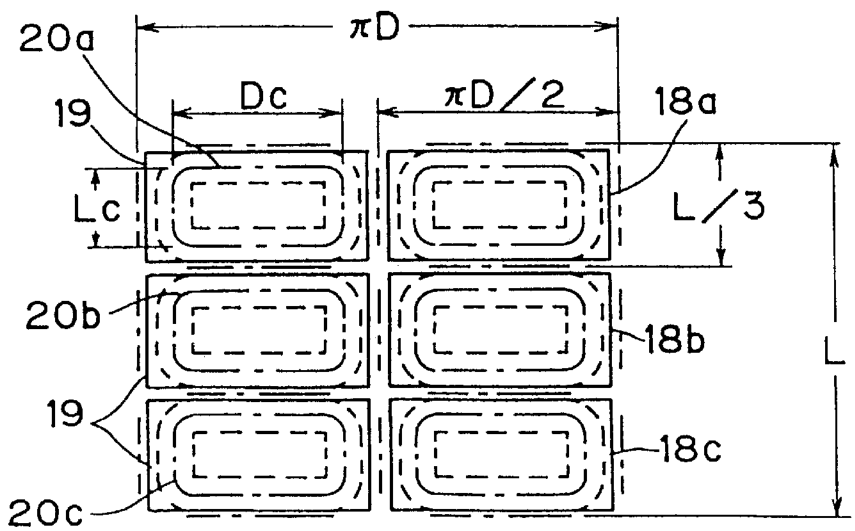

FIG. 15(*a*) is a cross sectional view of a simplified magnetic circuit in the invented brushless motor. FIG. 15(*b*) shows the motor unfolded from inside the core. For the simplification of explanation, the leakage of magnetic flux is ignored in the following description.

The efficiency of a motor η is represented, alike Embodiment 1, by:

$$\eta = \left(\pi DL \frac{Br}{1 + \frac{\mu r}{Lm / Lg}}\right)^2 \cdot \frac{S}{4k\left(\frac{L}{3} + \frac{\pi}{2}D\right)} \tag{12}$$

The above Formula contains no component representing the coil resistance R, nor the number of coil turns T, which indicates that the efficiency does not change by a change of specifications in the coil winding.

Figure 16:
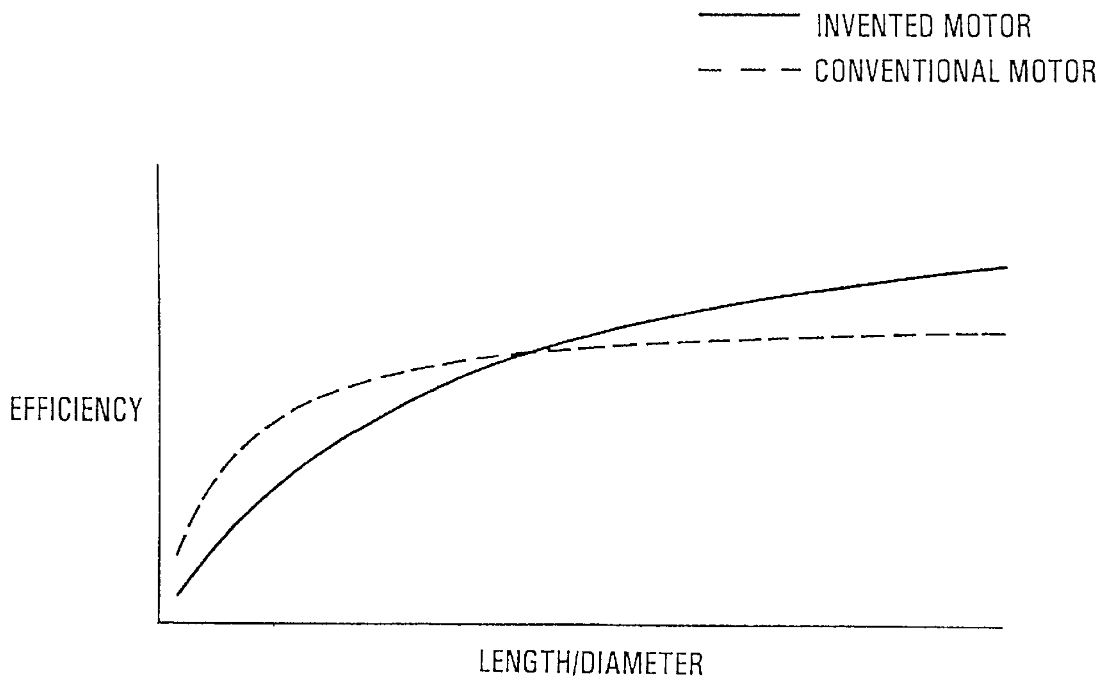
FIG. 16 is a graph used to compare the motor with a conventional brushless motor in terms of efficiency.

In the above formula, when the rotor length L, rotor diameter D are varied so as the volume of rotor(π D2 L/4) remains constant with other variables fixed, the relationship between the length/diameter of rotor(L/D) and the efficiency η is as shown in FIG. 16. In FIG. 16, the dotted line represents a conventional inner-rotor type brushless motor. As seen from the FIG. 16, efficiency of the invented motor is inferior to that of conventional brushless motor when the rotor is short, but it improves with a longer rotor; the efficiency curves cross at a certain point and efficiency with the latter goes higher. At an ultimate convergent value, viz. L/D=infinite in Formula 12, the efficiency of invented motor reaches as high as 1.5 times that the conventional motor.

Although in the present embodiment the core 19 having integrated salient poles 18*a*, 18*b*, 18*c* in three stages has been employed for two pieces, the number of cores may be q pieces (q=1,2,3,4, . . . ). In a case where the core 19 is employed for two pieces(or one piece) as in the present embodiment, among others, the thickness of a motor in radius direction may be reduced to almost as thin as the diameter of magnetic units 21*a*, 21*b*, 21*c*. This means that magnetic units 21*a*, 21*b*, 21*c* having a larger diameter may be used within a given space in the thickness; output of the motor may increase accordingly.

Figure 17:
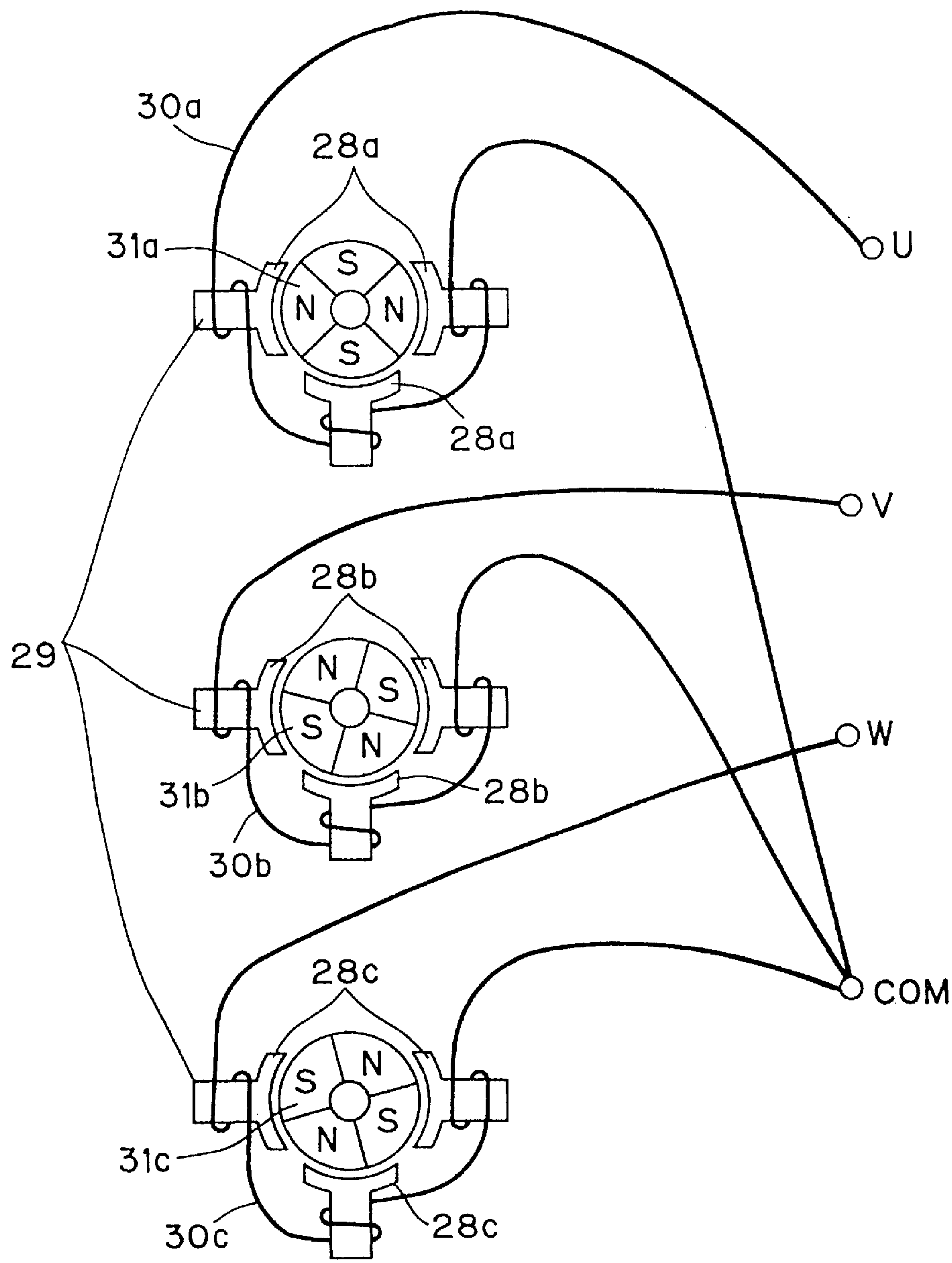
FIG. 17 is a chart showing a relationship among the magnetic units, the salient poles of core and the coils of other motor in accordance with a third exemplary embodiment of the invention.

FIG. 17 shows a relationship among magnetic units, cores and coils in a motor where the magnetic units 31*a*, 31*b*, 31*c* have four magnetized poles, the core 29 is used for three pieces, and the number of poles in salient poles 28*a*, 28*b*, 28*c* is three. A common connection terminal of each of the coils 30*a*, 30*b*, 30*c* is represented by a symbol COM, the other end terminals by U, V, W, respectively.

Shown in FIG. 17 are four-pole cylindrical magnetic units 31*a*, 31*b*, 31*c*, each having the N and S poles magnetized with a deviation of 90 angular pitch in a circumferential direction, and a core 29 having three-pole salient poles 28*a*, 28*b*, 28*c* disposed on a line parallel to the axial direction at a same pitch as the magnetizing pitch of the magnetic units 31*a*, 31*b*, 31*c* and magnetic circuits coupling the salient poles 28*a*, 28*b*, 28*c*.

A motor of the above structure may be advantageous when used, for example, as the spindle motor of an optical disk device, where the mounting space is limited in one of the circumferential directions of a motor. Namely, the eventual size of a motor may be made larger within an available height, hence a greater output.

Although in the present embodiment a motor has been described to have a three-stage structure, it may also be structured in K stages(K=2,3,4, . . . ). Thus the invention may be carried out generally as a K-phase brushless motor.

Now in the following, a fourth exemplary embodiment of the invention is described with reference to FIG. 18 and FIG. 19.

In the above described first exemplary embodiment through third exemplary embodiment, the rotor has been comprised of three magnetic units fixed around a shaft with spacer in between the magnetic units. In the present fourth embodiment, a single rotor magnet 32 is fixed around a shaft 33, as shown in FIG. 18, the rotor magnet 32 being magnetized in three stages like the rotor of FIG. 2. With the above structure, three pieces of components are integrated into a single component; which signifies the reduction in components cost and the suppressed deterioration of motor characteristics due to angular errors during assembly of the magnetic units in three stages.

Figure 18:
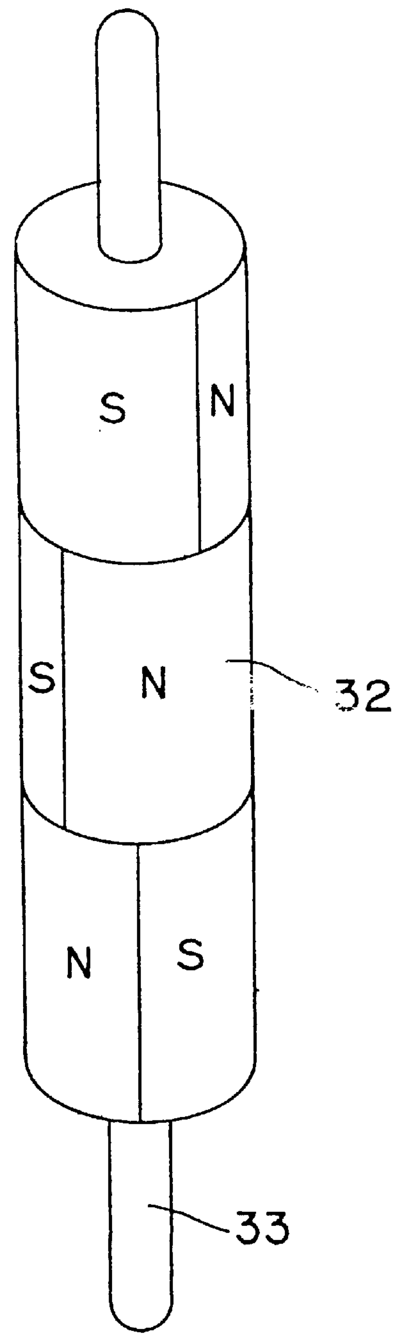
FIG. 18 is a perspective view showing the magnetized state in one example of magnetic units in a motor in accordance with a fourth exemplary embodiment of the invention.
Figure 19:
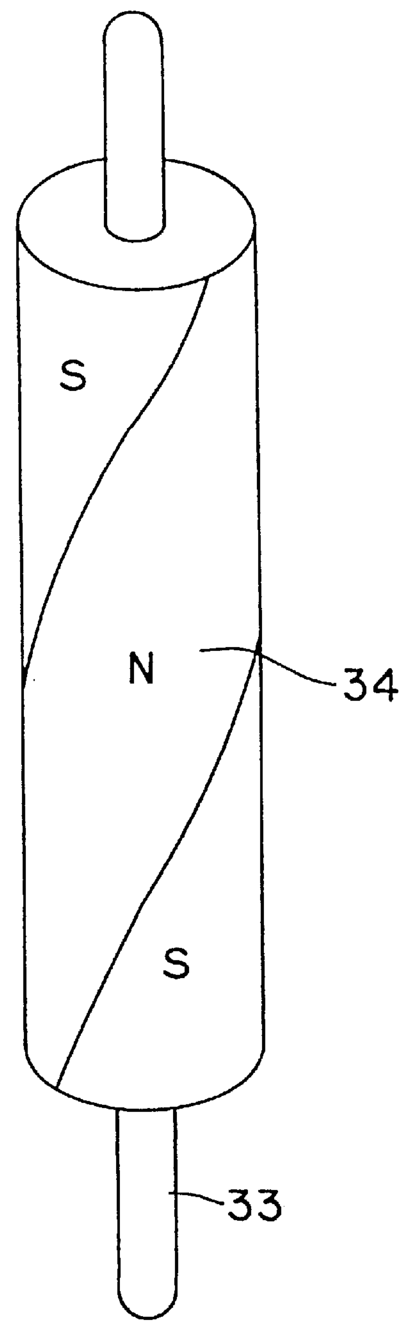
FIG. 19 is a perspective view showing the magnetized state in other example of magnetic units of a motor in accordance with a fourth exemplary embodiment of the invention.

In the case of FIG. 18, a rotor magnet has been magnetized in three stages. However, a rotor 34 may also be magnetized in a skew configuration, as shown in FIG. 19, where the magnetized area continually changes. The rotor magnet 34 produces 10 a same effect as the one in FIG. 18. A skew magnetization may present an additional advantage of reduced cogging torque, because in the skew configuration the switching of magnetic flux takes place in a smooth manner.

In the following, a fifth exemplary embodiment of the invention is described with reference to FIG. 20 through FIG. 32.

Figure 20A:
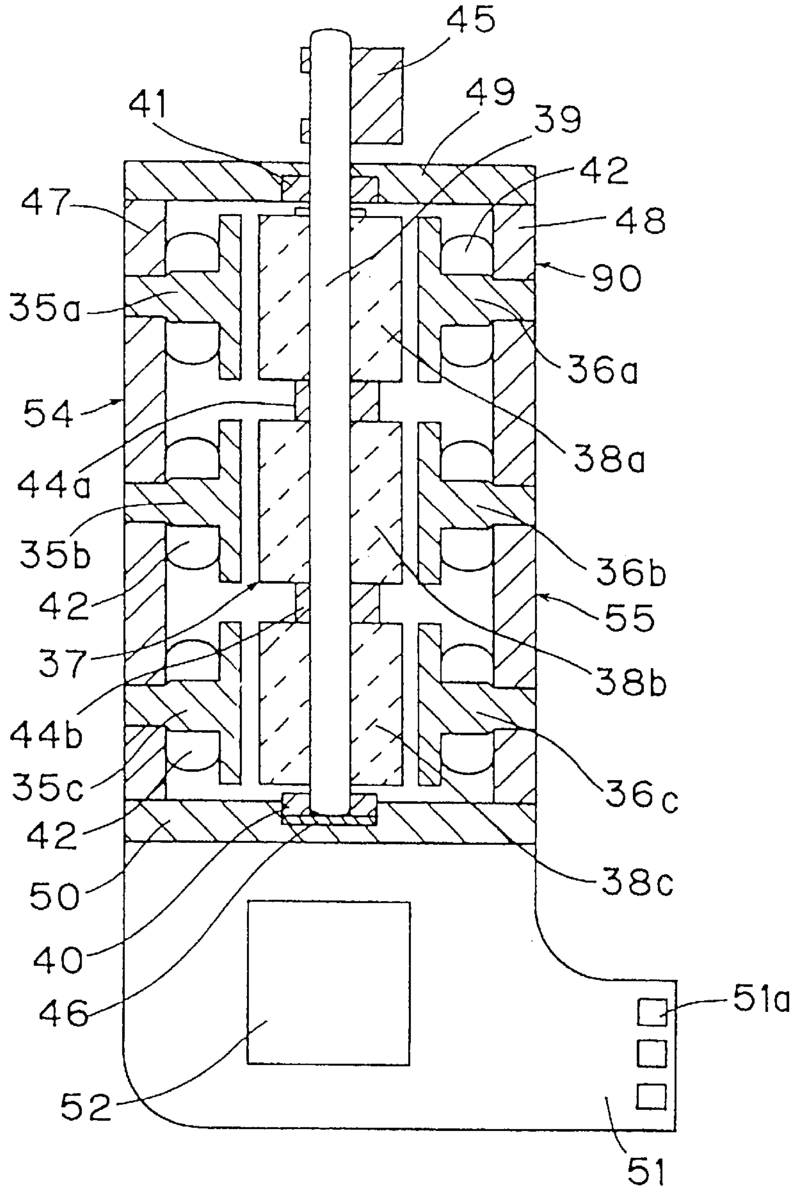
FIG. 20(*a*) is a lengthwise cross sectional view showing a motor in accordance with a fifth exemplary embodiment of the invention.
Figure 20B:
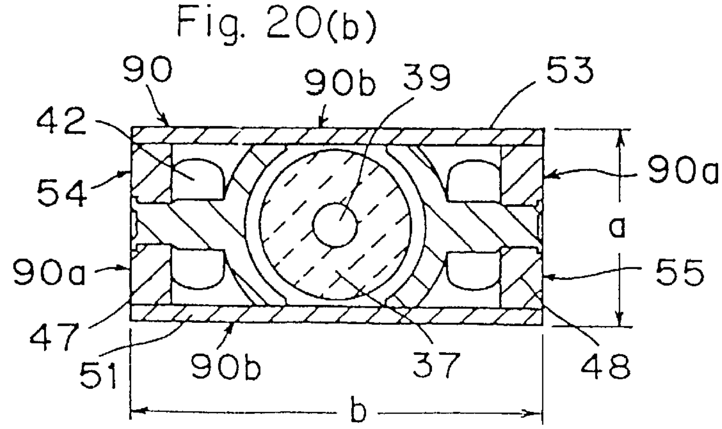
Figure 21:
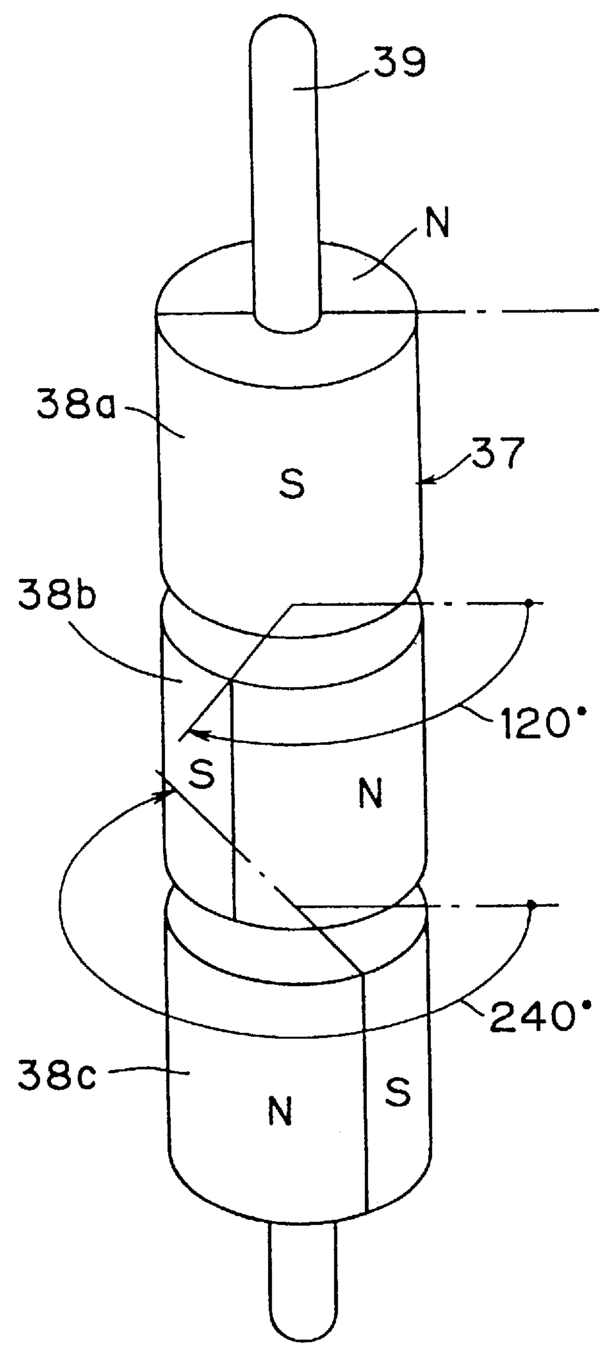
FIG. 21 is a perspective view showing relative positioning of magnetic poles in magnetic units of the motor.
Figure 22:
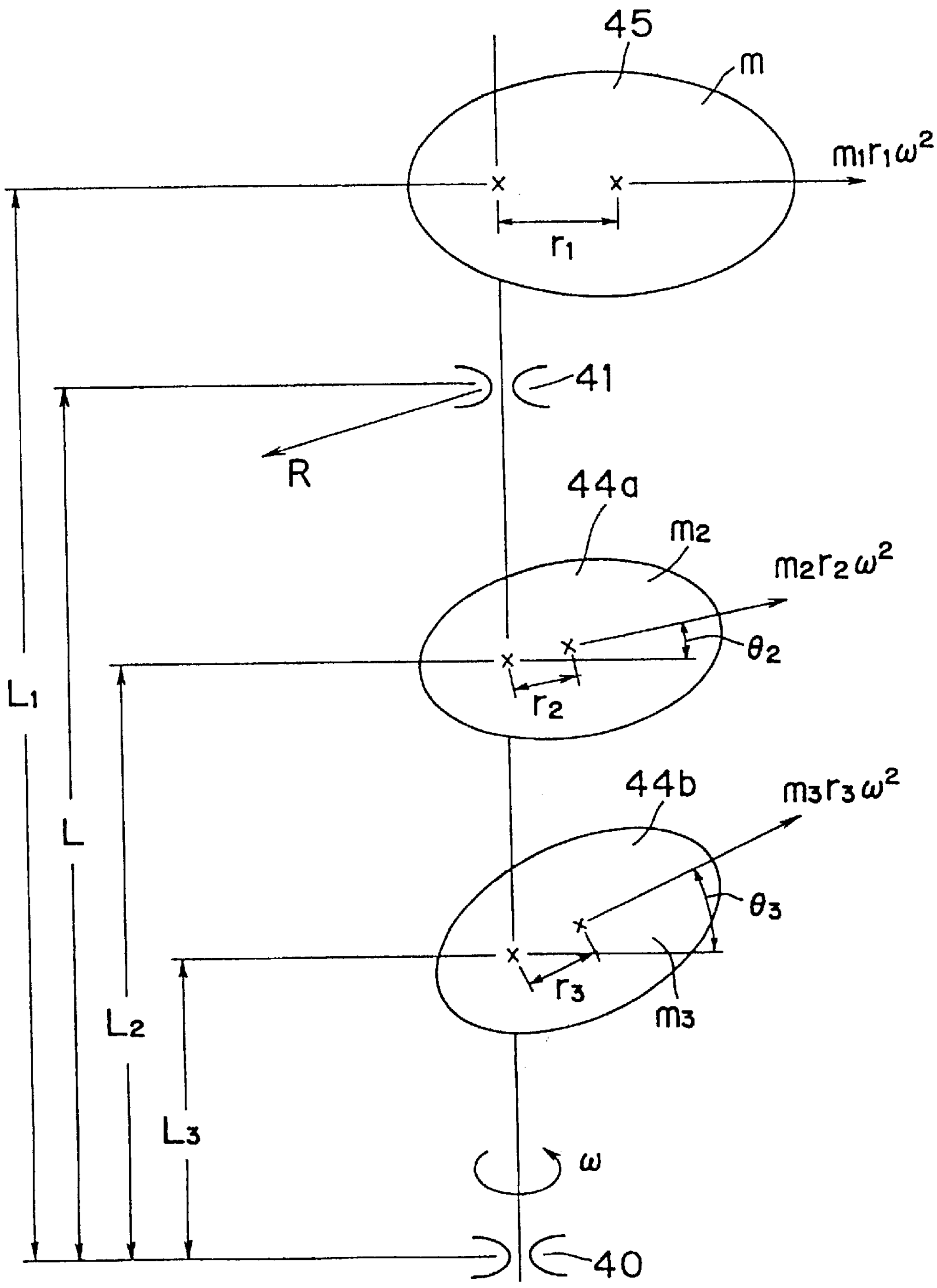
FIG. 22 is a model char used to explain the quantity of imbalance in the motor.

FIG. 20(*a*) is a cross sectional view in the longidirecal direction showing a vibration motor for use in a pager of mobile communication apparatus. FIG. 20(*b*) is a traversing cross sectional view of the motor.

A motor of the present embodiment has an outer case 90 whose shape is an oblong rectangle in a cross sectional plane perpendicular to the axial direction of rotor 37, the pair of shorter sides 90*a*, 90*a* forming yokes 47, 48, while the longer side pairs 90*b*, 90*b* being comprised of a printed board 51 and a sheet 53. It is also possible to make the cross sectional shape of the outer case 90 oval, or other oblong shapes. The rotor 37 is comprised of three magnetic units 38*a*, 38*b*, 38*c*, spacers 44*a*, 44*b* to be placed between the magnetic units, and a shaft 39.

In FIG. 20, salient poles 35*a*, 35*b*, 35*c*, 36*a*, 36*b*, 36*c* are each provided with an insulation layer by means of electrostatic coating, and is wound around with coil 42 over the insulation layer. The salient poles 35*a*, 35*b*, 35*c* wound around with coil 42 are attached to the yoke 47 in the axial direction of shaft 39 with a certain space between one another, forming a first core(core assembly) 54. At an opposite place beyond the shaft 39 is a second core(core assembly) 55. The second core 55 is comprised of the salient poles 36*a*, 36*b*, 36*c* wound around with coil 42 and attached to the yoke 48 in the axial direction of shaft 39 with a certain space between one another.

Each of the magnetic units 38*a*, 38*b*, 38*c* of rotor 37 is a radially anisotropic sintered magnet of an empty cylindrical shape, magnetized in the N and S poles. The three magnetic units 38*a*, 38*b*, 38*c*, whose magnetic position at each stage deviates relative to one another by 120 in a circumferential direction, are fixed at a certain interval around the shaft 39 inserted through the empty space of the cylindrical magnetic units, with spacers 44*a*, 44*b* provided in between the magnetic units.

A motor of the present embodiment is for use in a pager of mobile communication apparatus having a vibration call function. For obtaining a vibration, an imbalancing weight 45 whose centre of gravity is off the centre of rotation (centre of shaft) is provided, and an energy stemming from centrifugal force of the weight 45 is transmitted to the stator of the motor.

In this case, the larger the radial load on bearing 41the greater is the vibration. In order to increase the load to be exerted on bearing 41, the gravity centre of the spacers 44*a*, 44*b* is also placed off the rotating centre for creating an eccentric load. The load in radial direction to be exerted to the bearing 41 is a reaction force to an action of the imbalance force. The influence of the place of gravity centre of weight 45 and the place of gravity centre of spacers 44*a*, 44*b* on the degree of reaction force is described in the following with reference to FIG. 22.

When a substance of mass m, whose centre of gravity is eccentric to rotating axis by r, rotates around the axis at angular velocity ω, the centrifugal force F is represented by Formula 13.

$$F=m\cdot r\omega^2 \tag{13}$$

Taking the elastic deformation ρ due to centrifugal force into consideration, the total centrifugal force F is represented by Formula 14.

$$F=m(r+\rho)\omega^2 \tag{14}$$

As the elastic deformation ρ is ignorable relative to r, a formula that represents the centrifugal force F is the Formula 13. When the centrifugal force F1, F2, F3 of the weight 45 and the spacer 44*a*, 44*b* are decomposed into the directions of X axis and the Y axis, the relationship is as shown in Formula 15: where, L1, L2, L3 indicating respectively the distance from bearing 40 to weight 45, spacer 44*a*, spacer 44*b*; L indicating the distance from bearing 40 to bearing 41, the X axis representing the shaft centre, Y axis being an axis that is perpendicular to the X axis.

$$\begin{aligned} F1x &= m1r1\,\omega^2 = F1 \\ F1y &= 0 \\ F2x &= m2r2\,\omega^2\cos\theta 2 = F2\cos\theta 2 \\ F2y &= m2r2\,\omega^2\sin\theta 2 = F2\sin\theta 2 \\ F3x &= m3r3\,\omega^2\cos\theta 3 = F3\cos\theta 3 \\ F3y &= m3r3\,\omega^2\sin\theta 3 = F3\sin\theta 3 \end{aligned} \tag{15}$$

Assuming the reactive force of bearing 41 as R, the reactive force R is also decomposed into the directions of X and Y, then the moment with the bearing 40 as fulcrum is represented in Formula 16:

$$LRx=L1\ F1x+L2\ F2x+L3\ F3x$$

$$LRy=L1\ F1y+L2\ F2y+L3\ F3y \quad (16)$$

When component forces Rx, Ry of the reactive force R are composed:

$$R^2=Rx^2+Ry^2 \quad (17)$$

Accordingly, a square of the reactive force R is represented by Formula 18:

$$\begin{aligned} R^2 &= Rx^2 + Ry^2 \quad (18) \\ &= (F1x \cdot (L1/L) + F2x \cdot (L2/L) + F3x \cdot (L3/L))^2 + \\ &\quad (F1y \cdot (L1/L) + F2y \cdot (L2/L) + F3y \cdot (L3/L))^2 \\ &= (F1 \cdot (L1/L) + F2\cos\theta 2 \cdot (L2/L) + F3\cos\theta 3 \cdot (L3/L))^2 + \\ &\quad (F2\sin\theta 2 \cdot (L2/L) + F3\sin\theta 3 \cdot (L3/L))^2 \end{aligned}$$

The reactive force R reaches maximum when R2 is the highest. In Formula 18, the angular velocity ω, mass m1, m2, m3, eccentricity distance r1, r2, r3, distance in axial direction L1, L2, L3 are all known values, while unknown figures are the angles θ2, θ3. The reactive force R reaches maximum when θ2=θ3=0; viz. when the direction of centrifugal force of the spacer coincides with that of the weight.

It is known from the above description that the direction of eccentricity in the spacer should preferably be in the same direction as that of weight 45, 44*a*, 44*b*. A rotor of the present embodiment has been made in conformity with the above structure. Therefore, the imbalancing load on the bearing 41 has been maximized.

Figure 23:
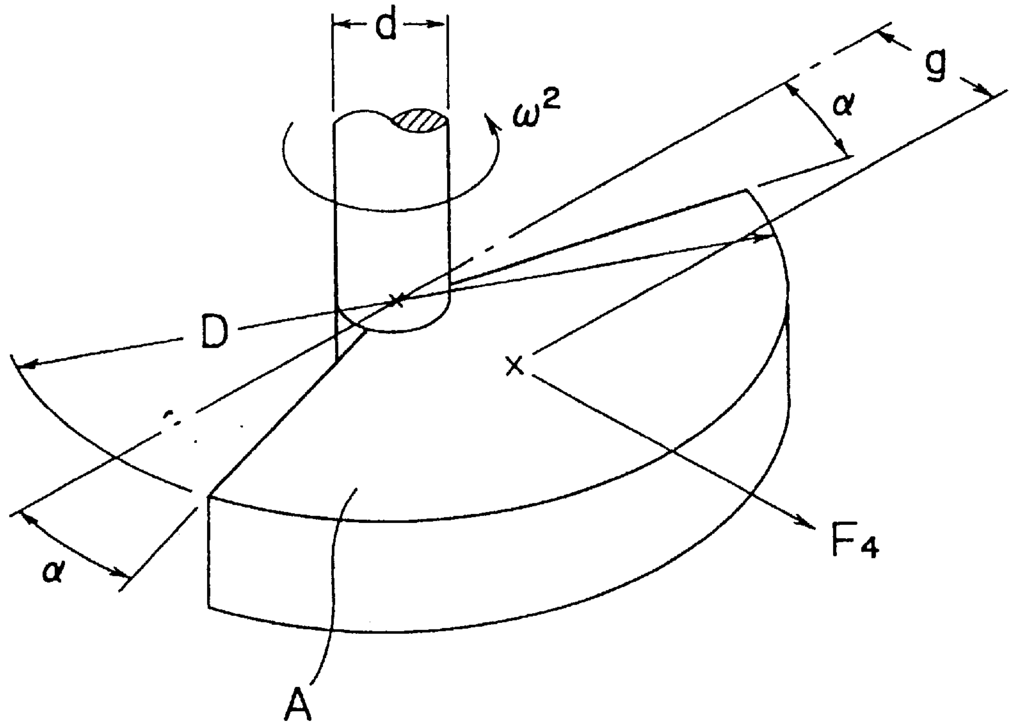
FIG. 23 is a perspective view of an imbalancing weight used in the motor.
Figure 24A:
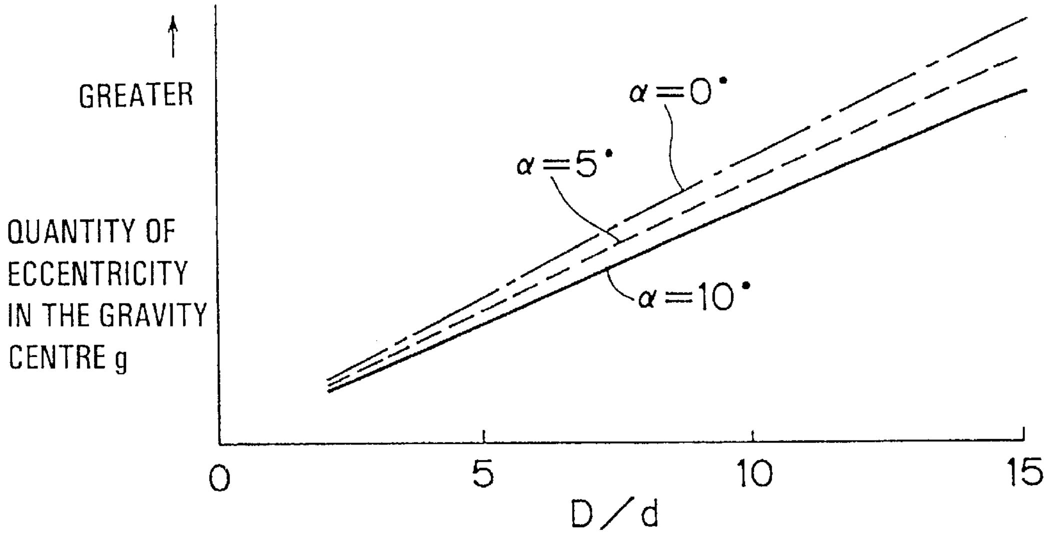
FIG. 24(*a*) is a characteristics chart showing a relationship of the shift quantity in gravity centre of the weight versus the weight outer diameter/shaft diameter.
Figure 24B:
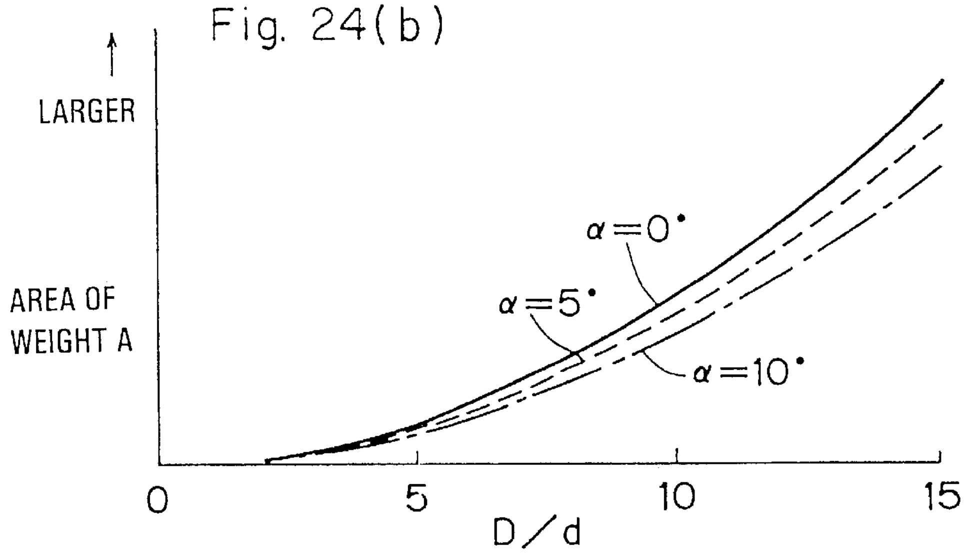
Figure 24C:
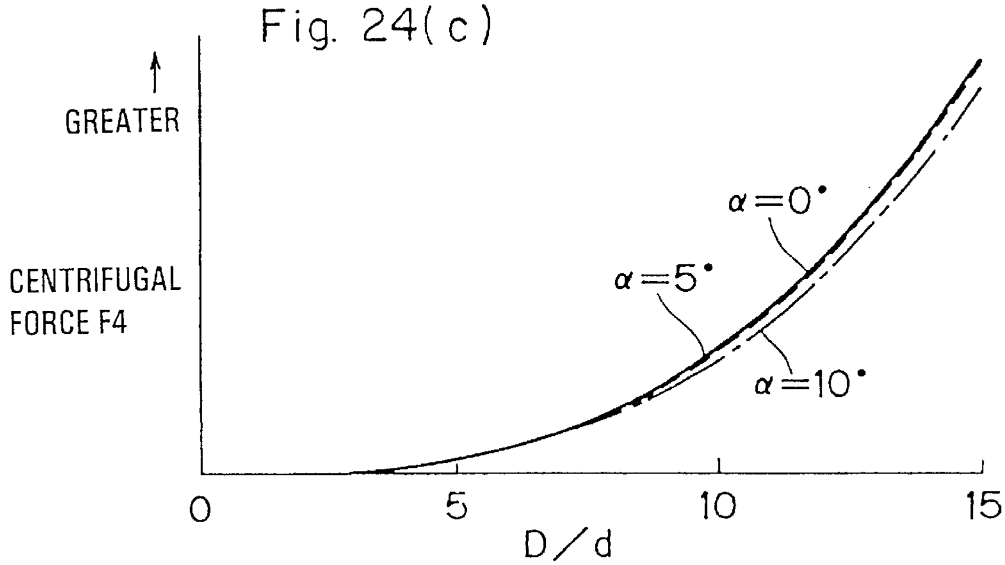

As the shape of weight 45 bears a substantial influence on the vibration, a study has been made on a model weight as shown in FIG. 23. The weight 45 has a fan shape having an angle semi-circle minus the angle 2 α. Diameter of the outermost circle of weight 45 is represented by D, which is referred to as outer diameter of weight in the forthcoming descriptions. FIG. 24(*a*),(*b*),(*c*) show respectively the quantity of displacement g of centre of gravity of weight 45, the square measure A of weight 45,the centrifugal force F4, with the angle α as the parameter. Here, the diameter of shaft d=1, the thickness of weight 45, the specific gravity of weight 45 and a square of the revolution velocity have been assumed constant. The quantity of gravity centre displacement in the fan-shape weight 45 is in a linear equation with the ratio of weight outer diameter D versus shaft diameter d(D/d). The square measure A of weight 45 is in an equation of higher degree with the ratio of weight outer diameter D versus shaft diameter d(D/d). As the centrifugal force is represented by Formula 13, centrifugal force F4 is in proportion to the product of square measure A of weight 45 and quantity of gravity centre displacement g.

For increasing the vibration by weight 45, the outer diameter of weight 45 should be as large as possible. This is understood from FIG. 24; however, in a flat motor as illustrated in FIG. 20, it may not be practical to provide a weight whose outer diameter D is larger than length of the shorter side 90*a*, except a very special case. The outer diameter D of weight 45 falls under the following regulations in a flat motor as shown in FIG. 20.

The outer diameter D of weight 45 is:

$$0.6\times a<D<a \quad (19)$$

where; a represents the length of shorter side 90*a* (see FIG. 20(*b*)).

Furthermore, as it is preferred for providing a motor of this type with more advantages to make the sheet 53 and the print board 51 thinner, the weight outer diameter D should ideally be determined to conform Formula 20:

$$0.8\times Dm<D<1.1\times Dm \quad (20)$$

where; Dm represents the outer diameter of rotor magnetic unit.

Figure 25:
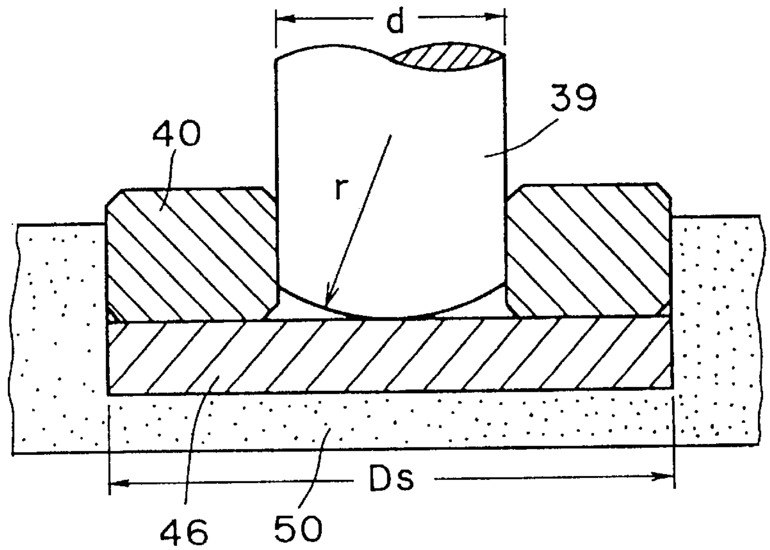
FIG. 25 is a cross sectional magnification of a pivotal bearing of the motor.

As shown in FIG. 25, the bearing 40 is a cylindrical bearing which encounters a load in radial direction, while a load in thrust direction is encountered by a pivotal bearing formed by the circular arc at the tip end of shaft 39 and a thrust plate 46. A resin material of low sliding friction is used for the thrust plate 46.

The highest bearing pressure Pmax and the friction torque Tp are obtainable in Formula 21:

$$P\max=a\times r^{-2/3}$$

$$Tp=b\times r^{1/3} \quad (21)$$

where, r representing the radius of tip end sphere of shaft 39; a and b being coefficients.

Figure 26:
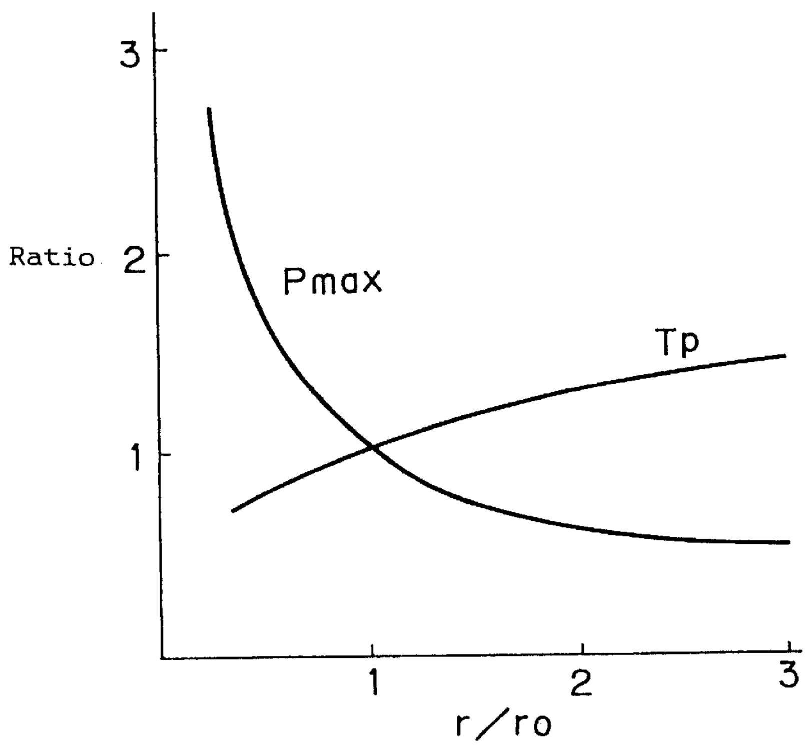
FIG. 26 is a characteristics chart showing a relationship between the largest surface pressure and the friction torque in the pivotal bearing.

FIG. 26 shows a relationship between respective ratios of the highest bearing pressure Pmax and the friction torque Tp, assuming a certain radius rO and friction torque Tp 1. The smaller the radius r of tip end of shaft 39 the lower is the friction torque Tp; but the bearing pressure Pmax goes high. When the thrust plate 46 is made of resin, too high bearing pressure might harm the reliability. On the other hand, a large radius r decreases the bearing pressure but it increases the friction torque Tp. The torque loss is converted into heat, and the reliability might be deteriorated by an increased temperature. Therefore, a pivotal bearing for a rotation faster than 2000 rpm has been formed so as the radius r of tip end of shaft and the diameter d of shaft satisfy the following Formula 22:

$$10\times d>r>1.5\times d/2 \quad (22)$$

The thrust plate 46 has been made with a readily available high polymer material. However, a highly lubricant polyacetal resin is ideal for motors of battery-driven apparatus, in order to keep the friction torque low for a long duration. In case operation under a high temperature environment is expected, use of a heat-resistant polyimide resin, Teflon resin is recommendable.

The outer diameter Ds of thrust plate 46 and the outer diameter d of shaft have been determined to meet the following Formula 23:

$$Ds>d \quad (23)$$

By so doing, the thrust plate 46 may not fall off the bearing 40 when inserting a shaft; which means an easy and stable assembly work. Even when the shaft 39 moves in the thrust direction, the thrust plate 46 does not move because it is sticking to bracket 50 with lubricating oil or oil of the bearing 40. However, the thrust plate might move in the surface direction, therefore in some cases the move have to be regulated in order to reduce the loss in bearing. By satisfying Formula 23, the contact area is increased, the move is suppressed, and the move may be regulated by the cylinder diameter of the bearing 40. A bearing satisfying the Formula 23 may be assembled by first inserting the thrust plate 46 in bracket 50, and then fixing the bearing 40.

Along with the decreasing size of a motor, the bearing loss increases relative to a generated torque. Therefore, there arises an increasing need for suppressing the bearing loss. It is recommendable to use an oil-containing sintered material for the bearings 40, 41. A preferred viscosity of the oil contained in the bearing is 10 cst–50 cst.

When a low-friction resin is used for the sintered material, for example, when fine powder Teflon whose grain size is less than 1 μm is mixed, the Teflon intervening in the metal gap functions as a binder. Moreover, the resin spotted on the bearing surface facing the shaft 39 contributes for further reducing the bearing loss, as compared with a bearing containing only oil. This enables low voltage starting of a motor, also contributes to a longer battery life.

Figure 27A:
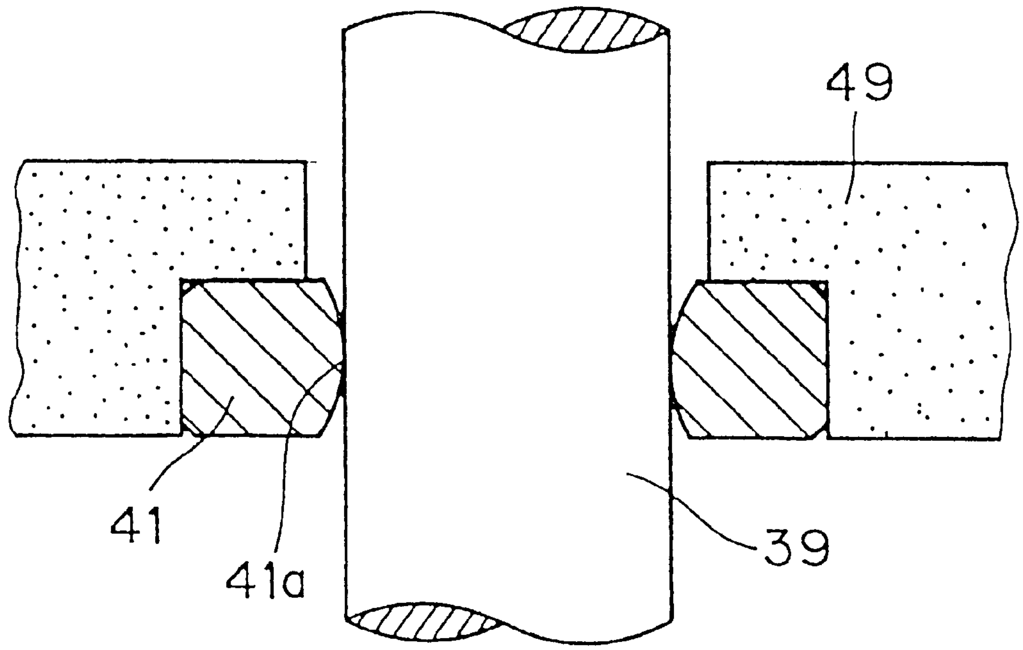
FIG. 27(*a*), (*b*) illustrate a self centering bearing; (*a*) is a cross sectional view at top part of a shaft, (*b*) is a cross sectional view at bottom end of the shaft.
Figure 27B:
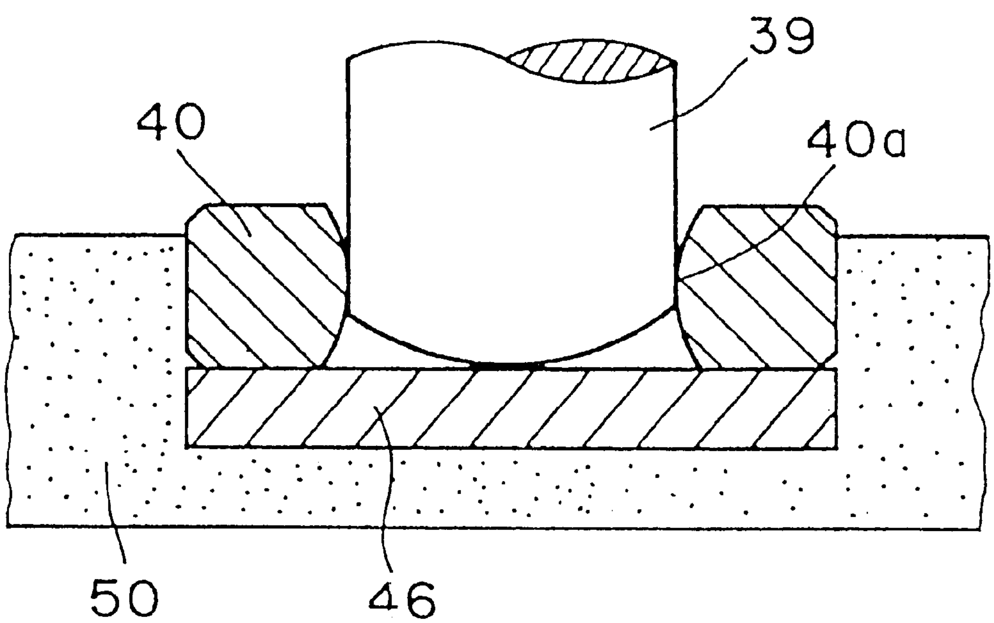

When the inner surface of bearing is shaped to have a circular arc in the cross section, as shown in FIG. 27, the bearing loss may be reduced further. FIG. 27(*a*) shows a state where the shaft 39 is penetrating through the bearing 41 disposed in the weight-end. FIG. 27(*b*) shows part of the bearing 40 disposed in the pivotal end. Even if the shaft 39 is not positioned in a state exactly perpendicular to bracket 49 because of, for example, twisted assembly, bent shaft 39 due to imbalance, etc., the contact of shaft 39 to bearing 41 remains as a point-contact at the circular arc 41*a*, or the bearing 41 is provided with an automatic centering function, as illustrated in FIG. 27(*a*).

Also in the case of FIG. 27(*b*), the contact of shaft 39 with bearing 40 remains as a point-contact at the circular arc 40*a* of bearing 40 even if there is a twist in the assembly or a bent shaft 39 due to imbalance. Thus the bearing loss may be reduced by making the contact of shaft 39 with bearings 40, 41 to be a point-contact by shaping the inner surface of the bearings to have a circular arc.

Next, on a land 51*a* of the printed board 51 constituting a longer side 90*b* of the outer case 90, terminal ends of coil 42 wound around each of the salient poles 35*a*–35*c*, 36*a*–36*c* are electrically coupled, directly or indirectly. The printed board 51 of the present embodiment is a flexible printed board, on which an integrated circuit 52 or other electronic circuits for driving are mounted, and a land 51*a* is provided for connection with the power supply from an apparatus.

In a motor of the present embodiment, a flexible printed board is disposed in one of the longer sides 90*b*. Therefore, a board of large size relative to the thin shape of a motor is made available, which means that it is easy to mount on the board various circuit components for driving. Thus a small and thin brushless motor may be offered in accordance with the invention.

On the side opposite to printed board 51 is a sheet 53. By affixing the sheet 53, a motor is sealed against outside. Motor is protected against the invasion of dusts, so a rotor may not be retarded in its rotation by dusts that are coming from outside and staying somewhere in between rotor 37 and cores 54, 55. Namely, the sheet keeps a motor dust-free. The sheet 53 may also serve as a label for describing name of the manufacturer, serial number, etc.

Figure 28:
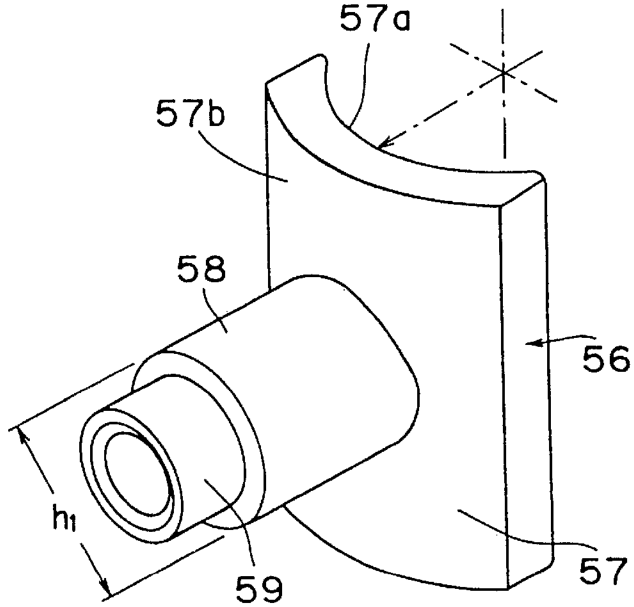
FIG. 28 if a perspective view of an exemplary salient pole of the motor.

The salient poles 35*a*–35*c*, 36*a*–36*c* of the present embodiment are not integrated as part of the yokes 47, 48, but each of them is an independent piece component. An example of the piece component, or the salient poles 35*a*–35*c*, 36*a*–36*c*, is shown in FIG. 28. The entire salient pole of FIG. 28 is designated with a numeral 56. Surface 57*a* of a protruded portion 57 of the salient pole 56 facing to rotor is shaped to have a circular curvature centred at the rotating axis. The reverse surface 57*b*, which is other surface of the surface 57*a* facing to rotor, is curved, and a tooth 58 of cylindrical shape is provided thereon to be wound around with coil. Assuming the diameter of cylindrical tooth 58 as h1, a cylindrical portion 59 whose diameter is smaller than h1 is formed at an end of the tooth 58. The cylindrical portion 59 is to be inserted to a hole of yokes 47, 48 for the mounting thereon, and a step formed by the tooth 58 of the larger diameter h1 is to provide an appropriate positioning thereof. Inserting depth to the yokes 47, 48 is regulated by the step, and the air gap between rotor and curved surface 57*a* at each of the salient poles 56 may be made uniform. The tip end of cylindrical portion 59 has a hollowed surface for calking/fixing at the outer circumferential edge to the yoke 47, 48 after a salient pole 56 is inserted to a hole of yoke 47, 48. Besides the above described method, the salient pole 56 may be fixed to the yoke 47, 48 by means of pressure insertion, gluing, etc.

Figure 29:
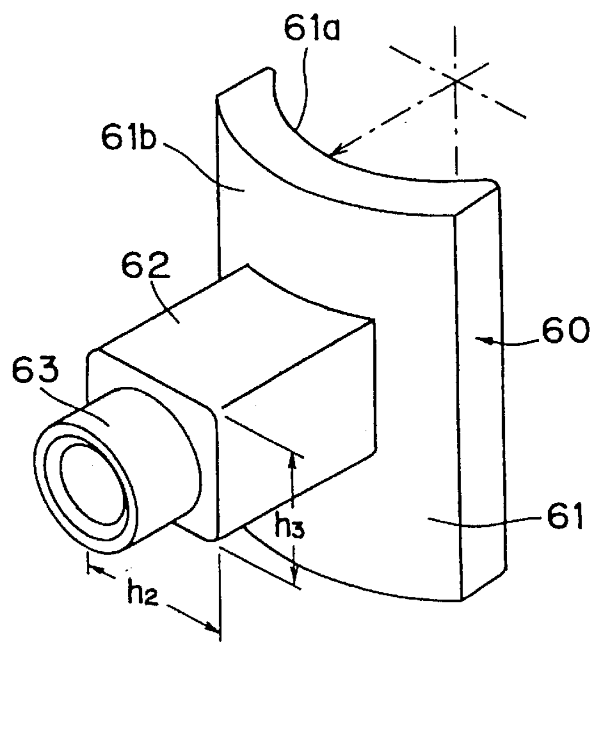
FIG. 29 is a perspective-view of other salient pole of the motor.

The salient pole as a piece component may take also a shape as shown in FIG. 29. The entire salient pole of FIG. 29 is designated with a numeral 60. Surface 61*a* of a protruded portion 61 of the salient pole 60 facing to rotor is shaped to have a circular curvature centred at the rotating axis. The reverse surface 61*b*, which is other surface of the surface 61*a* facing to rotor, is curved, and a tooth 62 having a rectangular cross sectional shape is provided thereon to be wound around with coil. Assuming the length of a side of the rectangular shape perpendicular to the revolving axis as h2, that of the other side running in the same direction as the revolving axis as h3, the tooth of FIG. 29 establishes following Formula 24:

$$h2 \approx h3 \tag{24}$$

A cylindrical portion 63 whose diameter is smaller than length of a side of the rectangle is formed at an end of the tooth 62. The cylindrical portion 63 is to be inserted to a hole of yoke 47, 48 for the mounting thereon, and a step formed by the tooth 62 of the larger dimensions is for the purpose of providing a proper positioning. Inserting depth to the yoke 47, 48 is regulated by the step, and the air gap between rotor and curved surface 61*a* at each of the salient poles 60 may be made uniform.

Figure 30:
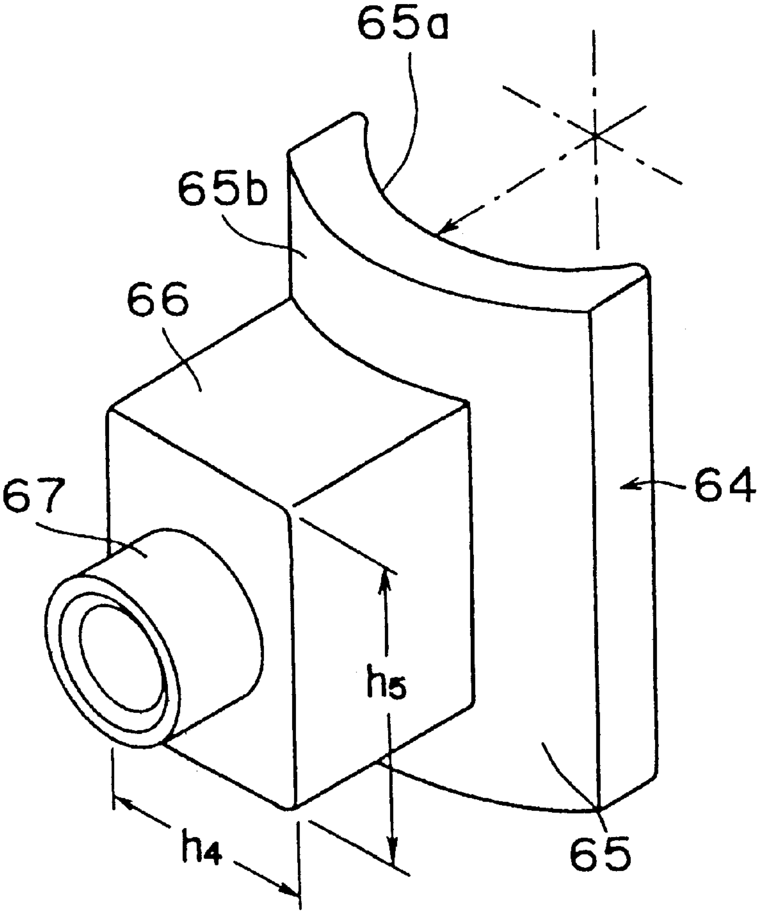
FIG. 30 is a perspective view of still other salient pole of the motor.

FIG. 30 shows a still other exemplary shape of the salient pole as a piece component. The entire salient pole of FIG. 30 is designated with a numeral 64. Surface 65*a* of a protruded portion 65 of the salient pole 64 facing to rotor is shaped to have a circular curvature centred at the rotating axis. The reverse surface 65*b*, which is other surface of the surface 65*a* facing to rotor, is curved, and a tooth 66 having a rectangular cross sectional shape is provided thereon to be wound around with coil; at an end of the tooth 66 a cylindrical portion 67 having a smaller diameter is formed as integral part with the rectangular tooth 66. Assuming the length of a side of the tooth perpendicular to the revolving axis as h4, that of the other side running in the same direction as the revolving axis as h5, the tooth 66 of FIG. 30 establishes following Formula 25.

$$h4 < h5 \tag{25}$$

In a motor whose cross sectional shape is a thin rectangle, advantages in shaping a tooth 66 of salient pole 64 in a rectangle in the cross section, with which the sides running in parallel to the axial direction are made longer than the other sides as indicated by Formula 25, are as described below. Namely, with reference to FIG. 28, FIG. 29 and FIG. 30, the length in width direction of teeth 58, 62, 66 around which coils 42 are to be wound is assumed to be equal, viz. made to fulfill Formula 26;

$$h1 = h2 = h4 \tag{26}$$

then, the cross sectional square measure of tooth 66 shown in FIG. 30 becomes the largest as compared with those in FIG. 28 and FIG. 29, as indicated in Formula 27.

$$(\pi/4)h1^2<h2h3<h4\cdot h5 \quad (27)$$

Assuming a same cross sectional square measure for the teeth, the dimension of salient pole in the width direction is the shortest with the length h4 of FIG. 30. Therefore, there is more room for making the coiling height of coil 42 higher, or there is a room for increasing the number of turns.

As the above salient poles are constituted as independent piece component, an exemplary method of manufacture is described in the following. The salient poles are formed with a mixture of powdered metal and resin by injection molding, and then it is sintered for removing the resin, a process called metal injection. As compared with those manufactured by cutting or grinding, the dimensional allowance in the curvature of the surfaces 57*a*, 61*a*, 65*a* facing the rotor, shown in FIG. 28 through FIG. 30, in the salient poles produced by the above process is kept within a targeted specification even after the salient poles undergoing the sintering process. Accordingly, the dispersion of motor characteristics may be controlled small. The above manufacturing process of salient poles fits to volume production.

Salient poles of small and complicated shapes as shown in FIG. 28, FIG. 29, FIG. 30 may be formed to final products by the metal injection technology(also referred to as metal powder injection molding), without requiring any post finishing. An example of the powdered material for salient poles includes Fe—Si group material; the material being a one which is unfriendly to machining process steps, therefore the post processing is hardly applicable on such materials. For the salient poles requiring a calking process step during assembly, a powdered material of pure iron must be used.

Process steps of the metal injection include weighing and mixing of constituent metal powders and resin binder, each sieved for specified grain size and controlled in chemical composition by reducing reduction, kneading of the mixture to prepare a stuff material for injection molding. Injection molded with dies, the binder resin is removed after molding, and then heated to sinter the powdered metal for providing sufficient coupling between atoms to create a state in which the air sac is contained. If there are many air sacs contained, the ultimate dimensions after sintering might change. Therefore, for the salient poles or other components where requirements in the dimensional accuracy are stringent, grain size of the powder needs to be sufficiently fine and the diameter has to be uniform for obtaining a higher density.

With the air sac made smaller and the density increased, a salient pole may be improved in the capability so as to be able to meet the higher magnetic flux density. In order to have resin insulation film formed on the surface of sintered metal and air sac, it is recommended to have the salient poles impregnated with a resin at the final processing stage, or to have a portion of binder resin left staying. Generation of eddy current may be suppressed by an insulation film formed as an internal structure in the salient pole.

Other exemplary method of manufacturing a salient pole is described in the following.

Because the salient pole has been structured as a piece component small in size, it may be manufactured in volume through a forging process using a small forging machine. In the forging process, corner edges are rounded. So, the salient poles 64 as shown in FIG. 30 may also be rounded at the corner edges, but the curvature of surface 65*a* facing the rotor magnetic unit is not affected, therefore no difference is caused in the motor characteristics that stems from the shape of salient poles, as compared with those made of powdered metal. In the forged salient poles, the magnetic flux flows in a same direction as the flow of metal composition, so there is no loss of magnetic flux; but a loss arises out of distortion in crystallized grain of the metal caused by forging. In order to reduce the loss, an annealing process is applied on the salient poles for making the size of crystallized grain coarse.

Figure 31:
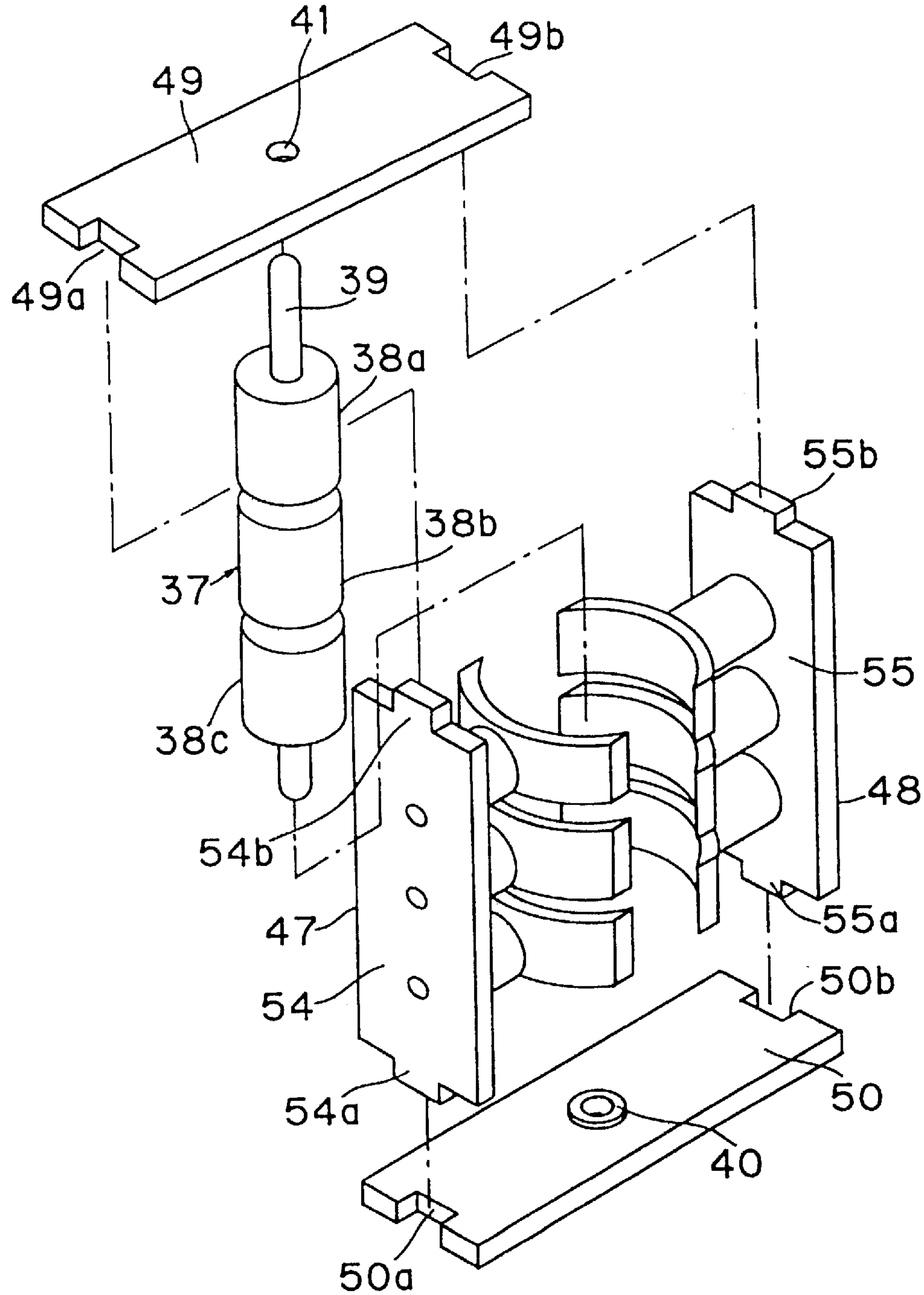
FIG. 31 is an exploded perspective view of the motor.

Now in the following, an assembly procedure for the motor of FIG. 20 is described referring to FIG. 31. A first core 54 formed by a yoke 47 mounted with three salient poles wound around with coil is inserted at a lower protrusion 54*a* in a cut 50*a* of bracket 50 from the axial direction, on which bracket 50 thrust plate 46 has been provided and bearing 40 is pressed into and fixed. Lower protrusion 55*a* of a second core 55 formed by a yoke 48 mounted with three salient poles wound around with coil is inserted in the other cut 50*b* of bracket 50. Magnetic units 38*a*–38*c* and a specified number of spacers are mounted and fixed around shaft 39 at a specified position to form a rotor 37. The lower end of the shaft 39 of rotor 37 is inserted to bearing 40 provided in bracket 50.

Upper protrusion 54*b* of the first core 54 is inserted in a cut 49*a* of bracket 49, and upper protrusion 55*b* of the second core 55 is inserted in the other cut 49*b* of bracket 49. Before fitting the bracket 49, upper end of shaft 39 has been put through bearing 41 of bracket 49. These components may be assembled by handling from only the axial direction to be built in. After the frame work of a motor is completed, imbalancing weight 45 is put on the shaft 39, printed board 51 having electronic components is mounted, and terminal ends of the coils are soldered to the printed board at a land 51*a*. And then a sheet 53 is affixed.

Figure 32A:
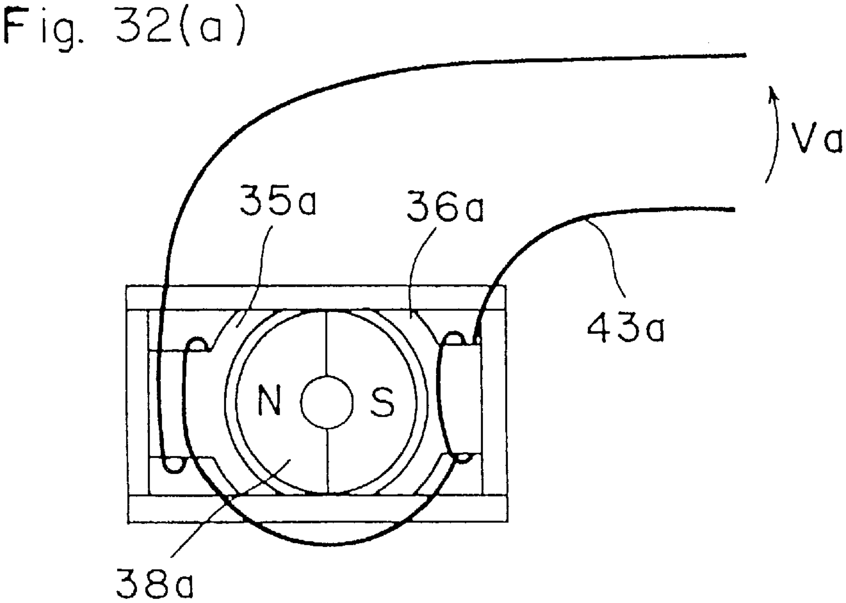
FIG. 32 is charts used to explain the rotating principle of the motor.
Figure 32B:
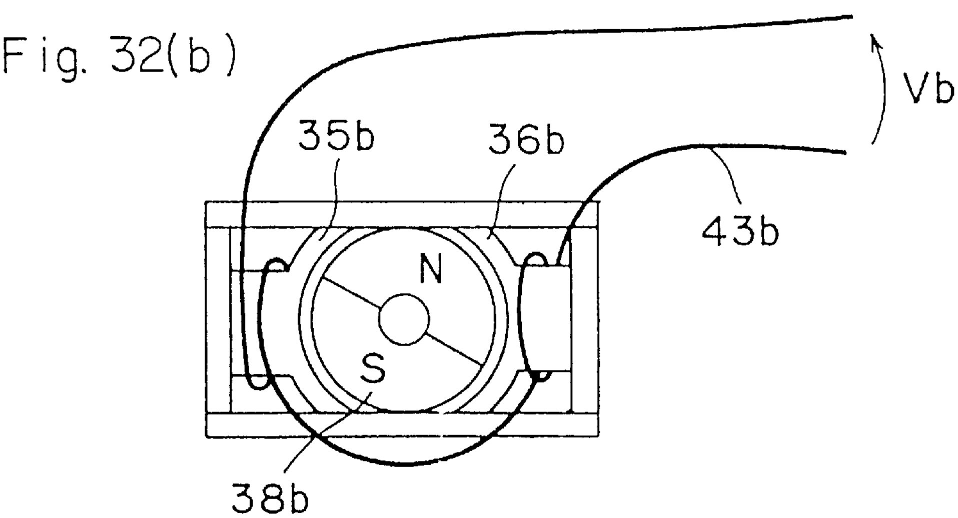
Figure 32C:
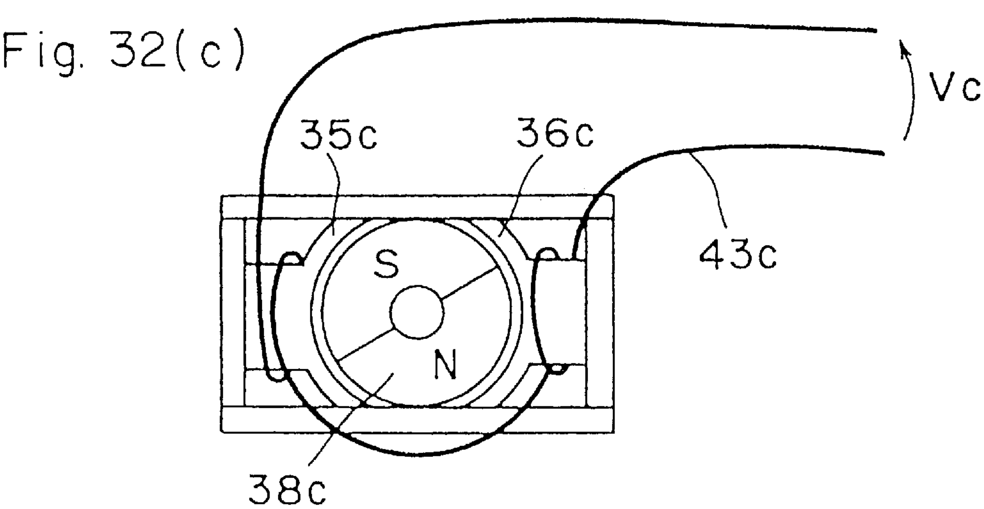

Now, principle of rotation in the motor of the present embodiment is described using FIG. 32 as basis.

FIG. 32 describes relationship among magnetic units 38*a*–38*c*, salient poles 35*a*–35*c*, 36*a*–36*c*, and coil 42(designated as 43*a*, 43*b* and 43*c* from the top).

As illustrated in FIG. 32. the salient poles 35*a*–35*c*, 36*a*–36*c* are provided with a same cricumferential orientation on respective cores 54, 55 forming a straight line queue stretching in the length direction. At each stage, coils 43*a*, 43*b*, 43*c* are wound continually with a single wire in a same direction around the salient poles 35*a*–35*c*, 36*a*–36*c* of first core 54 and second core 55. The winding direction of coils 43*a*, 43*b*, 43*c* at each stage remains the same, as shown in FIG. 32.

When the rotor rotates with the above structure, the phase of induced voltages Va, Vb, Vc generated at coils 43*a*, 43*b*, 43*c* is shifted by 120° relative to one another because the angle of magnetic units 38*a*, 38*b*, 38*c* at each stage deviates by 120 relative to one another. The induced voltage assumes the same wave form as in the first embodiment shown in FIG. 14, so the motor of present embodiment operates under the same rotation principle.

Although in the present embodiment a motor has been described to have a three-stage structure, it may also be structured with magnetic units and salient poles in K stages (K=2,3,4, . . . ). Thus the invention may be carried out generally as a K-phase brushless motor.

A sixth exemplary embodiment of the invention is described hereunder with reference to FIG. 33–FIG. 40.

Figure 33A:
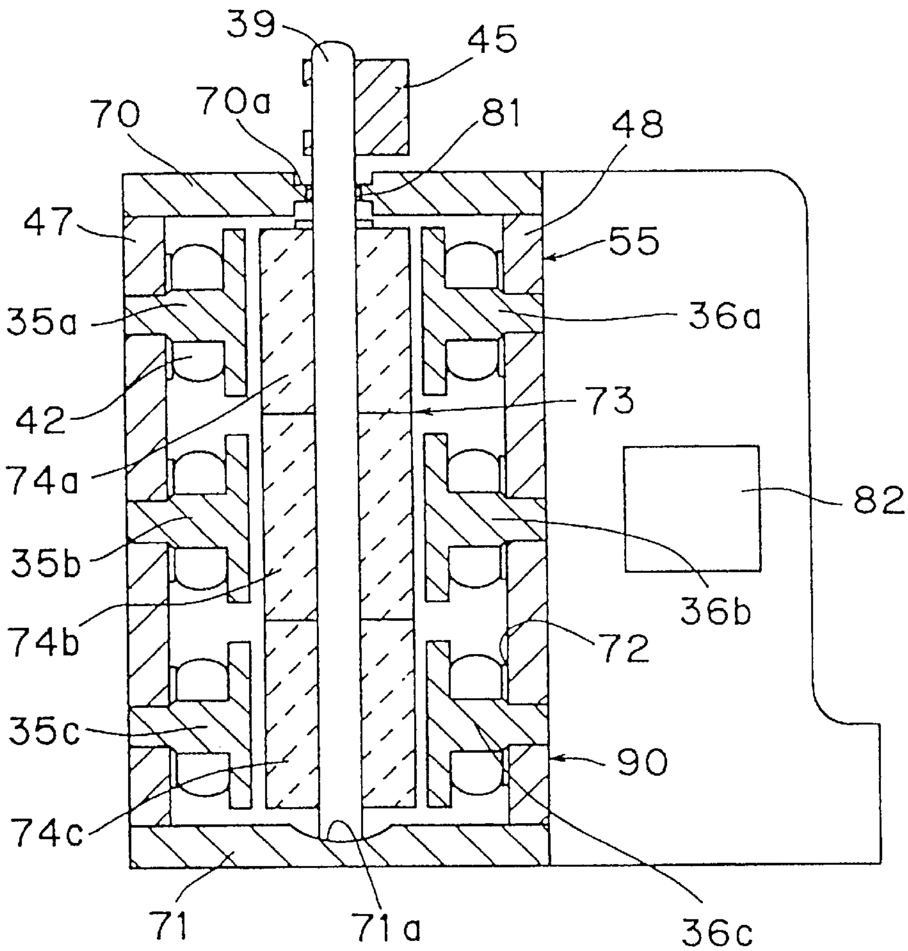
FIG. 33(*a*) is a lengthwise cross sectional view of a motor in accordance with a sixth exemplary embodiment of the invention.
Figure 33B:
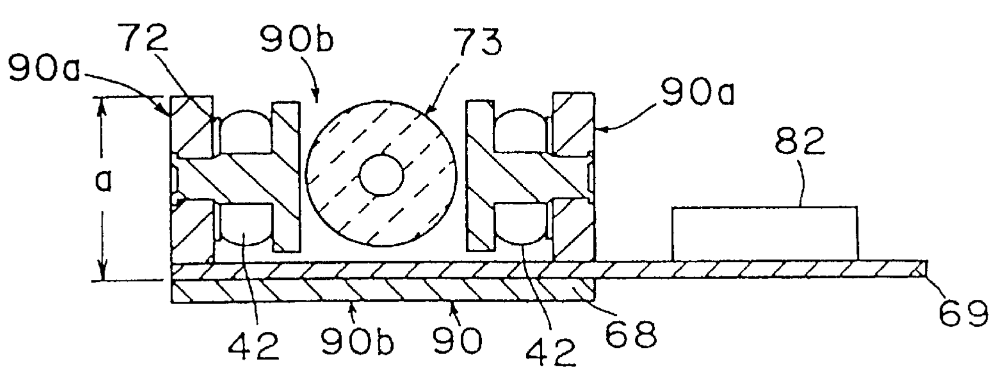

FIG. 33(*a*) is a cross sectional view in length direction of a motor for use in a pager having a vibration call function of mobile communication apparatus. FIG. 33(*b*) is a traversing cross sectional view of the motor. Description on those portions identical to the fifth embodiment is omitted here; only the points of difference are described. Those having the same structure as in FIG. 20 are represented in FIG. 33 by using the same symbols.

As shown in FIG. 33(*a*),(*b*), an outer case 90 has a thin rectangle shape in the cross section by a plane perpendicular to the axial direction of a rotor 73. The shorter sides 90*a*, 90*a* are formed with a pair of yokes 47, 48. One of the longer sides 90*b*, 90*b* is left open, while the other is formed with a plate 68 and a flexible printed board 69.

Figure 34:
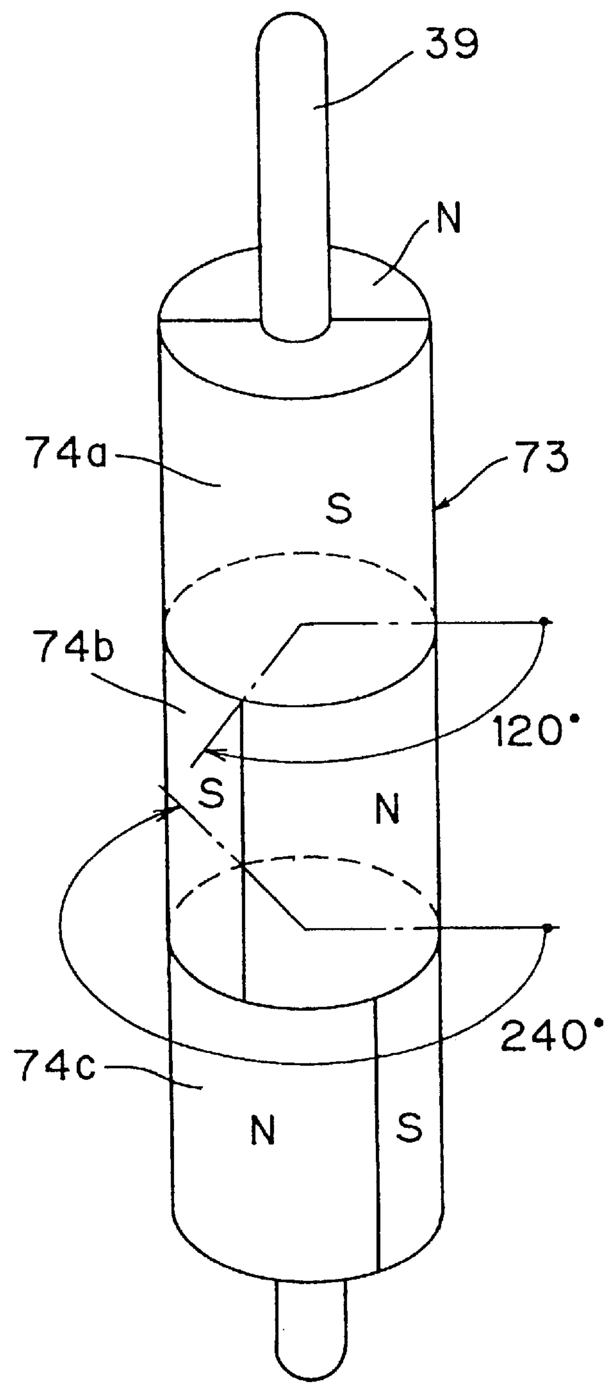
FIG. 34 is a perspective view showing a relative positioning of magnetic poles in magnetic units of the motor.

A rotor 73 is comprised of magnetic units 74*a*, 74*b* and 74*c* of empty cylindrical shape, each magnetized into two poles, the N and S. As shown in FIG. 34, the magnetized position of the N and S poles of the magnetic units 74*a*, 74*b*, 74*c* at each stage deviates relative to one another in a circumferential direction by 120, and each of the magnetic units 74*a*, 74*b*, 74*c* is fixed around a shaft 39 penetrating through the empty portion of the magnetic units 74*a*, 74*b*, 74*c*. This may be regarded as a single-body rotor 73 in which the distribution of magnetized poles is stratified in the axial direction on the surface.

Figure 35:
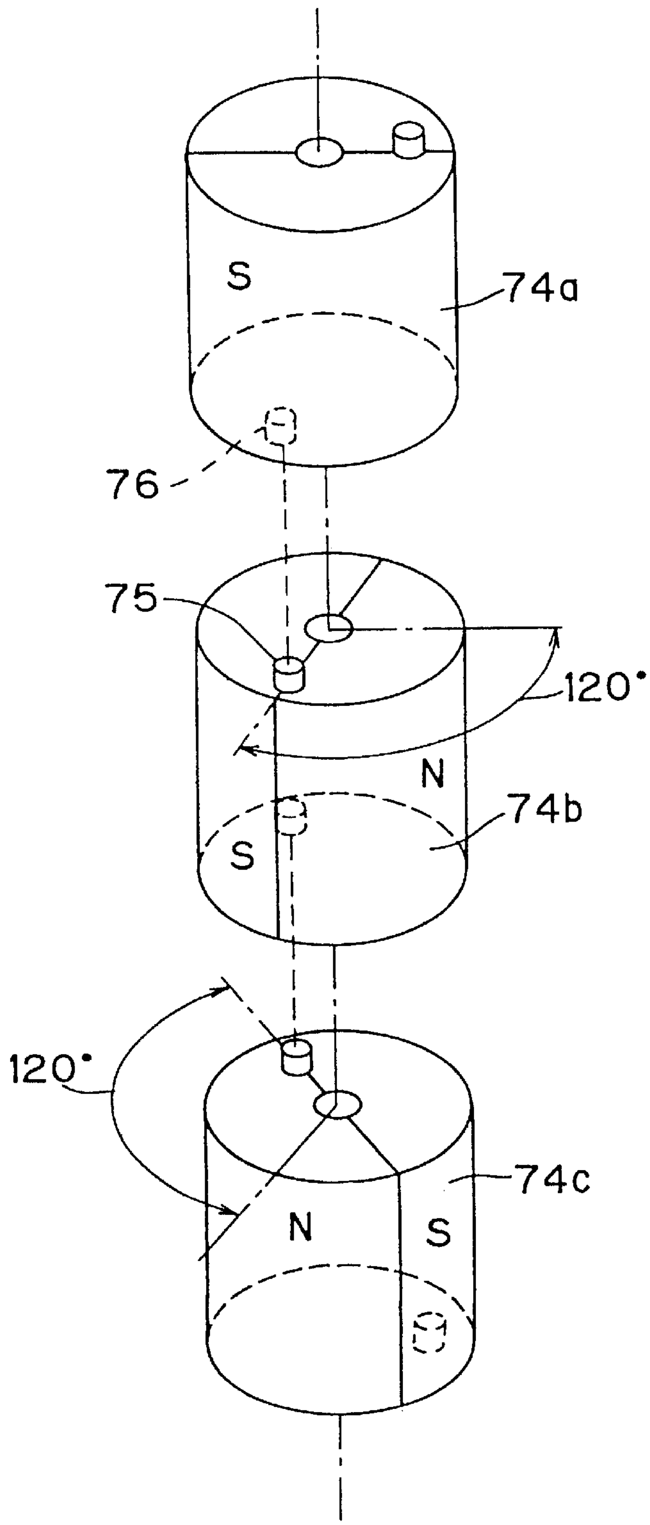
FIG. 35 is an exploded perspective view of magnetic units of the motor used to explain the position setting of magnetic poles.

In order to place the three magnetic units 74*a*, 74*b*, 74*c* in a correct position relative to one another so as to create a specified deviation in the polarity, each of the three magnetic units 74*a*, 74*b*, 74*c* is provided with protrusion/hollow 75, 76 for correct angular orientation, as shown in FIG. 35. When the magnetic units 74*a*, 74*b*, 74*c* are stacked with the protrusion/hollow 75, 76 engaged, the 120 deviation is automatically provided relative to one another.

Under the above structure, the magnetic units 74*a*, 74*b*, 74*c* may be magnetized respectively using the protrusion/hollow 75, 76 as the reference point; and then a certain specific arrangement of the magnetic poles is obtained by simply stacking them with the protrusion/hollow 75, 76 engaged. This makes the assembly work easy. As an alternative, a position orientation gear may be incorporated in a spacer provided between magnetic units as in the fifth embodiment. One example of such structure is described in the following.

Figure 36:
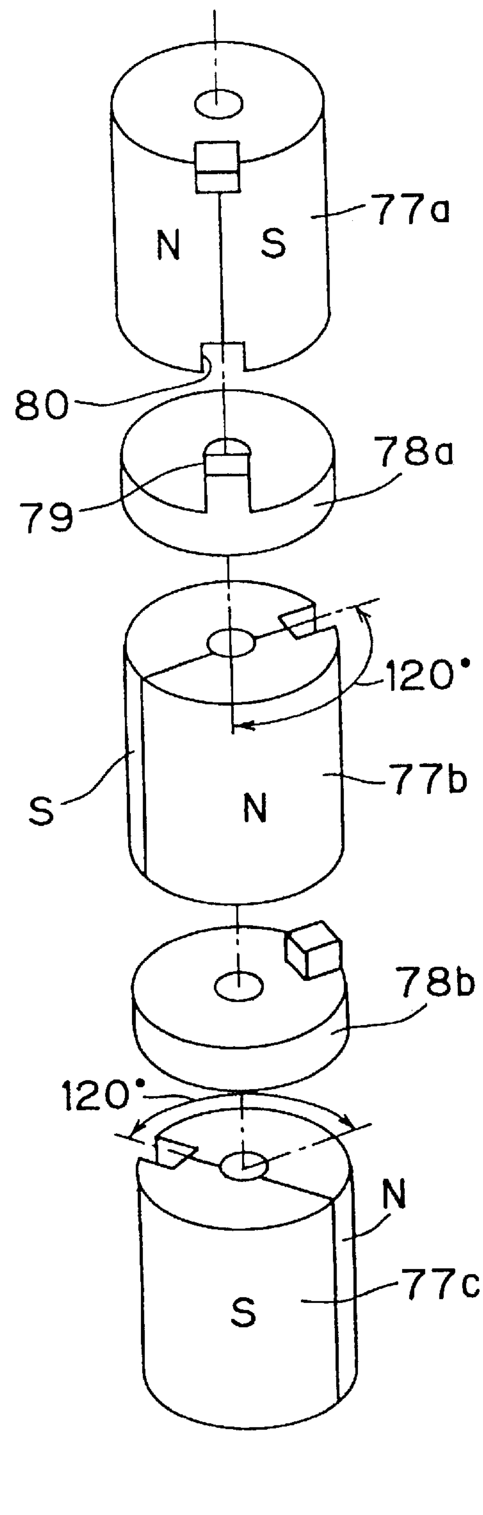
FIG. 36 is a perspective view of other magnetic units of the motor used to explain the position setting of magnetic poles.

FIG. 36 shows a structure which comprises three magnetic units 77*a*, 77*b*, 77*c* and spacers 78*a*, 78*b* provided in between the magnetic units. Each of the three magnetic units 77*a*, 77*b*, 77*c* is provided with hollow 80, while in each of the two spacers 78*a*, 78*b* protrusion 79 is provided to be engaged with the magnetic units. The protrusion 79 on spacers 78*a*, 78*b* is provided with an angular deviation 120 between the up and down protrusions. By simply assembling the magnetic units 77*a*, 77*b*, 77*c* having the hollow 80 engaged with the protrusion 79 of spacer 78*a*, 78*b*, the deviation of the magnetized poles relative to one another becomes 120 in a circumferential direction.

Under the above structure, the magnetic units 77*a*, 77*b*, 77*c* may be magnetized respectively using the hollow 80 as the reference point; and then stacking them by simply engaging the hollow 80 of magnetic units 77*a*, 77*b*, 77*c* with the protrusion 79 of spacers 78*a*, 78*b*, a certain specific arrangement of the magnetized poles is obtained. This makes the assembly work easy; accordingly, the above structure may be suitable to production in volume. In addition to the function as an aligner for relative positioning among the magnetic units, the spacers 78*a*, 78*b* may also play a role of imbalancing weight, and prevent the leakage of magnetic flux between the adjacent magnetic units as well.

A motor of the present embodiment is for use in a pager of mobile communication apparatus having a vibration call function. In order to pick up a vibration to be generated by motor, an imbalancing weight 45 is provided so as the centre of gravity is off the centre of rotation (centre of shaft).

For increasing the vibration by weight 45, the outer diameter of weight 45 should be as large as possible. The outer diameter D of weight 45 falls under the following limitation by Formula 28, like the case with fifth embodiment. Symbol a representing the dimension of shorter side 90*a* of outer case 90(see FIG. 33(*b*)).

$$0.6 \times a < D < a \tag{28}$$

Although the shaft 39 is not always located at the centre of bracket 70, diameter of the weight 45 may be determined in relationship with the diameter of magnetic units 74*a*–74*c* based on the following Formula 29, as the rotor 73 is rotating: where, Dm representing the outer diameter of magnetic units, D the outer diameter of weight.

$$0.8 \times Dm < D < 1.1 \times Dm \tag{29}$$

The bearing portion 70*a* of bracket 70 is made thinner around a hole for accepting shaft, as shown in FIG. 33(*a*), and the inner surface of which is coated with a low friction resin. The shaft 39 makes contact via the coated material 81 of low friction, therefore, the bearing loss is small. Further, as the thickness of low friction coating material 81 is as thin as less than e.g. 100 μm, which means that it works as a member of high rigidity. Therefore, a force exerted to the bearing portion 70*a* by imbalancing weight is transmitted to a structure outside the motor without being attenuated. Examples of the low friction coating material are shown in Table 1.

TABLE 1

| Item | Molybdenum disulfide | Fluoric resin | Graphite |
|---|---|---|---|
| Chemical formula | $MoS_2$ | | C |
| Crystal structure | Layered, Open | Complexed | Layered |
| Colour | Lead | Opal | Dark gray |
| Hardness (Mohs) | 1–1.5 | | 1.5–2 |
| Specific gravity | 4.7 | 2.2 | 2.2 |
| friction coeff. | 0.02 | 0.03 | 0.05 |
| Highest temp.(° C.) | 320 | 260 | 430 |
| Decompose temp.(° C.) | 1098 | 727 | 3498 |

Bracket 71 is made of a low friction resin and is provided with a bearing portion 71*a* of a spherical hollow shape integrated therein. Because the bracket 71 is made by injection molding, complexed shapes may be formed around the bearing portion 71*a*.

One among the group of e.g. fluoric resin, polyacetal resin and polyimide resin may be used for the low friction resin. The fluoric resin has been widely used in many industrial fields because of its anti-chemical property, heat resisting property and non-sticking property, besides the advantage in low friction.

In a case where the bracket 71 is made of a metal material, a pivotal bearing may be formed by coating a same low-friction coating material used for the bearing 70*a* of bracket 70.

A flexible printed board 69 is mounted with integrated circuits 82 and other electronic components for driving, and is affixed on the plate 68. Terminal end of coil 42 wound around each of the salient poles 35*a*–35*c*, 36*a*–36*c* is connected to terminal board 72, which is then electrically connected to a land on the flexible printed board 69. Where a longer side 90*b* is constituted with the flexible printed board 69, as in the present embodiment, it becomes relatively easier to mount driving circuit components on the flexible printed board 69 for the thin configuration of a motor. Thus, a thin and small brushless motor may be formed. The other longer side opposit to the flexible printed board 69 is left open.

Figure 37:
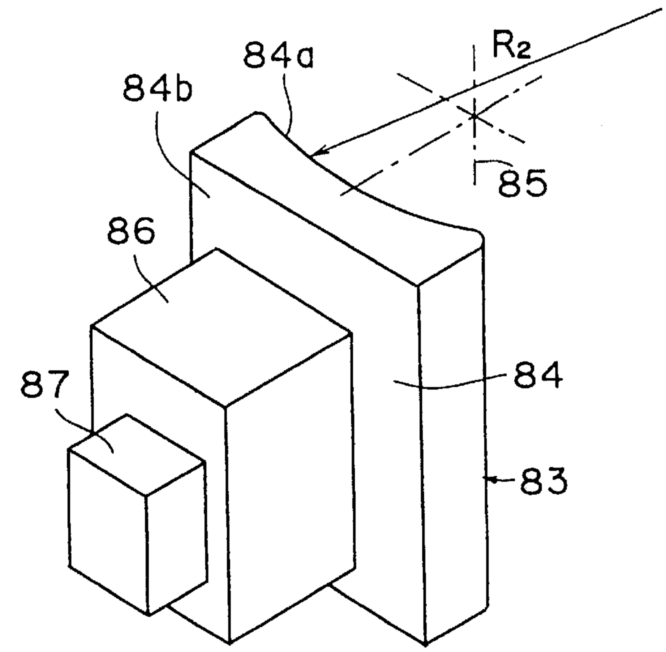
FIG. 37 is a perspective view of an exemplary salient pole of the motor.

Like the case with fifth embodiment, the salient poles 35*a*–35*c*, 36*a*–36*c* of the present embodiment are not integrated with yokes 47, 48, but each of them constitutes a piece component. FIG. 37 shows an example of the salient pole as an independent piece component.

Representing the entire salient pole of FIG. 37 with a numeral 83, a surface 84*a* of protruding portion 84 of the salient pole 83 facing to rotor 73 has a curvature whose radius is not centred at rotor axis 85 but it is located at a point further away from the rotor axis 85. Namely, if the radius of the curvature R2 is infinite the surface becomes flat.

Figure 38:
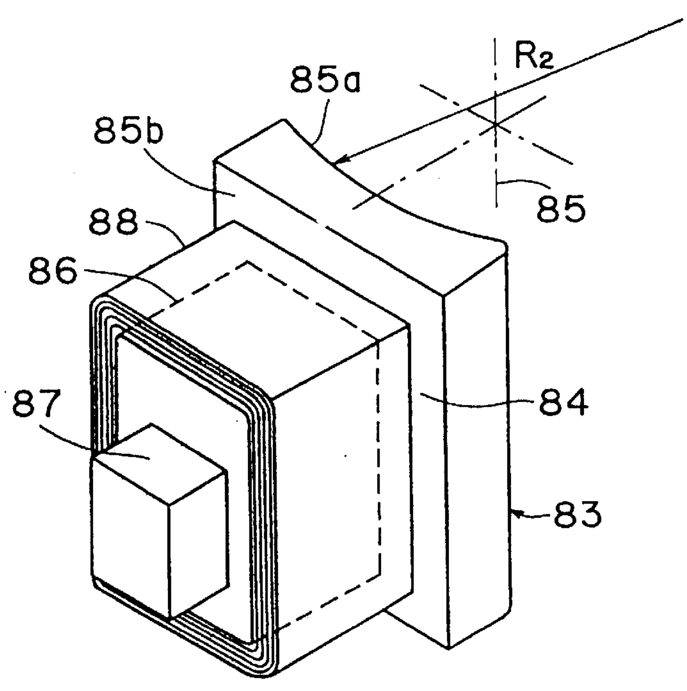
FIG. 38 is a perspective view of a salient pole of the motor wound around with coil.

A surface 84*b* of protruding portion 84, which is the reverse surface of the surface 84*a* facing to rotor 73, is flat, and a tooth portion 86 has a rectangular cross sectional shape. Therefore, a coil may be wound around in a flat rectangular form with an esthetic finish accompanying least displacement of winding. This is advantageous also in the view point of reliability. FIG. 38 shows a salient pole of FIG. 37 wound around with a coil having a flat rectangular shape in the cross section.

The shape of a hole in the yoke 47, 48 for engagement with the salient pole 83 of FIG. 37 is square, not round. Accordingly, a joint portion 87 of salient pole 83 is also shaped square in the cross section. Thus, when the portions for engagement are shaped in a polygonal form other than round, the salient pole 83 and the yoke 47, 48 may be aligned to a correct relative positioning by themselves when inserted.

Figure 39:
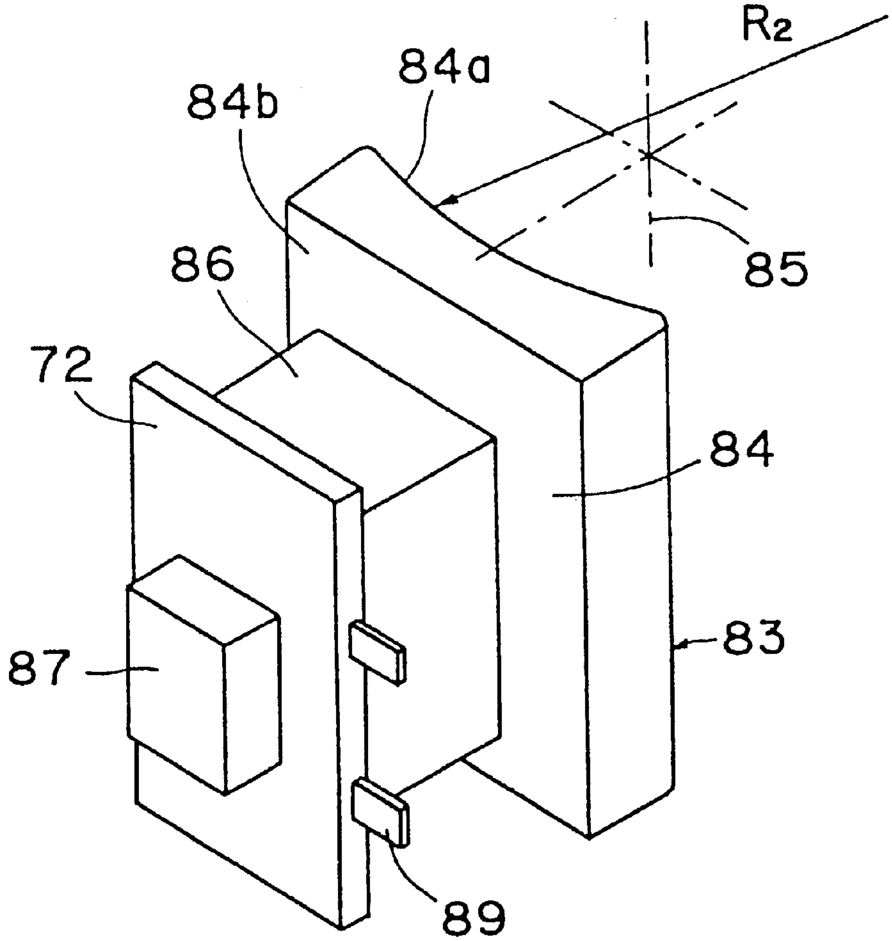
FIG. 39 is a perspective view of a salient pole of the motor provided with a terminal board.

Each of the salient poles 35*a*–35*c*, 36*a*–36*c* in FIG. 33 has been insulated by an electrostatic coating process. Coil 42 is wound around over the insulation layer with the terminal board 72 affixed to a portion of salient pole provided for insertion into yoke, and terminal end of the coil 42 is pressure-connected to the terminal board 72 at a vicinity of the salient pole. FIG. 39 shows a salient pole, or a piece component, attached with the terminal board 72. The terminal board 72 is formed by an insulating resin 90 and a metal plate 89 integrated therein. One salient pole 83 is provided with two metal plates 89; one for the starting end and the other for wound end of the coil. Thus, a salient pole 83 wound around with coil assumes a shape similar to a chip resistor, or a component ready to be mounted immediately with ease.

Figure 40:
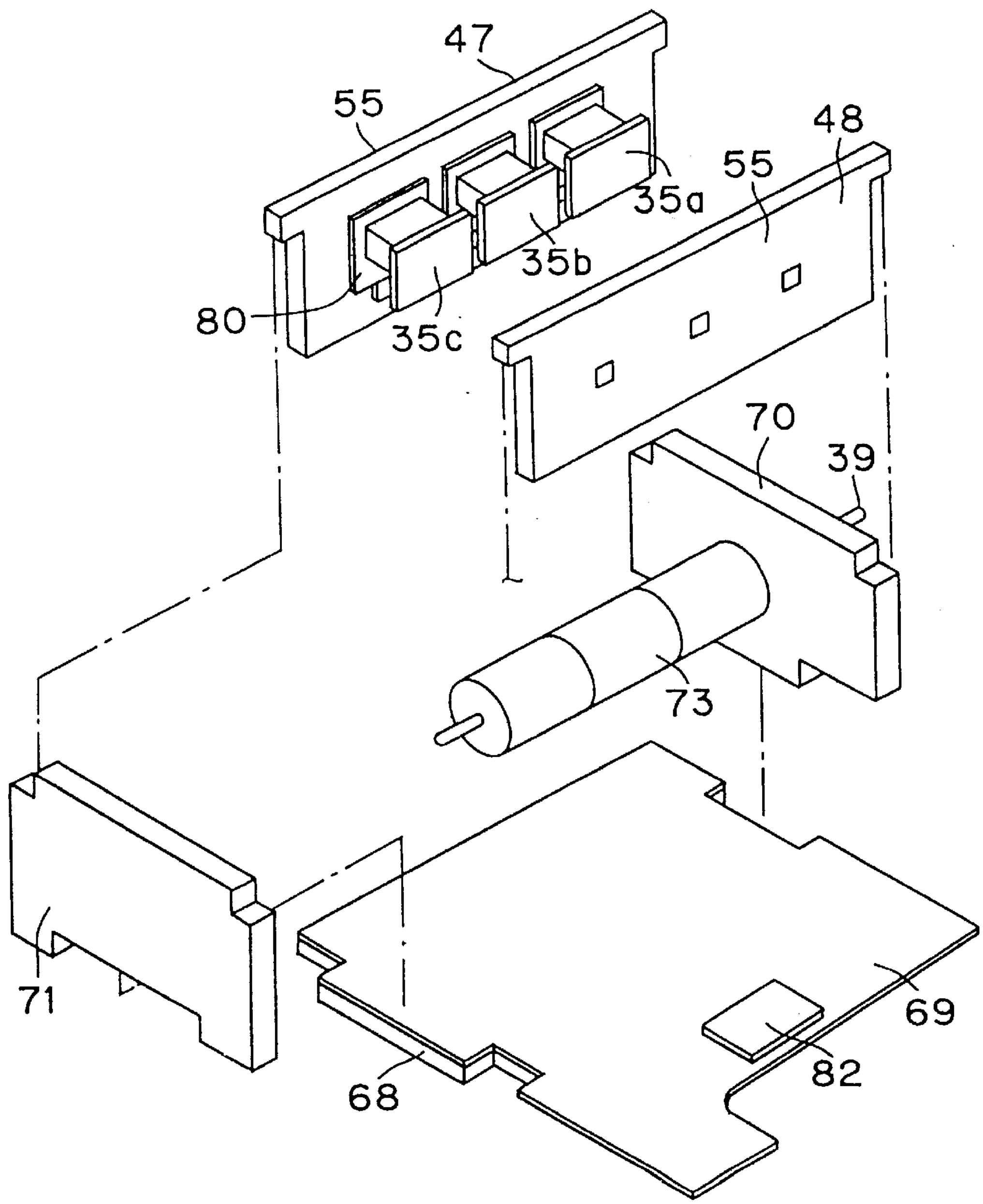
FIG. 40 is an exploded perspective view used to explain assembly of the motor.

Now in the following, a process of assembling a motor of FIG. 33 is described with reference to FIG. 40.

Flexible printed board 69 mounted with integrated circuits 82 and other electronic components is affixed on plate 68, rotor 73 which being an assembled body of magnetic units 74*a*–74*c* and shaft 39 is fitted to bearing portion 70*a* of bracket 70 and then mounted on the plate 68 from a direction perpendicular to the shaft, and then the other bracket 71 is mounted from a slightly oblique direction to be fit to the shaft. A first core 54 having salient poles 35*a*–35*c* wound around with coil 42 with the terminal ends fixed at terminal board 72 and mounted on yoke 47 in an axial direction with gap between one another is set on the brackets 70, 71; likewise, a second core 55 having salient poles 36*a*–36*c*, etc. mounted on yoke 48 is set.

These components may be assembled from a direction perpendicular to the axial direction to be built in. After the frame work of a motor is completed, an imbalancing weight 45 is put on the shaft 39.

A seventh exemplary embodiment of the invention is described hereunder with reference to FIG. 41 through FIG. 45.

Figure 41A:
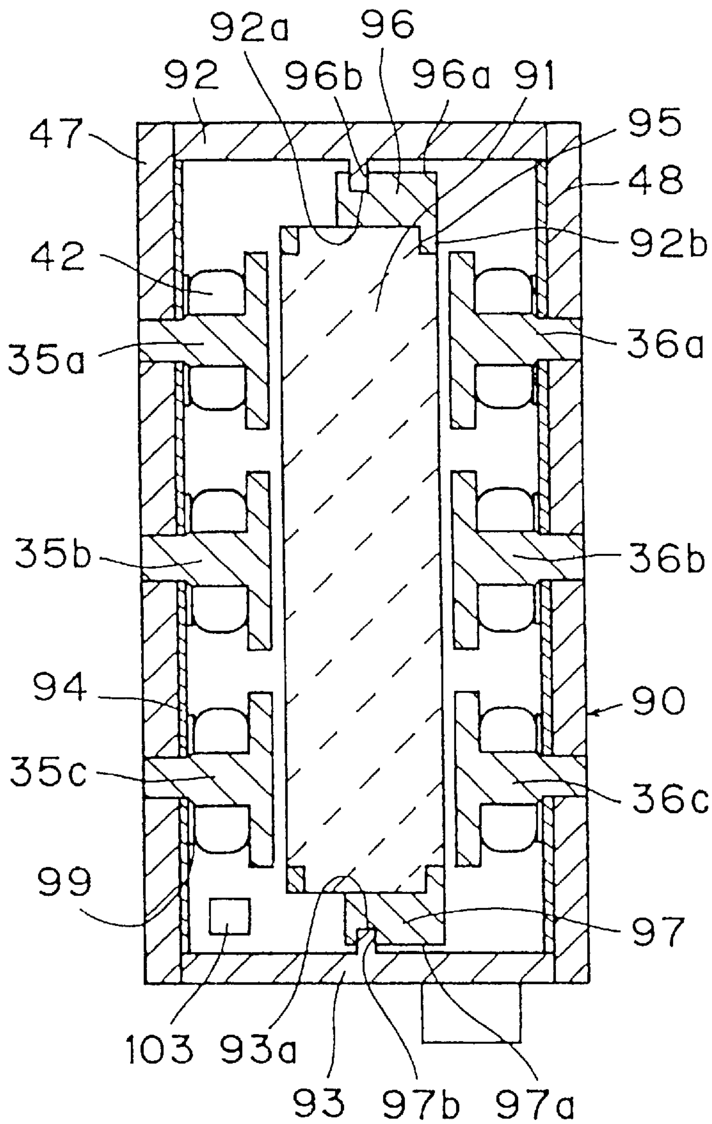
FIG. 41(*a*) is a lengthwise cross sectional view of a motor in accordance with a seventh exemplary embodiment of the invention FIG. 41(*b*) is a traversing cross sectional view of the motor.
Figure 41B:
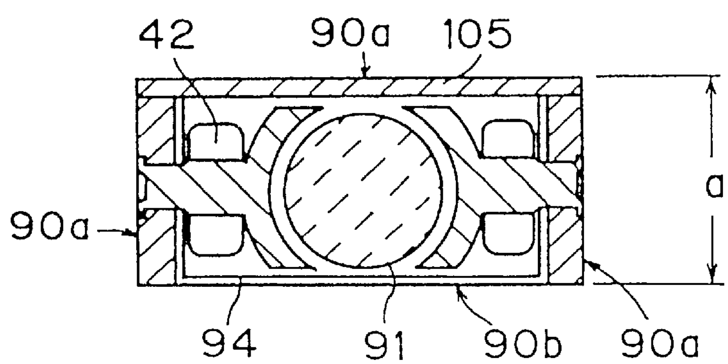

FIG. 41(*a*) is a cross sectional view in a lengthwise direction of a motor for use in a pager having a vibration call function of mobile communication apparatus. FIG. 41(*b*) is a traversing cross sectional view of the motor. Description on those portions identical to those of the fifth embodiment is omitted here; only the points of difference are described. Those having the same structure as in FIG. 20 are represented in FIG. 41 by using the same symbols.

As shown in FIG. 41, a rotor magnet 91 is a magnetic body of a column shape. Rotors in the fifth and sixth embodiments have been made of three magnetic units 38*a*–38*c*. In the present embodiment, the rotor is made of a single piece of a magnetic body. However, the rotor of present embodiment is magnetized into a same state as those of the fifth and sixth embodiments. Therefore, for the sake of easy explanation the rotor magnet 91 is described in FIG. 42 splitted into three stages; as if it is made of three magnetic units each magnetized with the phase of magnetic poles deviating by 120 relative to one another. Because the rotor magnet 91 is a magnet of a single body, work steps for aligning magnetic units to a right position in relation to the magnetic pole is eliminated. At both ends of the rotor magnet 91, a ring portion 95 of a smaller diameter is provided for accepting a ring-shape bearing bush 96, 97 to be pressed in and fixed thereto.

Figure 42:
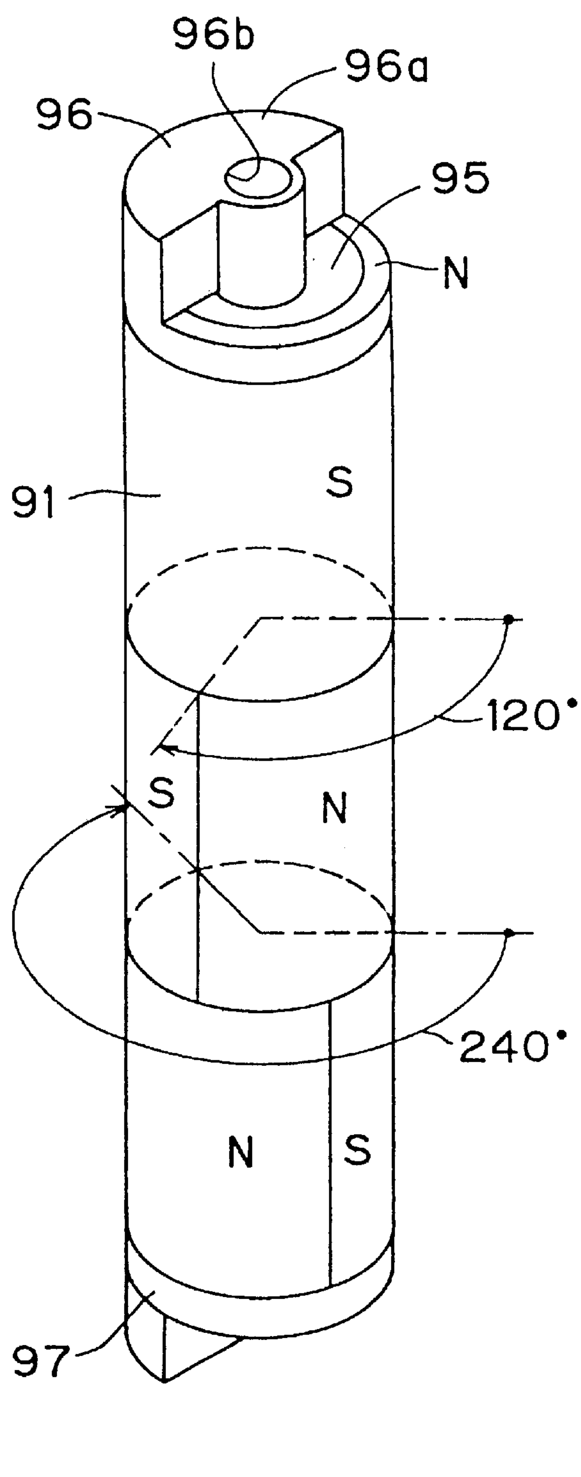
FIG. 42 is a perspective view showing a rotor magnet of the motor provided with bushing.
Figure 43:
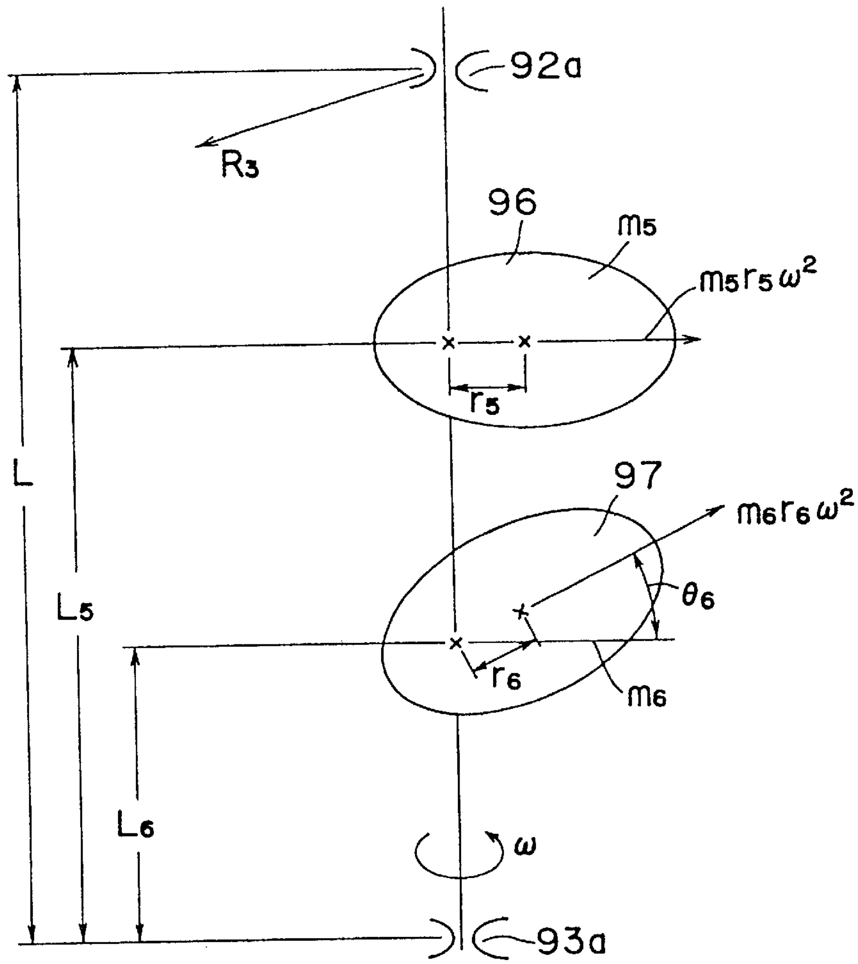
FIG. 43 is a model chart used to explain the quantity of imbalance in the motor.

Each of the bearing bushes 96, 97 is provided with a thick crescent portion 96*a*, 97*a*, as shown in FIG. 41 or FIG. 42, which is for generating an imbalancing force as a result of rotating. The bearing bush 96, 97 is provided also with a bearing hole 96*b*, 97*b* at the centre. Each of the top and bottom bearing brackets 92, 93 is provided with a bearing pin 92*a*, 93*a* at the centre for a coupling with the bearing hole 96*b*, 97*b*. The rotor magnet 91 is supported revolvable by the top and bottom bearing brackets 92, 93.

A motor of the present embodiment is for use in a pager of mobile communication apparatus having a vibration call function. In order to pick up a vibration to be generated by a motor, bearing bushes 96, 97 whose centre of gravity is off the center of rotation (shaft centre) are provided so as the centrifugal force generated by rotation at the gravity centre of bearing bushes 96, 97 is transmitted to a stator of the motor. The larger the radial load on bearing pins 92*a*, 93*a* the greater is the vibration. The load exerted on bearing pins 92*a*, 93*a* is described referring to FIG. 43, a model chart.

Representing the distances from bearing pin 93*a* to bearing bush 96 and to bearing bush 97 as L5, L6, respectively, the distance from bearing pin 93*a* to bearing pin 92*a* as L, the distance between gravity centre of bearing bush 96 and shaft centre as r5, and the distance between gravity centre of bearing bush 97 and shaft centre as r6; and the shaft centre is being represented with X axis, and Y axis being perpendicular to the X axis. The centrifugal force F5, F6 to be exerted on bearing bush 96, 97 decomposed in X axis and Y axis are represented in Formula 30: where; ω representing angular velocity, m5, m6 are respectively the mass of bearing bush 96, bearing bush 97.

$$F5x = m5r5\times\omega^2 = F5$$

$$F5y = 0$$

$$F6x = m6r6\times\omega^2\cos\theta6 = F6\cos\theta6$$

$$F6y = m6r6\times\omega^2\sin\theta6 = F6\sin\theta6 \qquad (30)$$

Assuming a reactive force at bearing pin 92*a* against bearing bush 96 as R3, the reactive force R3 decomposed into the directions of X and Y, viz. R3x, R3y, are represented in terms of a momentum in Formula 31, with the bearing pin 93*a* of bearing bush 97 as fulcrum:

$$LR3x = L5F5x + L6F6x$$

$$LR3y=L5F5y+L6F6y \quad (31)$$

Accordingly, a square of the reactive force R3 is represented by Formula 32:

$$\begin{aligned} R3^2 &= R3x^2 + R3y^2 \quad (32) \\ &= (F5x\cdot(L5/L) + F6x\cdot(L6/L))^2 + \\ &\quad (F5y\cdot(L5/L) + F6y\cdot(L6/L))^2 \\ &= (F5\cdot(L5/L) + F6\cos\theta6\cdot(L6/L))^2 + \\ &\quad (F6\sin\theta6\cdot(L6/L))^2 \end{aligned}$$

In Formula 32, the angular velocity, mass of bearing bush, eccentricity distance, distance in axial direction are all known values for designing, while the unknown is angle θ6. The R3 reaches the highest when θ6=0; viz. when the direction of centrifugal forces of the two bearing bushes 96, 97 coincides.

In order to maximize the imbalancing load on the bearing pin 92*a* corresponding to bearing bush 96, the directions of eccentricity of gravity centre in the two bearing bushes 96, 97 have to coincide. Taking a practical allowance in the accuracy of assembly into consideration, Formula 33 has to be fulfilled.

$$|\theta6| < 30° \quad (33)$$

Reactive force R4 to be exerted on the bearing pin 93*a* corresponding to bearing bush 97, with the bearing pin 92*a* corresponding to bearing bush 96 asfulcrum, may be obtained through Formula 34:

$$\begin{aligned} R4^2 &= R4x^2 + R4y^2 \quad (34) \\ &= (F5x\cdot((L-L5)/L) + F6x\cdot((L-L6)/L))^2 + \\ &\quad (F5y\cdot((L-L5)/L) + F6y\cdot((L-L6)/L))^2 \\ &= (F5\cdot((L-L5)/L) + F6\cos\theta6\cdot((L-L6)/L))^2 + \\ &\quad (F6\sin\theta6\cdot((L-L6)/L))^2 \end{aligned}$$

where, R4x, R4y representing the components of reactive force R4 in X,Y directions.

Formula 34 indicates that the reactive force R4 on bearing pin 93*a* corresponding to bearing bush 97 is maximized when the eccentricity angles in gravity centre of bearing bushes coincide.

In order to maximize the vibration to be caused by the imbalance, a product of the imbalancing mass and the gravity centre has to be made as great as possible. The bearing bush should have a largest possible outer diameter, yet it should not touch the outer case 90 of motor. The relationship may be represented in Formula 35: where; Dm representing the outer diameter of rotor magnet 91, Db representing the largest outer circumferential diameter of bearing bush.

$$0.8\times Dm < Db < 1.1\times Dm \quad (35)$$

As the dimensions of imbalancing bearing bushes 96, 97 are restricted by a shorter side 90*a* of outer case 90, they should practically be determined so as to fulfill Formula 36: where; symbol a representing the length of shorter side 90*a* of outer case 90 (see FIG. 41(*b*)), Db representing the largest outer diameter of bearing bushes 96, 97.

$$0.6a < Db < a \quad (36)$$

Figure 44:
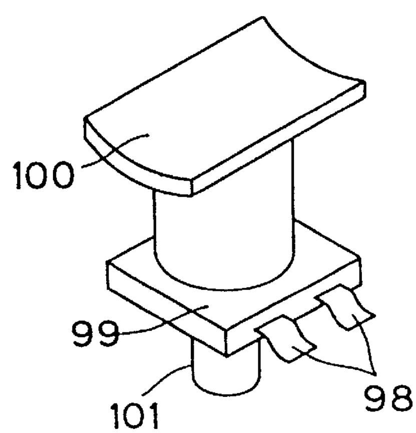
FIG. 44 is a perspective view of a salient pole of the motor wound around with coil and provided with a terminal board.

Likewise the case with the fifth embodiment, the salient poles 35*a*–35*c*, 36*a*–36*c* are not integrated with yokes 47, 48, but each of them constitutes an independent piece component. As shown in FIG. 44, each of the salient poles 35*a*–35*c*, 36*a*–36*c* is wound around with coil 42, at that time a terminal board formed by a resin integrated with metal pieces 98 is attached to, and end terminals of coil 42 are electrically connected to the metal pieces 98 of terminal board 99. The beginning and the ending of coil 42 are each connected to the metal piece 98 by fusing through thermal compression. A protruding portion 100 of the salient pole 35*a*–35*c*, 36*a*–36*c* is provided with a circular arc surface at the surface facing the rotor magnet 91. Each of the salient pole 35*a*–35*c*, 36*a*–36*c* is also provided with a cylindrical portion 101 to be inserted in the yoke 47, 48 for positioning.

Assembly of a motor of the present embodiment shown in FIG. 41 is described in the following with reference to FIG. 45

Figure 45:
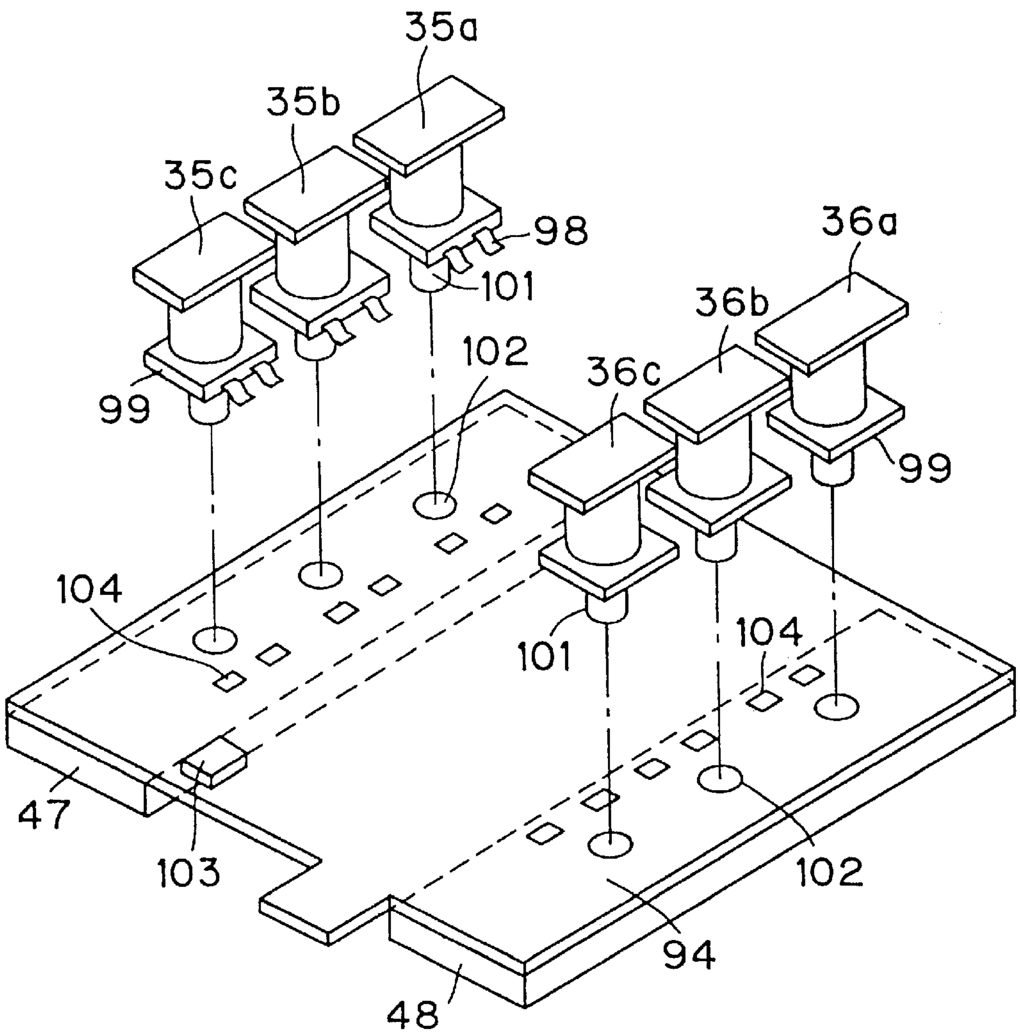
FIG. 45 is an exploded perspective view used to explain assembly of the motor.

As shown in FIG. 45, a flexible printed board 94 is fixed on yokes 47, 48 in both sides, a certain specific number of salient poles 35*a*–35*c*, 36*a*–36*c* are disposed thereon with the cylindrical portions 101 inserted in holes 102 provided in the yokes 47, 48. The flexible printed board 94 is coated with a cream solder in advance and is mounted with integrated circuits 103 and other electronic components. Therefore, the metal piece 98 of terminal board 99 positioned on land 104 of flexible printed board 94 is soldered during a reflow furnacing for electrical conduction with the coils and electronic components.

After the electrical conduction is secured, each of the yokes 47, 48 mounted with the salient poles 35*a*–35*c*, 36*a*–36*c* is raised upright from both sides, and the rotor magnet 91 assembled with bearing bushes 96, 97 is placed between the yokes 47, 48. And then the bearing brackets 92, 93 are attached to from the up, and the rotor magnet 91 is supported by the yokes 47, 48. A sheet 105 is affixed, as a result the inside of motor is kept sealed.

The bearing brackets 92, 93 are provided respectively with bearing pins 92*a*, 93*a*. Different from those in the fifth and sixth embodiments, the rotor magnet 91 of the present embodiment has an empty-cylindrical shape without shaft. Therefore, the bearing bushes 96, 97 are inserted to the rotor magnet from both ends to have bearing gear formed in engagement of the holes 96*b*, 97*b* with the bearing pins 92*a*, 93*a* of bearing brackets 92, 93. The bearing pin 92*a*, 93*a* may be formed by means of a coining press if the bearing bracket 92, 93 is made of a metal material.

An eighth exemplary embodiment of the present invention is described in the following referring to FIG. 46–FIG. 56.

Figure 46A:
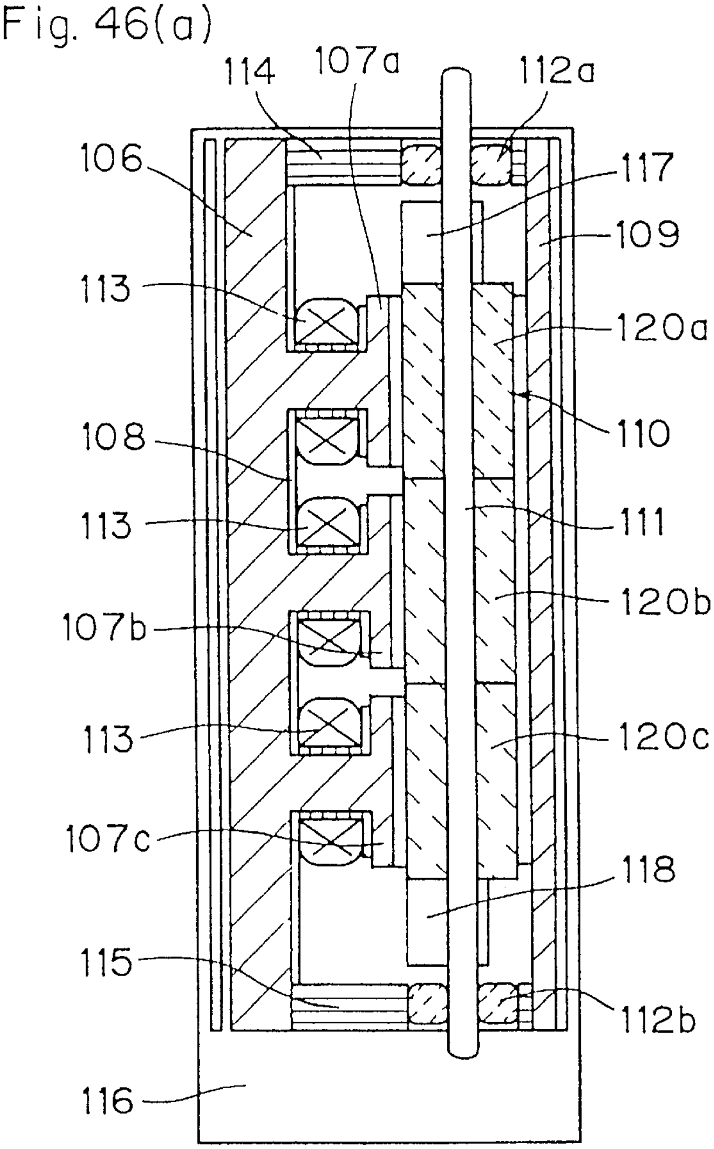
FIG. 46(*a*) is a lengthwise cross sectional view of a motor in accordance with an eighth exemplary embodiment of the invention, FIG. 46(*b*) is a traversing cross sectional view of the motor.
Figure 46B:
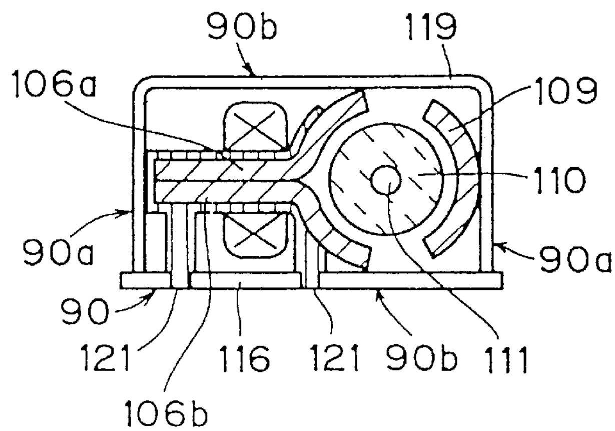

FIG. 46(*a*) shows a cross sectional view in the lengthwise direction of a motor for a pager of mobile communication apparatus, FIG. 46(*b*) is a traversing cross sectional view of the motor.

As shown in FIG. 46(*a*), FIG. 46(*b*), a motor of the present embodiment comprises a core 106 and a back yoke 109 facing one another, with a rotor 110 disposed in between.

It is advantageous for obtaining a good balancing to have two cores 106 disposed symmetrically with respect to rotor 110, like the cases in the fifth through seventh embodiments. In a motor where three salient poles 107*a*, 107*b*, 107*c* are provided, however, it needs the coil 113 for six pieces, consequently twelve terminal ends of coils 113. The amounts of work for winding the coils and handling the terminal ends are substantial. Therefore, a motor of the present exemplary embodiment comprises one core 106, and one back yoke 109 in place of the other core. Under such a constitution, only three coils are used, hence the number of terminal ends is six. This means a substantial saving of works for winding coils as well as for connecting the terminal ends; which may lead to a cost reduction.

Rotor 110 has been structured in a same arrangement as that of FIG. 34; being magnetized in three stages in lengthwise direction, 120*a*, 120*b*, 120*c*, the magnetized position at each stage deviating relative to one another by 120, and shaft 111 is penetrating through the empty portion of the cylindrical magnetic units 120*a*–120*c*.

The shaft 111 is supported rotatable by bearings 112*a*, 112*b* inserted and fixed on brackets 114, 115.

The core 106, back yoke 109 and brackets 114, 115 are fixed respectively on the printed board 116, and the whole is covered with an anti-dust cover 119.

The outer case 90 is shaped to a thin rectangle shape in a cross sectional plane perpendicular to axial direction; one of the longer sides 90*b* is constituted with a printed board 116, while the remaining three sides, viz. the other longer side 90*b* and a pair of the shorter sides 90*a*, 90*a* are structured by the anti-dust cover 119.

Figure 47:
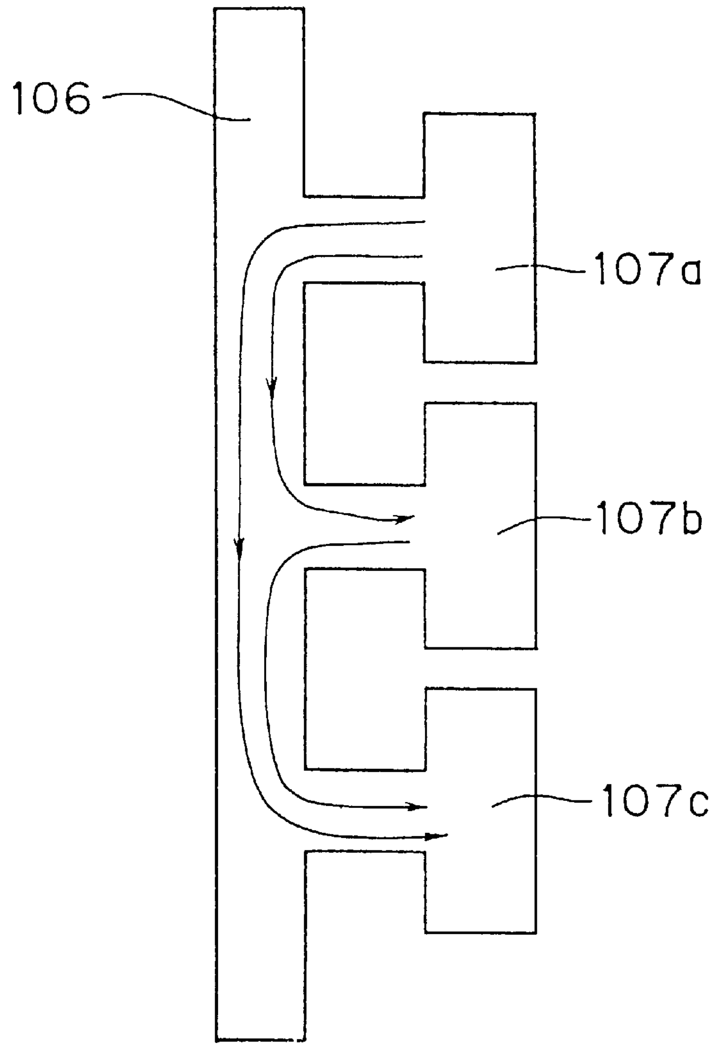
FIG. 47(*a*) is a side view showing a core of the motor.
Figure 47B:
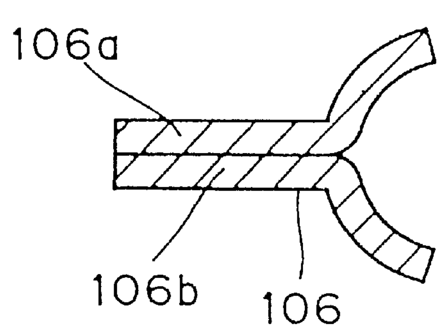

FIG. 47(*a*),(*b*) show a structure of core 106; FIG. 47(*a*) a side view, FIG. 47(*b*) a traversing cross section. The core 106 has been formed by combining two core components 106*a*, 106*b* of the same shape splitted into half by a plane containing the centre axis of motor and the core 106. Each of the core components 106*a*, 106*b* may be made either by stacking a plurality of silicon steel sheets or with a single sheet of metal plate.

When forming the core 106 by stacking silicon steel sheets, the efficiency is the highest, in view of the loss due to eddy current in the core, when the steel sheets are stacked in parallel with a plane in which the magnetic flux flows. In a motor having three salient poles 107*a*–107*c* disposed in parallel to the axial direction, the magnetic flux flows as illustrated by arrows in FIG. 47(*a*); it flows in a radiant direction with respect to the axis within the area of salient poles 107*a*–107*c*, and in a direction parallel to the axis within an area bridging the three salient poles 107*a*–107*c*. Accordingly, a highest efficiency may be obtained in the present embodiment when the steel sheets are stacked in a direction perpendicular to a plane formed by the axis and the core.

A core 106 of the present embodiment has been made with two core components 106*a*, 106*b* overlaid together in line with the direction of magnetic flux. This structure presents a higher efficiency because of the smaller loss due to eddy current, as compared with a core formed as one single body.

As the core 106 has been formed by combining two core components 106*a*, 106*b* of the same shape splitted into half by a plane containing the axis and the core 106, each of the core components may be made with ease through only bending and cutting a metal sheet, or by pressing. This means that the component may be manufactured with a comparative ease from a silicon steel sheet, etc. which steel is not suitable to undergoing process steps such as contraction, forging.

Figure 48A:
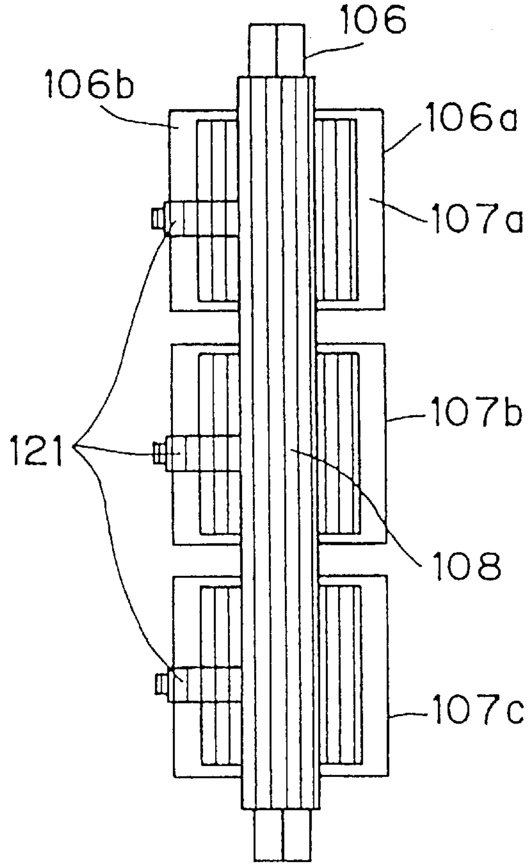
FIG. 48(*a*) is a front view showing a structure of core and resin insulator of the motor.
Figure 48B:
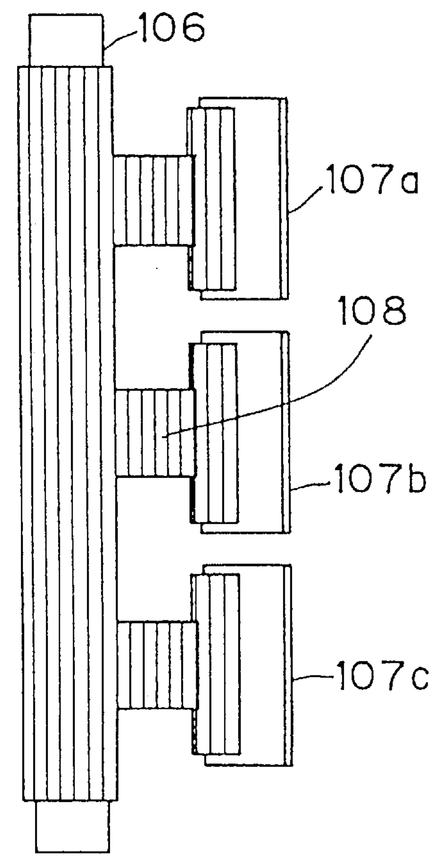
Figure 48C:
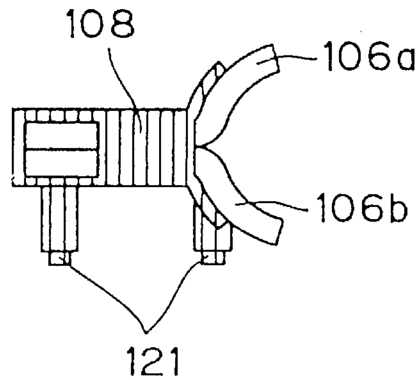

FIG. 48(*a*),(*b*),(*c*) shows structure of the above core 106 and resin insulator 108. The two core components 106*a*, 106*b* of core 106 are fixed together to form one single body by a resin molded insulator 108, which at the same time forms an insulation layer for a coiling part of the core 106. On one side of the core 106 facing the printed board 116, a pin 121 is provided to be inserted in and fixed on the printed board 116.

With the above structure, binding of core components 106*a* and 106*b* and insulating of the core 106 are attained simultaneously; which means saving of assembly works, making it suitable for the production in volume. Further, as the resin molding process has a high degree of freedom in providing various shapes, the resin molded component may be provided with additional shapes and functions.

Furthermore, because the core 106 may be fixed on the printed board 116 by simply pushing the pin 121 in; which means that correct positioning of the core 106 on printed board 116 is done at the same time.

A motor of the present embodiment is for use in a pager of mobile communication apparatus, or a motor driven by battery. Therefore, it is a strict requirement for the motor that it can start operation without fail at a voltage as low as 1.2–3.3V. Among the factors related with the starting voltage of a motor are the loss at shaft, the cogging torque due to mutual attraction between core and magnet, the voltage drop in driving circuits, etc. In a motor of the present embodiment, following countermeasures, among others, have been taken for reducing the cogging torque.

Figure 49:
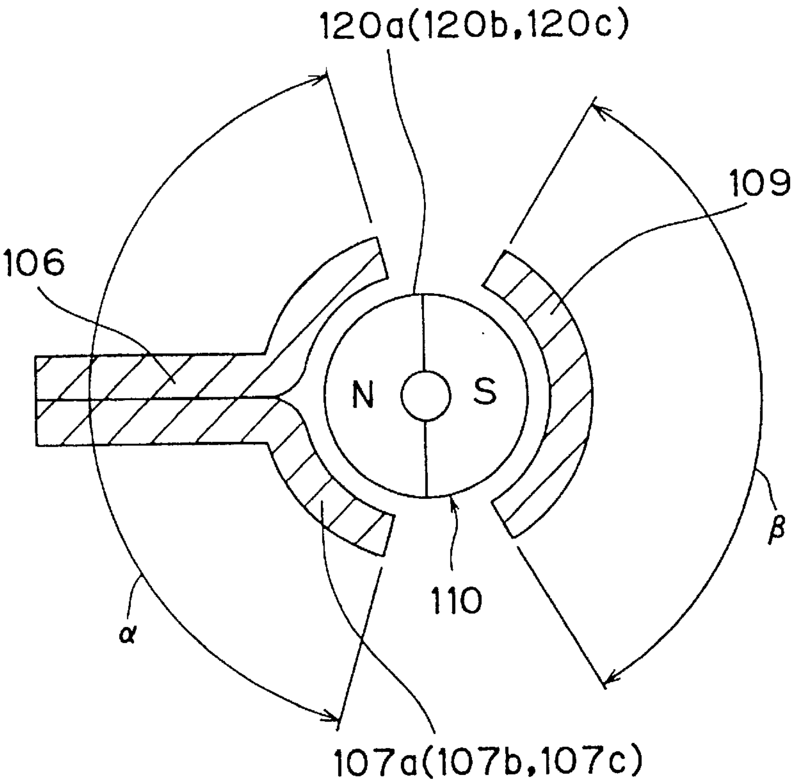
FIG. 49 is a chart showing relationship among the core, the back yoke and the rotor magnet of the motor.

FIG. 49 shows relationship among the core 106, the back yoke 109 and the rotor 110. The angle a by salient pole 107*a*–107*c* of core 106 facing the rotor 110 and the angle $\beta$ by back yoke 109, shown in FIG. 49, have a close relationship with cogging torque.

Figure 50:
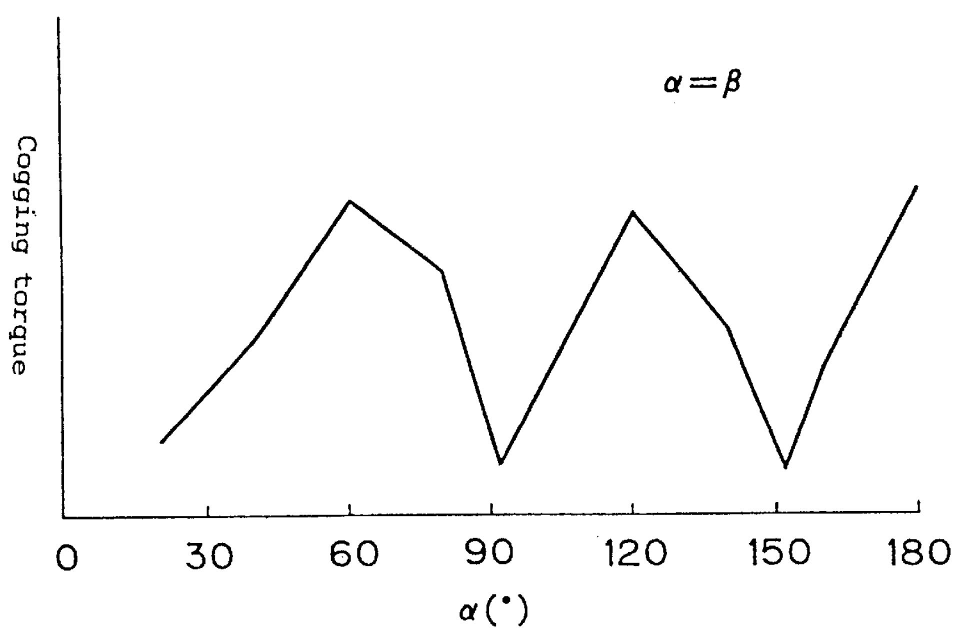
FIG. 50 is a graph showing relationship between the core angle α and the cogging torque in the motor.

FIG. 50 shows a relationship between the angle $\alpha$ and the cogging torque, when the angle $\alpha$ is varied under a condition $\alpha=\beta$. As seen from FIG. 50, the cogging torque goes the smallest at two points, at the vicinities of 90° and 150°. Therefore, the cogging torque may be suppressed by setting the angle $\alpha$ at around 90° or 150°. At 90° however, leakage of magnetic flux increases to a deteriorated magnetic efficiency; so, the angle 150° may produce a better result.

The close relationship of cogging torque with the angle $\alpha$ of salient pole 107*a*–107*c* and the angle $\beta$ of back yoke of core 106 has been described above. The cogging torque bears a close relationship also with the angles $\alpha$ and $\beta$ when the $\alpha$ and $\beta$ taking different values each other.

Figure 51:
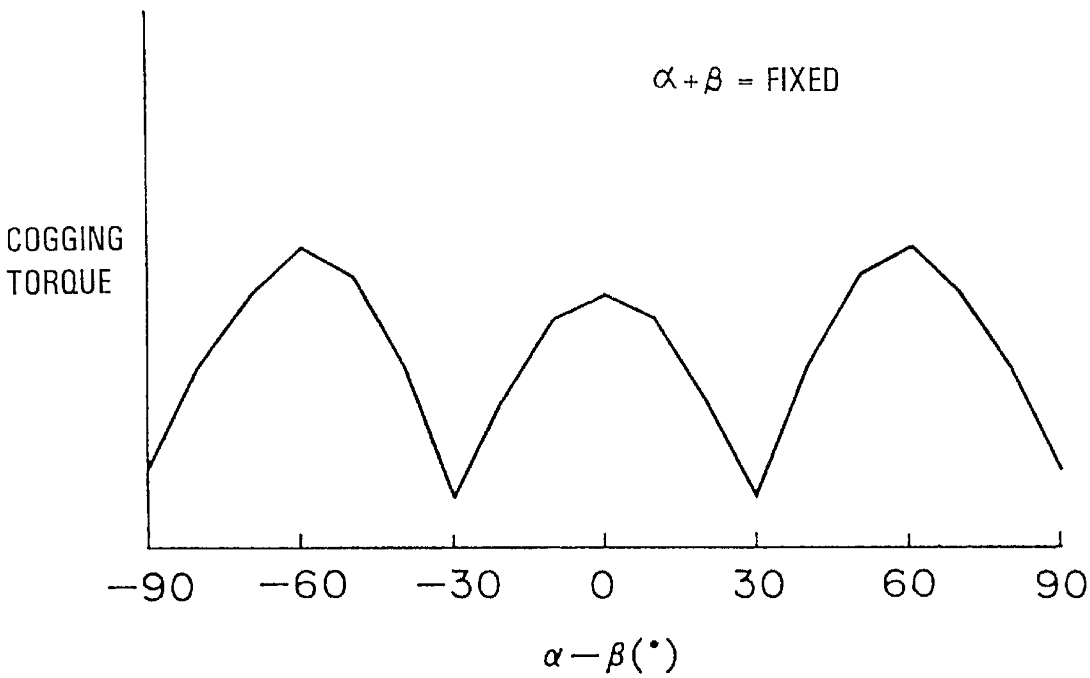
FIG. 51 is a graph showing relationship between the core angle α–β and the cogging torque in the motor.

FIG. 51 shows an exemplary case, with the $\alpha+\beta$ fixed while the $\alpha-\beta$ varied. As shown in FIG. 51, cogging torque goes the smallest at around ±30°, ±90°. At the ±90°, the magnetic efficiency is poor because of unfavourable balance at both sides. Therefore, the ±30° is superior.

In a motor of the present embodiment, a core 106 and a back yoke 109 have been used. In a case where two cores are employed, as in the fifth through seventh embodiments, a same effect may be likewise obtained by setting the difference in the angle between the two cores at ±30°.

Now in the following, description is made on an imbalancing weight 117, 118.

A motor of the present embodiment is for use in a pager of mobile communication apparatus. In order to pick up a vibration to be generated by motor, weights 117, 118 whose centre of gravity is off the centre of shaft are provided so as the centrifugal force of the weights 117, 118 is transmitted to a stator of motor.

Figure 52A:
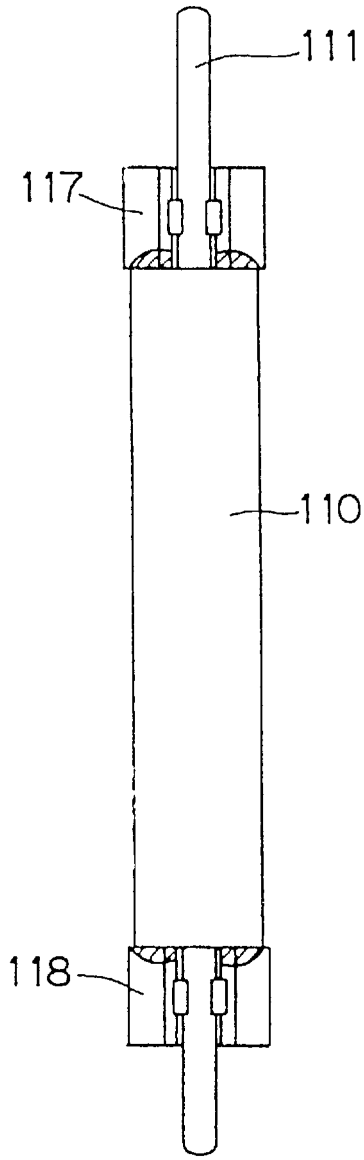
FIG. 52(*a*) is a front view showing a rotor magnet of the motor.
Figure 52B:
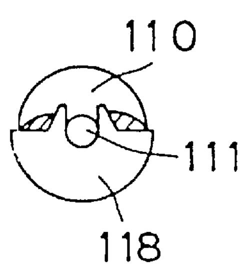

As shown in FIG. 52, a rotor 110 is penetrated through by a shaft 111, and imbalancing weights 117, 118 are provided and fixed by calking at around the both ends of the shaft 111, and the weights 117, 118 are glued to the ends of the rotor 110.

Figure 53A:
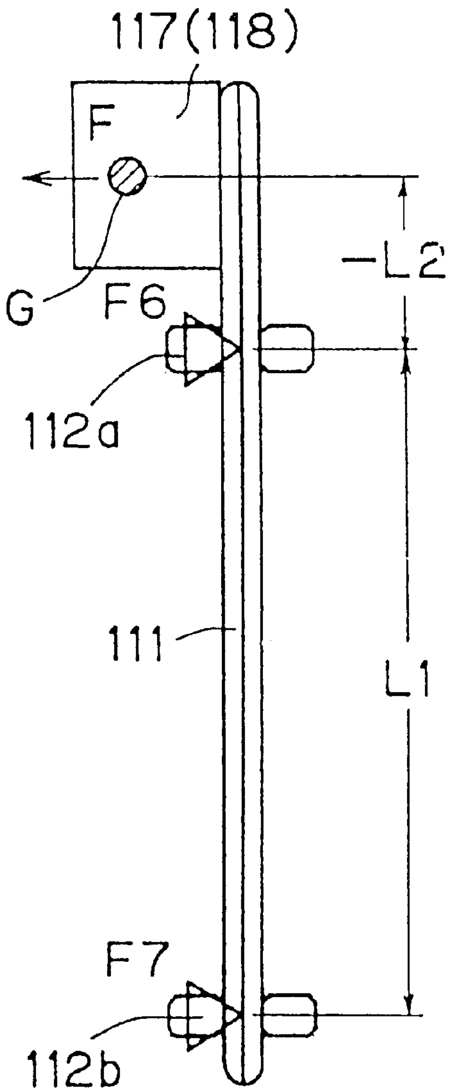
FIG. 53(*a*) is a chart showing an exemplary case of the motor wherein the gravity centre of an imbalancing weight relative to bearing is located outside an area between the two bearings.
Figure 53B:
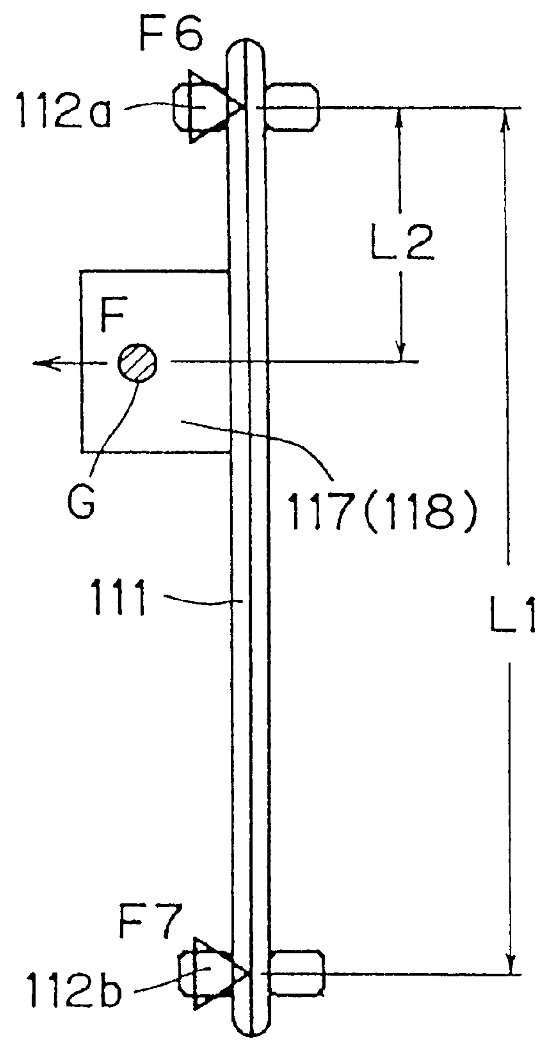

FIG. 53(*a*),(*b*) shows a relationship with the location of the centre of gravity of imbalancing weight 117(118) relative to bearings 112*a*, 112*b*. FIG. 53(*a*) shows a case where the gravity centre G of imbalancing weight 117(118) is located at a point outside the region between the two bearings 112*a*, 112*b*, FIG. 53(*b*) is a case where the gravity centre G of imbalancing weight 117(118) is located at a point between the two bearings 112$a$, 112$b$. Respective loads F6, F7 by the centrifugal force F to be exerted on bearings 112$a$, 112$b$ are obtainable through Formula 37: where; L1 representing the distance between the two bearings 112$a$ and 112$b$, L2 is the axial direction from one bearing 112$a$ to gravity centre G of weight assuming a direction towards the other bearing 112$b$ as positive.

$$F6=((L1-L2)/L1)\cdot F$$

$$F7=(L2/L1)\cdot F \qquad (37)$$

When the gravity centre G of imbalancing weight 117 (118) is placed outside of the bearings 112$a$, 112$b$, as shown in FIG. 53($a$), the load F7 turns out to be negative. This means that the direction of load is reversed.

Loss torque Tr at bearing is generally approximated in Formula 38, with a symbol f denotes a load.

$$Tr=Tc+kf \qquad (38)$$

where, Tc representing a constant element independent of a load, k is a proportional constant.

Accordingly, the sum of loss torques at two bearings is expressed in Formula 39:

$$Tr=Tc+k(|F6|+|F7|) \qquad (39)$$

Figure 54:
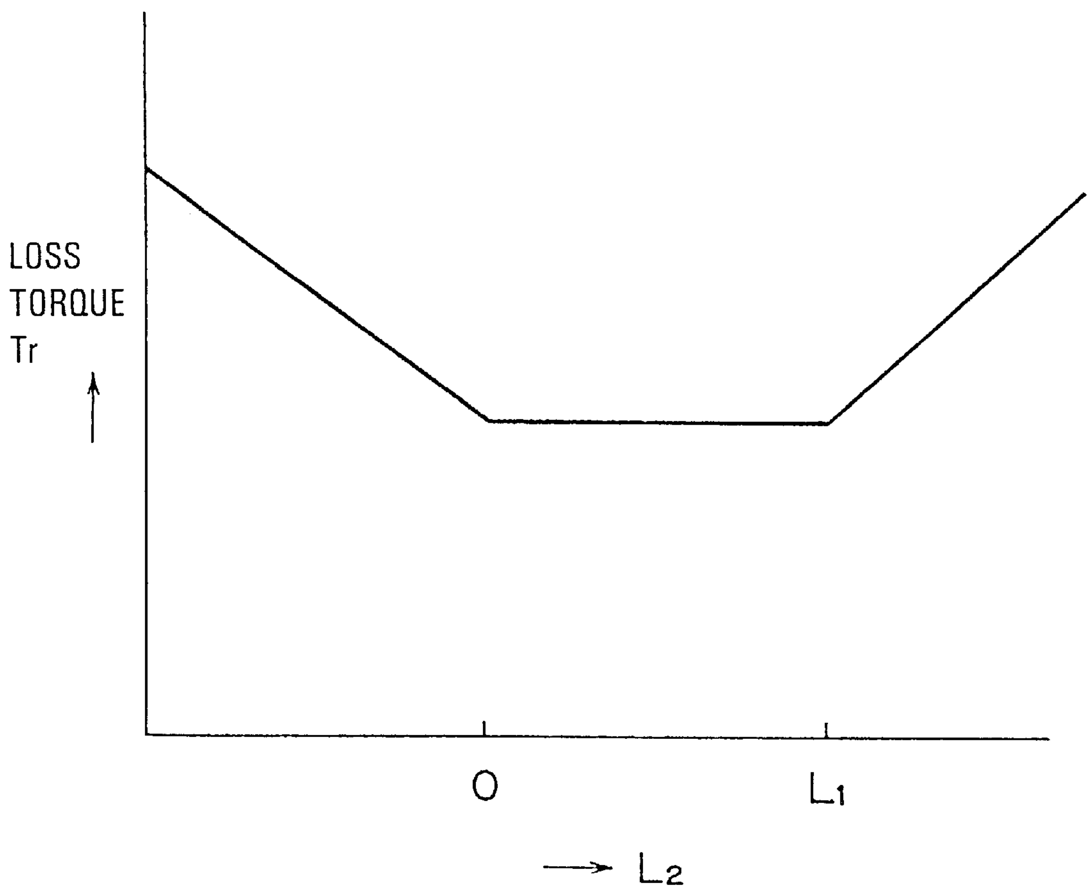
FIG. 54 is a graph showing a relationship of the loss torque versus the distance L1 between the bearings and the bearing to weight distance L2 in the motor.

FIG. 54 shows a relationship of loss torque Tr with L1, L2.

As seen from FIG. 54, the loss torque Tr is small when L2 is between 0 and L1, viz. when the gravity centre of imbalancing weight 117(118) is placed somewhere between the two bearings 112$a$ and 112$b$.

Taking the mechanical life of bearings into consideration, the respective loads F6, F7 are preferred to be as small as possible. Both of the loads F6, F7 become small when the gravity centre G of imbalancing weight 117(118) is placed at a place in fulfillment of Formula 40, viz. at the middle of the two bearings 112$a$ and 112$b$. This state may be advantageous in terms of mechanical life of the bearing.

$$L2=L1/2 \qquad (40)$$

In FIG. 53, the place of a gravity centre of imbalancing weight 117(118) has been contemplated. In a motor having two or more of imbalancing weights, as in the present embodiment, the same principle applies by assuming a centre of gravity G for the whole imbalancing weights 117(118). In a motor of the present embodiment, the centre of gravity G of the whole imbalancing weights 117(118) is placed at the middle of the two bearings 112$a$ and 112$b$, which means that the motor is advantageous in terms of both the bearing loss and the mechanical life.

In order to further reduce the bearing loss, it is effective to make the diameter of shaft 111 smaller. However, with a shaft of reduced diameter flexion of the shaft 111 becomes unignorable, and a problem of hitting by rotor might arise.

Figure 55A:
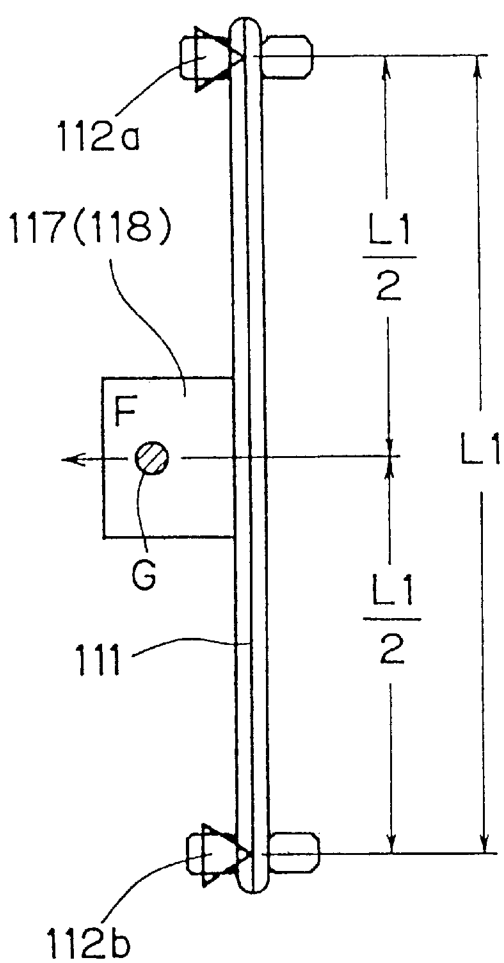
FIG. 55(*a*) is a chart showing load on the shaft of the motor where there is one imbalancing weight.
Figure 55B:
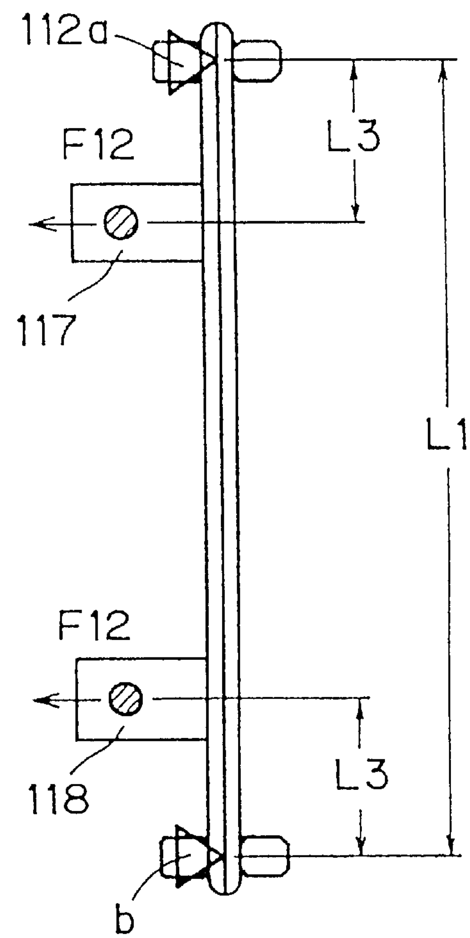

FIG. 55($a$),($b$) shows the load on shaft 111 caused by the imbalancing weight 117(118). FIG. 55($a$) illustrates a case of one imbalancing weight 117(118), FIG. 55($b$) is a case of two imbalancing weights 117, 118.

Assuming the shaft 111 as a rigid body, the FIG. 55($a$) and the FIG. 55($b$) are totally identical. But, when a flexion of shaft 111 is taken into consideration, a slightly different situation is created.

The flexion δ of shaft 111 when one imbalancing weight 117(118) is used (FIG. 55($a$)) is represented by Formula 41:

$$\delta=F\ L\ 1^3/48E\ I \qquad (41)$$

where, E representing the lengthwise elasticity coefficient of shaft, I is the cross sectional secondary momentum of shaft.

Likewise, the flexion δ of shaft 111 when two imbalancing weights 117 and 118 are used (FIG. 55($b$)) is represented by Formula 42: where, the axial distance from bearing 112$a$, 112$b$ to imbalancing weight 117, 118 of the same end is designated as L3 assuming the direction towards the other bearing 112$b$, 112$a$ as positive.

$$\delta=(F\ L3^2(L1-L3)^2)/3L1\ EI \qquad (42)$$

Figure 56:
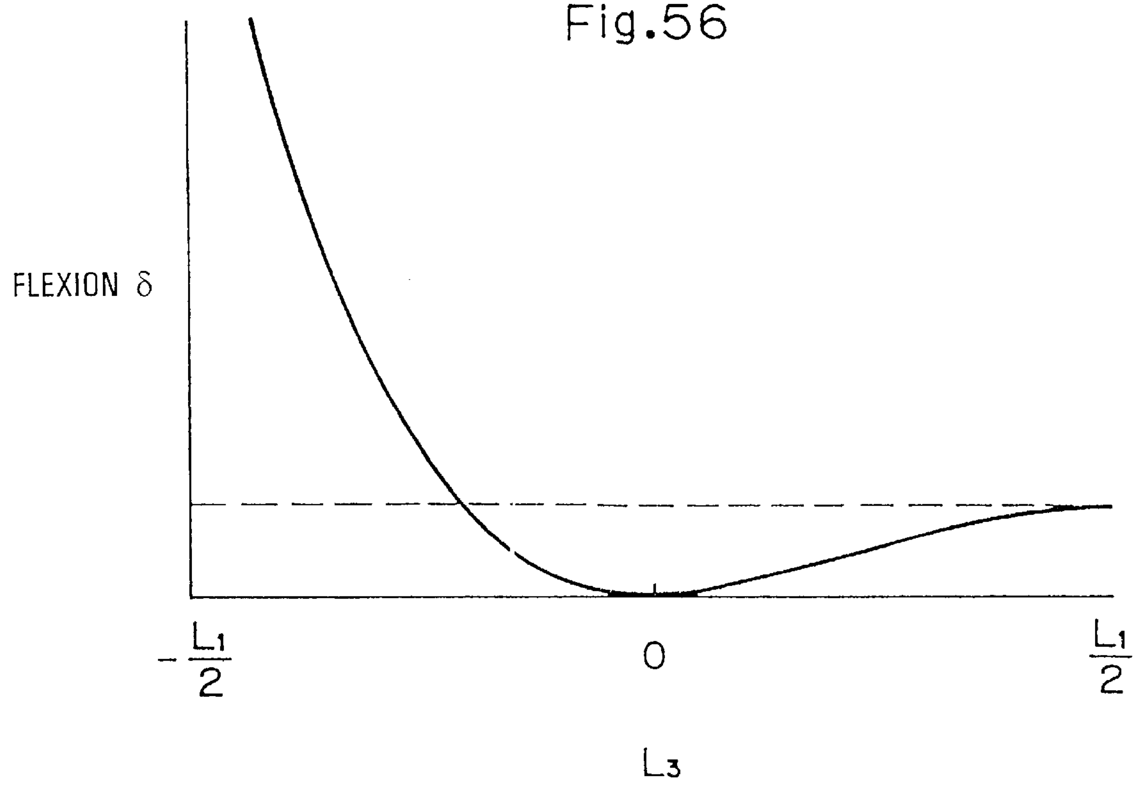
FIG. 56 is a graph showing relationship between the bending δ of shaft and the distance L3 from bearing to weight in the motor.

FIG. 56 shows a relationship between flexion δ and L3. In FIG. 56, flexion of shaft 111 having one weight is shown in dotted line for the sake of comparison.

As seen from FIG. 56, the flexion δ becomes 0 when L3 is 0. Such may be ideal, but it is unimplementable because of the existence of bearings 112$a$ and 112$b$. In practice, the flexion 8 may be made the smallest by placing the imbalancing weights 117, 118 as close to bearings 112$a$, 112$b$ as possible.

In a motor of the present embodiment, the imbalancing weights 117, 118 are attached at both ends of rotor 110. By so doing, the flexion δ of shaft 111 is made to be minimum, which makes it possible to use a thinner shaft 111 for a reduced bearing loss.

As described above, a motor of the present embodiment uses a thin shaft 111 in order to reduce the loss at shaft. A thin shaft, however, creates a problem that the joining strength with the imbalancing weights 117, 118 and rotor 110 is inferior as compared to a case with thick shaft.

The relationship among pulling strength Fn, rotation torque Tn and shaft diameter d is represented by Formula 43, taking the fixing by calking, the fixing by pressurized insertion as examples representing commonly used methods of joining/fixing.

$$Fn\ d$$

$$Tn\ d^2 \qquad (43)$$

It is difficult to secure a thin shaft with a sufficient revolution torque Tn, among other items.

In most cases, a rotor 110 has a weaker mechanical strength than that of metal; which makes it further difficult to secure the enough strength.

In order to encounter the above problems, a shaft 111 in a motor of the present embodiment is penetrating through the rotor 110, the pulling strength Fn of shaft 111 relative to rotor 110 is secured by fixing and calking the imbalancing weights 117, 118 on the shaft 111 at both ends of rotor 110; in addition, the imbalancing weights 117, 118 are glued to the rotor 110 at both ends to insure the revolution torque Tn of rotor 110 relative to weights 117, 118.

Because the motor of present embodiment is for use as a vibration motor in a pager of mobile communication apparatus, it is not required to have a shaft extruding outside for output; what is essential for the motor is to have a sufficient pulling strength Fn with shaft 111 relative to rotor 110 and a sufficient rotation torque Tn relative to imbalancing weights 117, 118. Under a structure of the present embodiment, the rotor 110 has been provided with the minimum required pulling strength Fn relative to shaft 111, as well as revolution torque Tn relative to imbalancing weights 117, 118. The structure may be suitable to a motor for use in a pager.

Although a motor in accordance with the present embodiment is comprised of a core 106 and a back yoke forming a pair, the motor may be constituted with core 106 alone.

The above described fifth embodiment through eighth embodiment have been described referring to a brushless motor for generating vibration, which type of motors are superior to brush motors in terms of the reliability. The invented motors may be incorporated in portable pagers, portable telephones, etc. for generating vibrations to be transmitted to human body, in which application a high reliability in the operation is required.

The present invention may be embodied also in a conventional brush motor. Namely, a brush motor for generating vibration may be constituted by providing a brush and a rectifier for distributing a DC current to coils so as to set the phase of induced voltage generated on the salient pole wound around with coil in each stage to a phase suitable for rotating a magnetic unit corresponding to a coil in that stage.

Although description has been made on a brushless motor for generating a vibration in the above described fifth embodiment through eighth embodiment, the invention may of course be embodied in a brushless motor without having the imbalancing weight.

A motor in accordance with a ninth exemplary embodiment of the invention is described in the following referring to FIG. 57.

The descriptions in the above embodiments are related to the brushless motors. The following is an embodiment of the invention in a brush motor.

Figure 57:
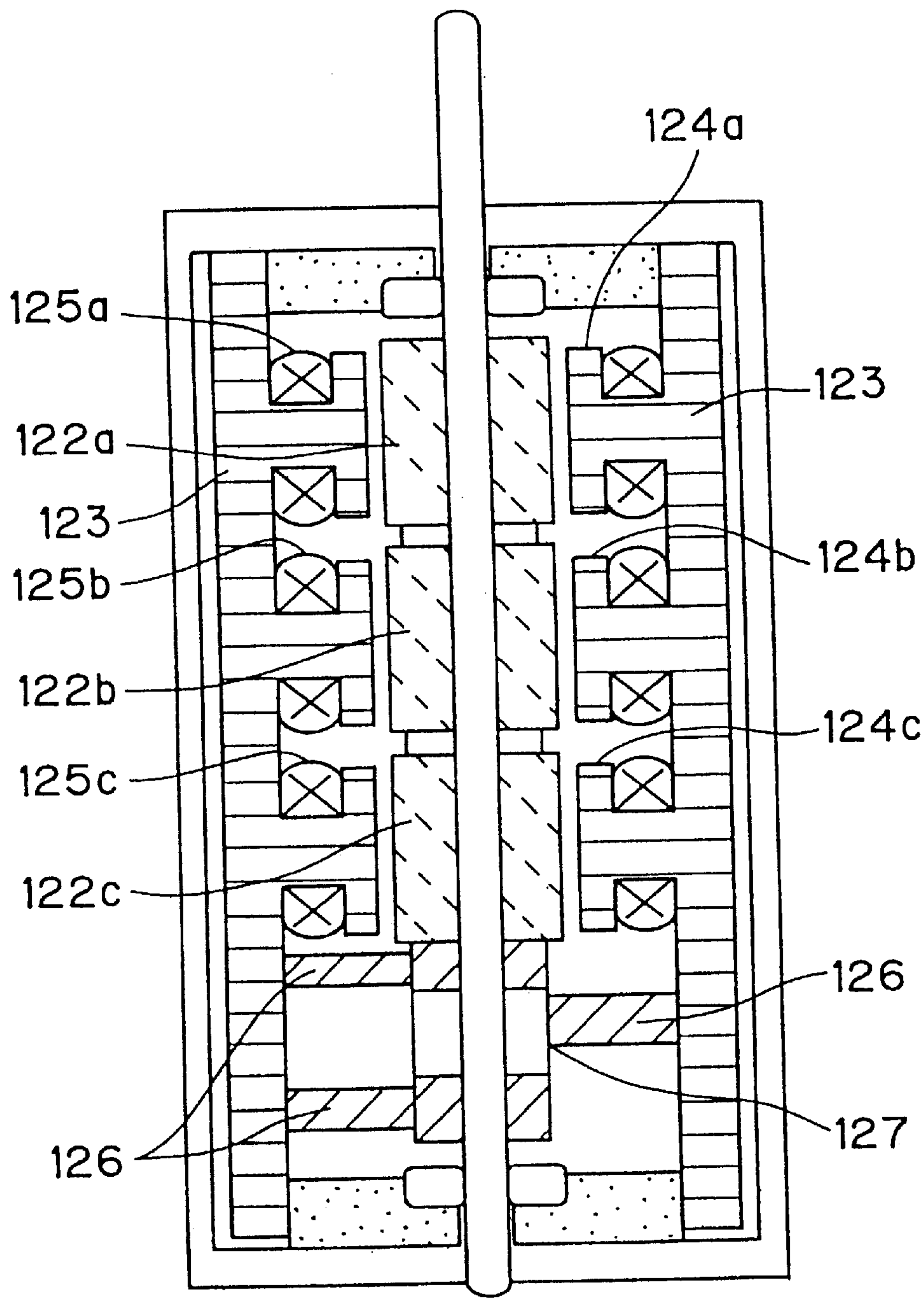
FIG. 57 is a cross sectional view showing a motor in accordance with a ninth embodiment of the invention.
Figure 58:
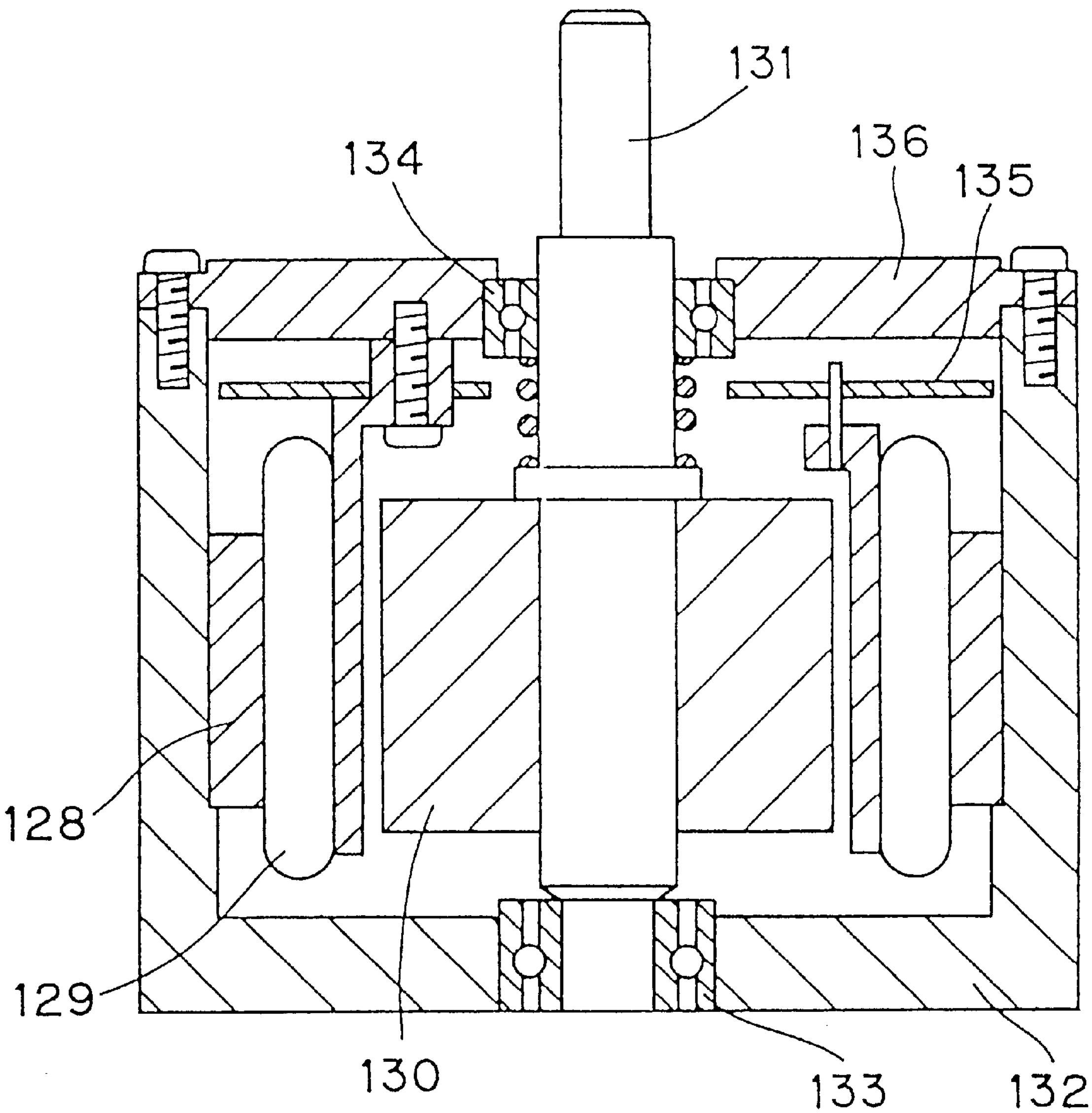
FIG. 58 is a cross sectional view of a conventional motor.
Figure 59A:
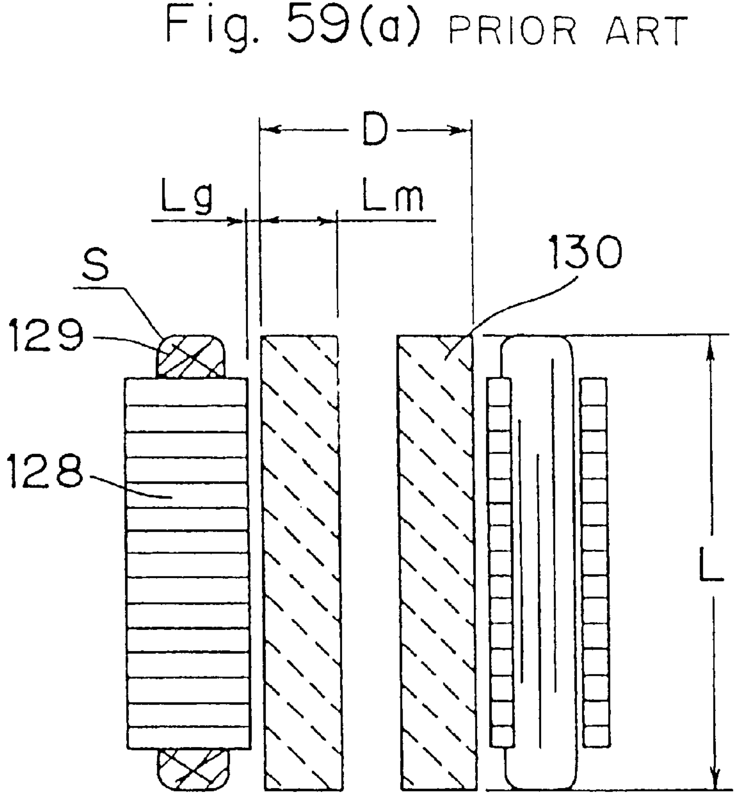
FIG. 59(*a*) is a cross sectional view showing a simplified magnetic circuit of the motor.
Figure 59B:
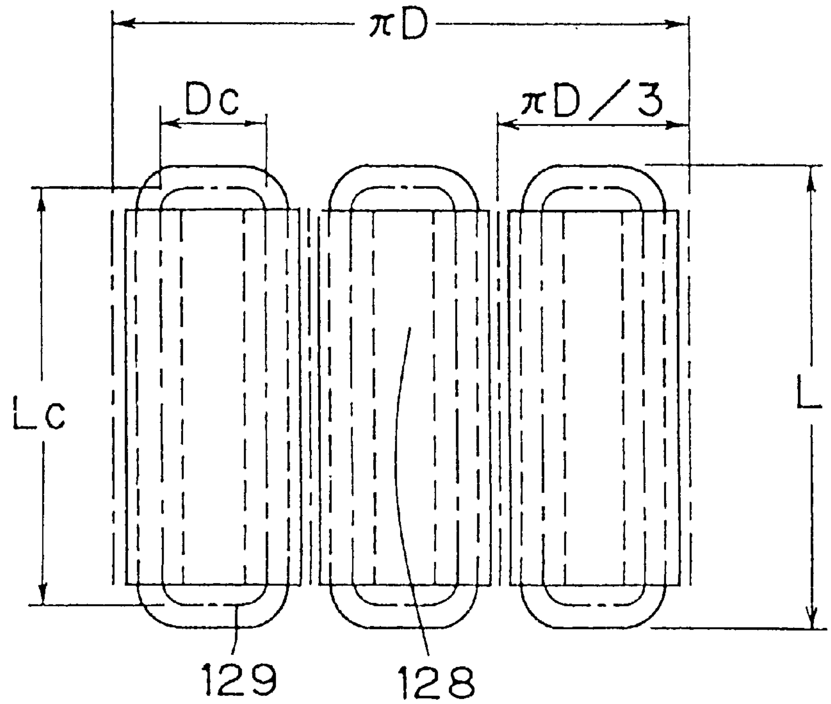
Figure 60:
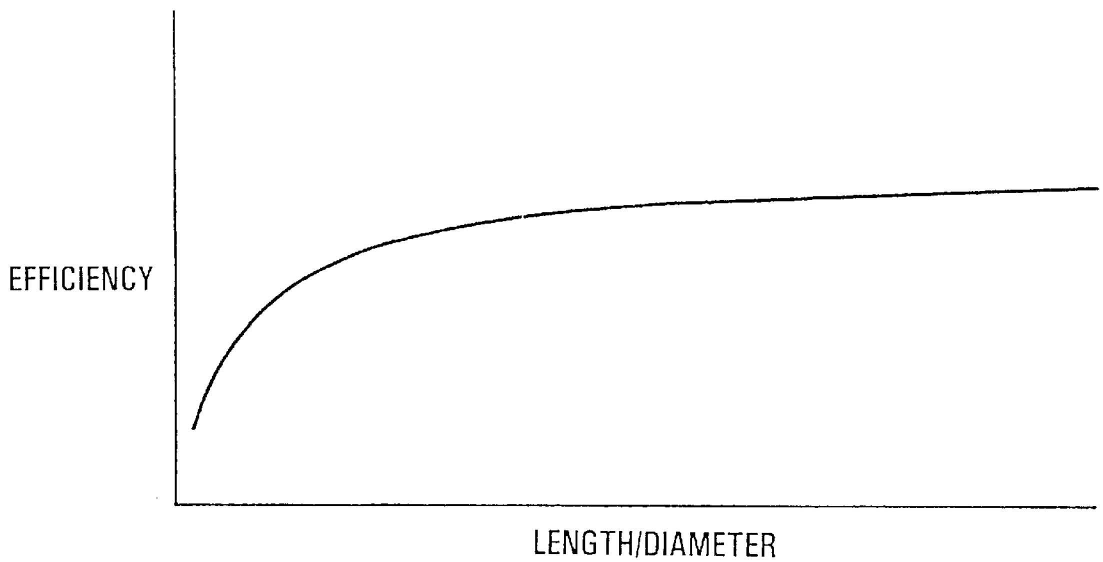
FIG. 60 is a graph showing efficiency of the motor.
Figure 61A:
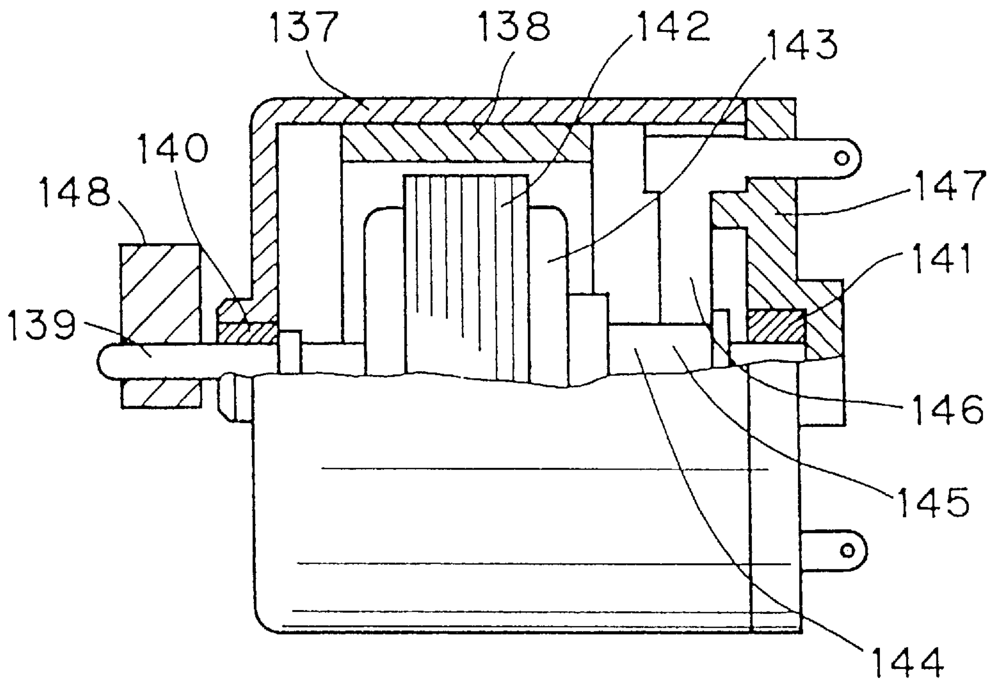
FIG. 61(*a*) is a partially cut-away cross sectional view showing other exemplary conventional motor.
Figure 61B:
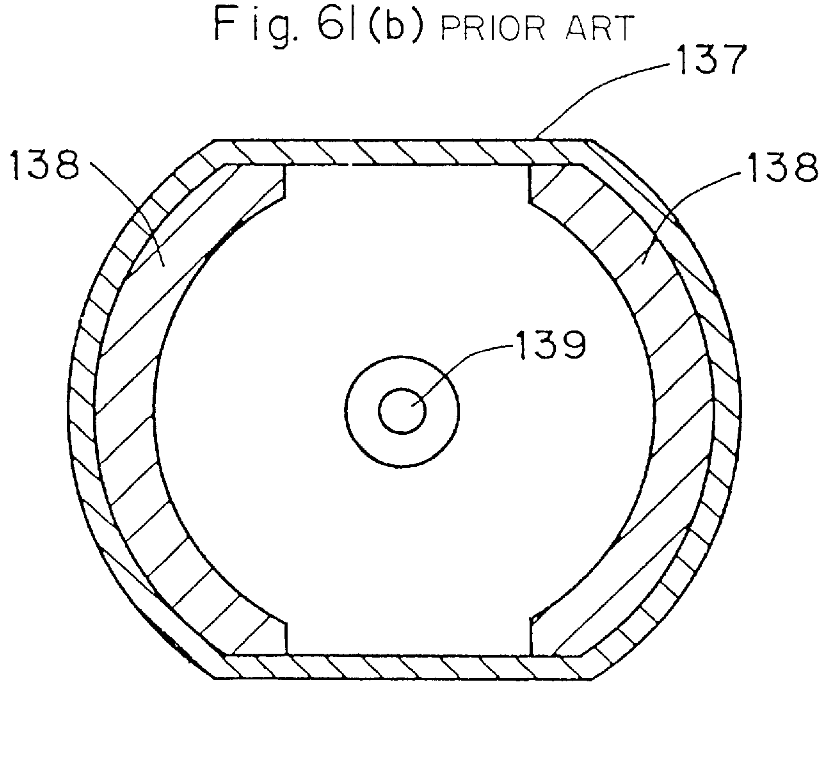
Figure 62A:
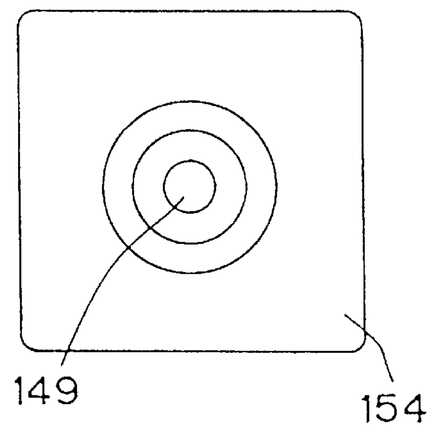
FIG. 62(*a*) is a plane view of other example of conventional motor.
Figure 62B:
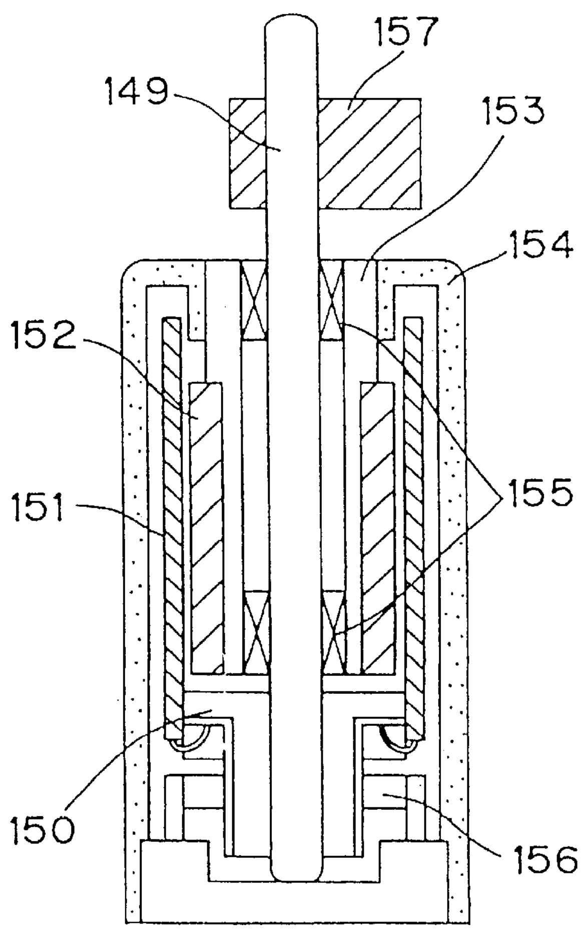

As shown in FIG. 57, magnets 122*a*–122*c*, core 123, salient poles 124*a*–124*c*, and coils 125*a*–125*c* are disposed in a same arrangement as in the second embodiment shown in FIG. 11. A brush 126 and a rectifier 127 are additionally provided to distribute a DC current to each of the coils 125*a*–125*c* so as to set the phase of induced voltage generated on the salient poles 124*a*–124*c* in each stage deviates relative to one another by 120.

The brush 126 has been used for three pieces, and respective brushes are positioned not to take a same rotational positioning as the rectifier in a circumferential direction. This makes it easy to distribute the electricity in each of the phases. Thus a small and thin brush motor may be presented in accordance with the present invention.

Industrial Applicability

As described in the above, a motor in accordance with the present invention comprises a rotor comprised of K pieces of (K indicating any integer greater than one) magnetic units having the N and S poles magnetized alternately, a rotating shaft around which the magnetic units are stacked axially in K stages and fixed as a single body, a core having K pieces of salient poles wound around with coil corresponding to respective magnetic units, and a pair of bearings for supporting the rotor rotatable; in which the magnetized position of the N and S poles of the magnetic unit at each stage deviates relative to one another in a circumferential direction so as to set the phase of induced voltage generated on the salient pole wound around with the coil in each stage to a phase suitable for rotating a magnetic unit corresponding to a coil in that stage. With such a structure of the present invention, the magnetized poles of rotor, as well as the salient poles of core each wound around with coil, may be disposed splitted on planes of K stages which are perpendicular to axial direction. Thus the invention enables to present a motor that has advantages in making the efficiency higher, the overall dimensions smaller and thinner, and in providing more freedom in the installation in an apparatus.

A motor in accordance with the present invention comprises a rotor comprised of magnetic units stacked in K stages (K indicating any integer greater than one) the magnetized position of the N and S poles at each stage deviating relative to one another in a circumferential direction, a core having K pieces of salient poles wound around with coil corresponding to the magnetic units disposed on a straight line that is in parallel with axial direction of the rotor, a pair of bearings for supporting the rotor rotatable, and an outer case having an oblong shape in an axially perpendicular cross section consisting of a pair of long sides facing to each other and a pair of short sides facing to each other, in which the rotor is penetrating through the outer case at the central part and a core is disposed in at least one of the short sides. With such a structure of the present invention, the magnetized poles of magnetic units, as well as the salient poles of core each wound around with coil, may be disposed splitted in K stages in a direction parallel to axial direction of the rotor, and the salient poles wound around with coil may be provided in only the short side of the outer case. Thus the invention enables to reduce dimension of the short side to a length almost equal to outer diameter of the rotor. The invention also makes it easier to increase the number of turns of the coil to be wound around the salient poles. Thus, the efficiency of a motor may be improved. Further, because it is a brushless motor a higher reliability may be expected, so a highly reliable and efficient motor may be presented in a thin configuration.

A motor in accordance with the present invention comprises a rotor comprised of magnetic units stacked in K stages (K indicating any integer greater than one) the magnetized position of the N and S poles at each stage deviating relative to one another in a circumferential direction, a core having K pieces of salient poles wound around with coil corresponding to the magnetic units, a pair of bearings for supporting the rotor rotatable, an outer case having an oblong shape in an axially perpendicular cross section consisting of a pair of long sides facing to each other and a pair of short sides facing to each other, and an imbalancing weight rotating together with the rotor for generating vibration as a result of rotation of the rotor. With such a structure of the present invention, the magnetized poles of magnetic units, as well as the salient poles of core each wound around with coil, may be disposed splitted in K stages in the axial direction of rotor. This enables to reduce the cross sectional square measure of outer case, and makes it easy to assume a desired cross sectional shape inclusive of a thin shape. Furthermore, it becomes easier to increase the number of turns of the coil to be wound around salient poles for an improved efficiency of a motor. Thus the invention offers a highly efficient motor for generating vibration, whose outer case having a high degree of freedom in assuming a desired cross sectional shape in a reduced square measure.

We claim:

1. A motor comprising a rotor comprised of K pieces of (K indicating any integer greater than one) magnetic units having the N and S poles magnetized alternately, a rotating shaft around which the magnetic units are stacked axially in K stages to be fixed as a single body, a core having salient poles wound around with coil for K stages corresponding to respective magnetic units, and a pair of bearings for supporting the rotor rotatable; wherein the magnetized position of the N and S poles of the magnetic unit at each stage deviates relative to one another in a circumferential direction, the phase of the voltage supplied to the coils in each stage differs relative to one another, thereby the motor is driven by the multiple phases.

2. A motor comprising a rotor comprised of magnetic units stacked in K stages (K indicating any integer greater than one) the magnetized position of the N and S poles at each stage deviating relative to one another in a circumferential direction, a core having K pieces of salient poles wound around with coil corresponding to the magnetic units disposed on a straight line that is in parallel with axial direction of the rotor, a pair of bearing for supporting the rotor rotatable, and an outer case having an oblong cross sectional shape in a plane perpendicular to axial direction of the rotor consisting of a pair of long sides facing to each other and a pair of short sides facing to each other; wherein the rotor is penetrating through the outer case at the central part and a core is disposed in at least one of the short sides of the outer case, the phase of the voltage supplied to coils in each stage differs relative to one another, thereby the motor is driven by the multiple phases.

3. The motor of claim 2, further comprising an imbalancing weight that rotates together with the rotor, wherein a vibration is generated as a result of rotation of the rotor.

4. The motor of claim 1, wherein a core having salient poles at each stage wound around with coil is provided splitted, a rotor formed in a splitted manner and said core are combined to form a unit for each stage, and magnetic units for each stage fixed around a rotating shaft are assembled together in correspondence to respective stages with the core.

5. The motor of either one claim among claims 1 through 3, wherein a rotor magnet is made of a single magnetic body, being magnetized in the N and S poles at respective stages in an arrangement deviating relative to one another.

6. The motor of either one claim among claims 1 through 3, wherein a rotor magnet is made of a single magnetic body, being magnetized in the N and S poles in a skew arrangement.

7. The motor of either one claim among claims 1 through 3, wherein the salient pole of respective stages wound around with coil are disposed on a straight line running in parallel with the rotating shaft.

8. The motor of either claim 2 or claim 3, wherein the core is provided in only one of the short sides of outer case.

9. The motor of either claim 2 or claim 3, wherein the core is provided in each of the short sides of outer case.

10. The motor of either claim 2 or claim 3, wherein the core is provided in one of the short sides of outer case and a back yoke is provided in the other short side of outer case.

11. The motor of either one claim among claims 1 through 3, wherein the position of salient poles wound around with coil at each stage deviates relative to one another in a circumferential direction.

12. The motor of either one claim among claims 1 through 3, wherein the core is provided with a flat portion in the outer circumference.

13. The motor of either one claim among claims 1 through 3, wherein the surface of salient pole facing a rotor is curved with a radius index centred at the axis of rotor.

14. The motor of either one claim among claims 1 through 3, wherein the surface of salient pole facing a rotor is curved with a radius index centred at a point away from the axis of rotor.

15. The motor of either claim 2 or claim 3, wherein the outer case has a rectangular cross sectional shape.

16. The motor of either one claim among claims 2, or 3, wherein the outer case has dimensions the length of a short side of which is shorter than ½ of a long side.

17. The motor of either one claim among claims 1 through 3, wherein a core is comprised of a yoke and K pieces of salient poles coupled to the yoke.

18. The motor of claim 17, wherein the salient pole is formed by a forging process.

19. The motor of either one claim among claims 1 through 3, wherein the salient pole is provided with a molded insulation resin in a portion to be wound around with coil, and the coil is insulated from the salient pole by the molded resin.

20. The motor of claim 2, wherein the surface of salient pole facing a rotor magnet has a circumferential angle either 150°±5°, or 90°±5° in terms of electrical effects.

21. The motor of claim 2, wherein the circumferential angle of the surface of salient pole facing a rotor is different between the right and the left of a pair of cores within a range 30°±5° in terms of electrical effects.

22. The motor of claim 10, wherein the circumferential angle of the surface of salient pole of a core facing a rotor is different from that of a back yoke facing a rotor magnet within a range 30°±5° in terms of electrical effects.

23. The motor of claim 3, wherein an imbalancing weight is provided on the shaft at a place outside the region between a pair of bearings.

24. The motor of claim 3, wherein an imbalancing weight is provided on the shaft at a place between a pair of bearings.

25. The motor of claim 3, wherein the diameter D of the largest outer circumference of an imbalancing weight, or a bearing bush functioning also as an imbalancing weight, and the dimension a of the shorter side of outer case establish a relationship $0.6\,a<D<a$.

26. The motor of claim 3, wherein the diameter D of the largest outer circumference of an imbalancing weight, or a bearing bush functioning also as an imbalancing weight, and the diameter Dm of magnetic unit of rotor establish a relationship $0.8\,Dm<D<1.1\,Dm$.

27. The motor of either one claim among claims 1 through 3, wherein one of the bearings is formed with a thrust bearing section and a radial bearing section, and an end of the shaft contacting said thrust bearing section is spherical.

28. The motor of claim 27, wherein the radial bearing section is made with an oil-containing sintered bearing material mixed with fluoric resin.

29. The motor of claim 27, wherein the thrust bearing section is constituted with a thrust plate made of a high polymer compound.

30. The motor of claim 27, wherein the radius index r of shaft end and the diameter d of shaft establish a relationship $10\,d>r>1.5\,d/2$.

31. The motor of claim 27 for generating a vibration, wherein the outer dimension Ds of the thrust plate constituting the thrust bearing and the diameter d of shaft establish a relationship $Ds>d$.

32. The motor of either one claim among claims 1 through 3, wherein the bearing is formed with a bracket made of a low-friction resin.

33. The motor of either one claim among claims 1 through 3, wherein a hole for bearing is formed in a bracket consituting an end of the outer case, a bearing being formed by a circumferential edge of the hole for bearing that has been made thinner for supporting a shaft penetrating through the hole.

34. The motor of either claim 2 or claim 3, wherein terminal end of the coil wound around salient pole is electrically connected on a printed board, the printed board constituting at least one of the sides of outer case, and elements of driving circuit are mounted on the printed board.

35. The motor of either claim 2 or claim 3, wherein a flexible printed board is provided for continuously covering the three sides of outer case, viz. a pair of shorter sides and one of the longer sides.

36. The motor of claim 34, wherein each salient pole is provided with a terminal board of molded resin made with a metal piece integrated to form a single body which is attached and fixed thereon, said metal piece and the printed board are electrically coupled under a state where terminal end of the coil wound around tooth portion of salient pole is being connected to said metal piece.

37. The motor of claim 36, wherein the terminal end of coil is connected with the metal piece by thermal compression.

38. The motor of claim 36, wherein the metal piece is connected with the printed board by thermal compression.

39. The motor of either one claim among claims 1 through 3, wherein the tooth portion of salient pole to be wound around with coil has a rectangular shape in the cross section, a side parallel to the axis of magnetic units having a length greater than that of the other side which is perpendicular to the former side.

40. The motor of either one claim among claims 1–3, further comprising an electronic circuit for controlling a DC current so as to provide the coil with electricity setting the phase of induced voltage generated on the salient pole wound around with the coil in each stage to a phase suitable for rotating a magnetic unit in that stage, thus the motor operating as a brushless motor.

41. The motor of either one claim among claims 1, 3, 4, 23–26, further comprising a brush and a rectifier for distributing a DC current to as to provide the coil with electricity setting the phase of induced voltage generated on the salient pole wound around with the coil in each stage to a phase suitable for rotating a magnetic unit in that stage, thus the motor operating as a brush motor.

42. The motor of either claim 1, 2 and 3, wherein K=3, comprising three pieces of magnetic units each having the N and S poles magnetized alternately in a circumferential direction for 2n poles(n indicating any integer not smaller than 1) at an equal angular pitch, three stages of salient poles wound around with coil for 2m poles(m indicating any integer not smaller than 1, m≦n) corresponding to each of the N and S poles of the magnetic units at each stage in m poles, wherein the magnetized position of the magnetic poles of the magnetic unit at each stage deviates relative to one another in a circumferential direction by 120/n degrees or 60/n degrees so as the phase of induced voltage generated on the three-stages of salient poles wound around with the coil deviates relative to one another by 120 degrees.

43. The motor of claim 15, wherein the outer case has dimensions the length of a short side of which is shorter than ½ of a long side.

44. The motor of claim 37, wherein the metal piece is connected with the printed board by thermal compression.

45. The motor of claim 40, wherein K=3, comprising three pieces of magnetic units each having the N and S poles magnetized alternately in a circumferential direction for 2n poles (n indicating any integer not smaller than 1) at an equal angular pitch, three stages of salient poles wound around with coil for 2m poles (m indicating any integer not smaller than 1, m≦n) corresponding to each of the N and S poles of the magnetic units at each stage in m poles, wherein the magnetized position of the magnetic poles of the magnetic unit at each stage deviates relative to one another in a circumferential direction by 120/n degrees or 60/n degrees so as the phase of induced voltage generated on the three stages of salient poles wound around with the coil deviates relative to one another by 120 degrees.

46. The motor of claim 41, wherein K=3, comprising three pieces of magnetic units each having the N and S poles magnetized alternately in a circumferential direction for 2n poles (n indicating any integer not smaller than 1) at an equal angular pitch, three stages of salient poles wound around with coil for 2m poles (m indicating any integer not smaller than 1, m≦n) corresponding to each of the N and S poles of the magnetic units at each stage in m poles, wherein the magnetized position of the magnetic poles of the magnetic unit at each stage deviates relative to one another in a circumferential direction by 120/n degrees or 60/n degrees so as the phase of induced voltage generated on the three stages of salient poles wound around with the coil deviates relative to one another by 120 degrees.

47. A portable pager incorporating a motor, which motor comprising a rotor comprised of magnetic units stacked in K stages (K indicating any integer greater than one) the magnetized position of the N and S poles at each stage deviating relative to one another in a circumferential direction, a core having salient poles wound around with coil in K stages corresponding to the magnetic units, and an imbalancing weight which rotates with the rotor, wherein the phase of induced voltage generated on the coil in each of the stages differs relative to one another and is assigned to respective multiple phases, thereby a motor is driven by the multiple phases;

a vibration is generated as a result of rotation of the motor.

48. A portable telephone unit incorporating a motor, which motor comprising a rotor comprised of magnetic units stacked in K stages (k indicating any integer greater than one) the magnetized position of the N and S poles at each stage deviating relative to one another in a circumferential direction, a core having salient poles wound around with coil in K stages corresponding to the magnetic units, and an imbalancing weight which rotates with the rotor, wherein the phase of induced voltage generated on the coil in each of the stages differs relative to one another and is assigned to respectively multiple phases, thereby a motor is driven by the multiple phases;

a vibration is generated as a result of rotation of the motor.

* * * * *